(12) United States Patent
Zegler

(10) Patent No.: US 11,970,997 B1
(45) Date of Patent: Apr. 30, 2024

(54) INTEGRATED VEHICLE FLUIDS FOR UPPER STAGE LAUNCH VEHICLE WITH INTERNAL COMBUSTION ENGINE

(71) Applicant: United Launch Alliance, L.L.C., Centennial, CO (US)

(72) Inventor: Frank Charles Zegler, Idledale, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 0 days.

(21) Appl. No.: 18/133,124

(22) Filed: Apr. 11, 2023

Related U.S. Application Data

(63) Continuation of application No. 17/683,014, filed on Feb. 28, 2022, which is a continuation of application No. 16/111,623, filed on Aug. 24, 2018, now Pat. No. 11,261,828, which is a continuation of application
(Continued)

(51) Int. Cl.
| | | |
|---|---|---|
| *F02K 9/58* | (2006.01) | |
| *B64G 1/40* | (2006.01) | |
| *B64G 1/42* | (2006.01) | |
| *F02K 9/42* | (2006.01) | |
| *F02K 9/44* | (2006.01) | |

(Continued)

(52) U.S. Cl.
CPC ............... *F02K 9/58* (2013.01); *B64G 1/402* (2013.01); *B64G 1/421* (2013.01); *F02K 9/42* (2013.01); *F02K 9/44* (2013.01); *F02K 9/50* (2013.01); *F02K 9/60* (2013.01); *B64G 1/401* (2013.01); *F02K 9/425* (2013.01)

(58) Field of Classification Search
CPC ..... F02K 9/44; F02K 9/50; F02K 9/58; B64G 1/401; B64G 1/402; B64G 1/421
See application file for complete search history.

(56) References Cited

U.S. PATENT DOCUMENTS

| | | |
|---|---|---|
| 2,704,438 A | 3/1955 | Sheets |
| 3,156,433 A | 11/1964 | White, Jr. |
| 3,266,422 A | 8/1966 | Matheisel |

(Continued)

FOREIGN PATENT DOCUMENTS

| | | |
|---|---|---|
| JP | 4086329 | 3/1992 |
| WO | WO 2005/047568 | 5/2005 |
| WO | WO 2010/019534 | 2/2010 |

OTHER PUBLICATIONS

Morgan et al. "Development of a Hydrogen-Oxygen Internal Combustion Engine Space Power System," Prepared under Contract No. NAS 3-2787 by Vickers, Inc. Detroit Mich. For NASA, Jul. 1965, 204 pages (Year: 1965).*

(Continued)

*Primary Examiner* — Kyle Robert Thomas
(74) *Attorney, Agent, or Firm* — Sheridan Ross P.C.

(57) ABSTRACT

A system and methods are disclosed for an upper stage space launch vehicle that uses gases from the propellant tanks to power an internal combustion engine that produces mechanical power for driving other components including a generator for generation of electrical current for operating compressors and fluid pumps and for charging batteries. These components and others comprise a thermodynamic system from which system enthalpy may be leveraged by extracting and moving heat to increase the efficient use of propellant and the longevity and performance of the launch vehicle.

19 Claims, 27 Drawing Sheets

Related U.S. Application Data

No. 15/795,675, filed on Oct. 27, 2017, now Pat. No. 10,718,294.

(51) Int. Cl.
*F02K 9/50* (2006.01)
*F02K 9/60* (2006.01)

(56) References Cited

U.S. PATENT DOCUMENTS

| | | | |
|---|---|---|---|
| 3,417,563 | A | 12/1968 | Loprete |
| 3,572,297 | A | 3/1971 | Murray |
| 3,978,660 | A | 9/1976 | Laing |
| 4,326,491 | A | 4/1982 | Burchett |
| 4,403,153 | A | 9/1983 | Vallon |
| 4,413,795 | A | 11/1983 | Ryan |
| 4,442,801 | A | 4/1984 | Glynn et al. |
| 4,520,767 | A | 6/1985 | Roettgen et al. |
| 4,898,342 | A | 2/1990 | Kranz et al. |
| 4,945,811 | A | 8/1990 | Grieb |
| 4,964,593 | A | 10/1990 | Kranz |
| 4,995,234 | A | 2/1991 | Kooy et al. |
| 5,123,611 | A | 6/1992 | Morgand |
| 5,282,357 | A | 2/1994 | Sackheim |
| 5,315,158 | A | 5/1994 | Danielson |
| 5,435,274 | A | 7/1995 | Richardson, Jr. |
| 5,437,250 | A | 8/1995 | Rabinovich et al. |
| 5,692,459 | A | 12/1997 | Richardson, Jr. |
| 5,826,548 | A | 10/1998 | Richardson, Jr. |
| 5,899,175 | A | 5/1999 | Manikowski, Jr. et al. |
| 6,135,393 | A | 10/2000 | Sackheim et al. |
| 6,136,418 | A | 10/2000 | Martin et al. |
| 6,267,326 | B1 | 7/2001 | Smith et al. |
| 6,584,778 | B1 | 7/2003 | Griffiths et al. |
| 6,769,242 | B1 | 8/2004 | Balepin |
| 6,787,258 | B2 | 9/2004 | Prerad |
| 6,804,950 | B2 | 10/2004 | Kong et al. |
| 6,817,182 | B2 | 11/2004 | Clawson |
| 7,418,814 | B1 | 9/2008 | Greene |
| 7,431,237 | B1 | 10/2008 | Mock et al. |
| 7,540,143 | B1 | 6/2009 | Greene |
| 7,552,702 | B2 | 6/2009 | Stone |
| 7,784,268 | B1 | 8/2010 | Greason et al. |
| 7,784,269 | B1 | 8/2010 | Greason et al. |
| 7,854,395 | B1 | 12/2010 | Jones et al. |
| 7,900,435 | B1 | 3/2011 | Greason et al. |
| 8,341,933 | B2 | 1/2013 | Greason et al. |
| 8,430,361 | B2 * | 4/2013 | Raymond ............... F02K 9/46 60/260 |
| 8,568,111 | B2 | 10/2013 | Knoop |
| 8,884,202 | B2 | 11/2014 | Zegler |
| 8,931,459 | B2 * | 1/2015 | Sotiriades ............ F16K 11/044 137/589 |
| 9,353,687 | B1 | 5/2016 | Brostmeyer et al. |
| 9,850,008 | B2 | 12/2017 | Zegler |
| 10,717,550 | B1 | 7/2020 | Zegler |
| 10,718,294 | B1 | 7/2020 | Zegler |
| 11,261,828 | B1 | 3/2022 | Zegler |
| 2002/0100836 | A1 | 8/2002 | Hunt |
| 2005/0252214 | A1 | 11/2005 | Goldmeer et al. |
| 2009/0000575 | A1 | 1/2009 | Shimada et al. |
| 2010/0252686 | A1 * | 10/2010 | Raymond ............... F02K 9/46 244/172.2 |
| 2015/0060604 | A1 * | 3/2015 | Zegler .................. B64G 1/402 244/171.1 |
| 2016/0169159 | A1 * | 6/2016 | Roz ........................ F02K 9/605 60/726 |
| 2016/0195039 | A1 | 7/2016 | Danguy et al. |

OTHER PUBLICATIONS

"Redstone A-7 Rocket Engine Turbopump," This is Redstone, Jul. 2017, Heroicrelics.org, retrieved from https://web.archive.org/web/20170725184811/http://heroicrelics.org/info/redstone/a-7-turbopump.html, 3 pages.

"Rocketdyne Mark 3 Turbopump," Heroicrelics.org, Jul. 2017, retrieved from https://web.archive.org/web/20170725184811/http://heroicrelics.org/info/h-1/mark-3-turbopump.html, 6 pages.

"Wankel engine," Wikipedia, printed Jul. 22, 2009, from http://en.wikipedia.org/wiki/Wankel_engine, 14 pages.

Morgan et al. "Development of a Hydrogen-Oxygen Internal Combustion Engine Space Power System," Prepared under Contract No. NAS 3-2787 by Vickers, Inc. Detroit Mich. For NASA, Jul. 1965, 204 pages.

Notice of Allowance for U.S. Appl. No. 13/044,382, dated Jul. 2, 2014, 11 pages.

Official Action for U.S. Appl. No. 14/506,086, dated Jun. 22, 2017, 16 pages.

Notice of Allowance for U.S. Appl. No. 14/506,086, dated Oct. 18, 2017, 7 pages.

Official Action for U.S. Appl. No. 15/795,724, dated Nov. 7, 2019 16 pages.

Notice of Allowance for U.S. Appl. No. 15/795,724, dated Mar. 31, 2020 9 pages.

Official Action for U.S. Appl. No. 15/795,675, dated Sep. 20, 2019 23 pages.

Notice of Allowance for U.S. Appl. No. 15/795,675, dated Jan. 15, 2020 7 pages.

Notice of Allowance for U.S. Appl. No. 15/795,675, dated Mar. 9, 2020 7 pages.

Official Action for U.S. Appl. No. 16/111,623, dated Apr. 19, 2021 16 pages.

Official Action for U.S. Appl. No. 17/683,014, dated Oct. 26, 2022 14 pages.

Official Action for U.S. Appl. No. 18/133,111, dated Nov. 21, 2023 23 pages.

Notice of Allowance for U.S. Appl. No. 18/133,134, dated Jan. 5, 2024 13 pages.

* cited by examiner

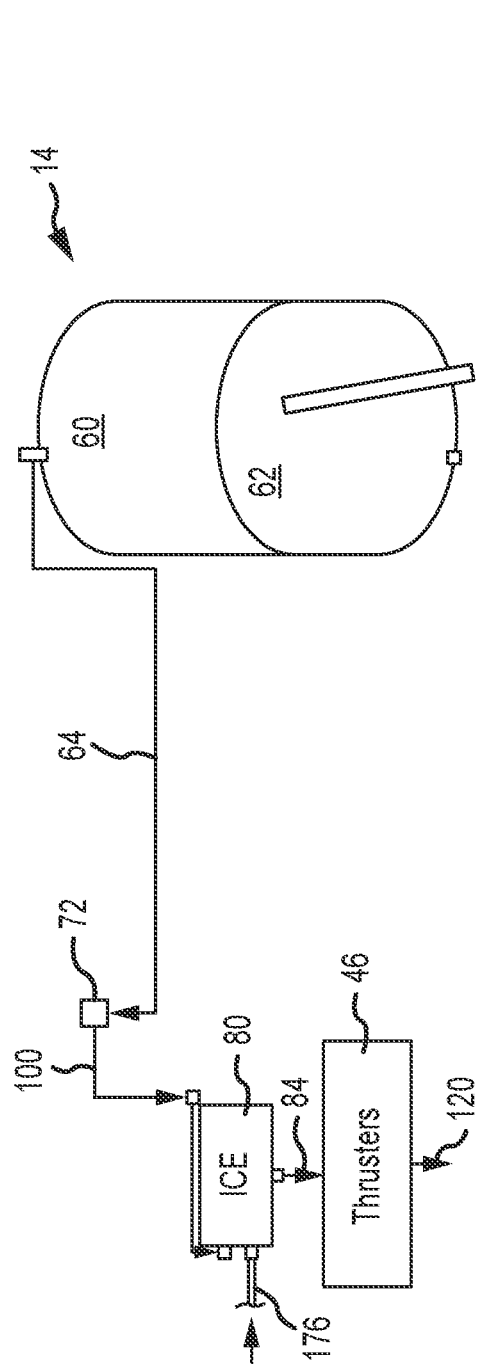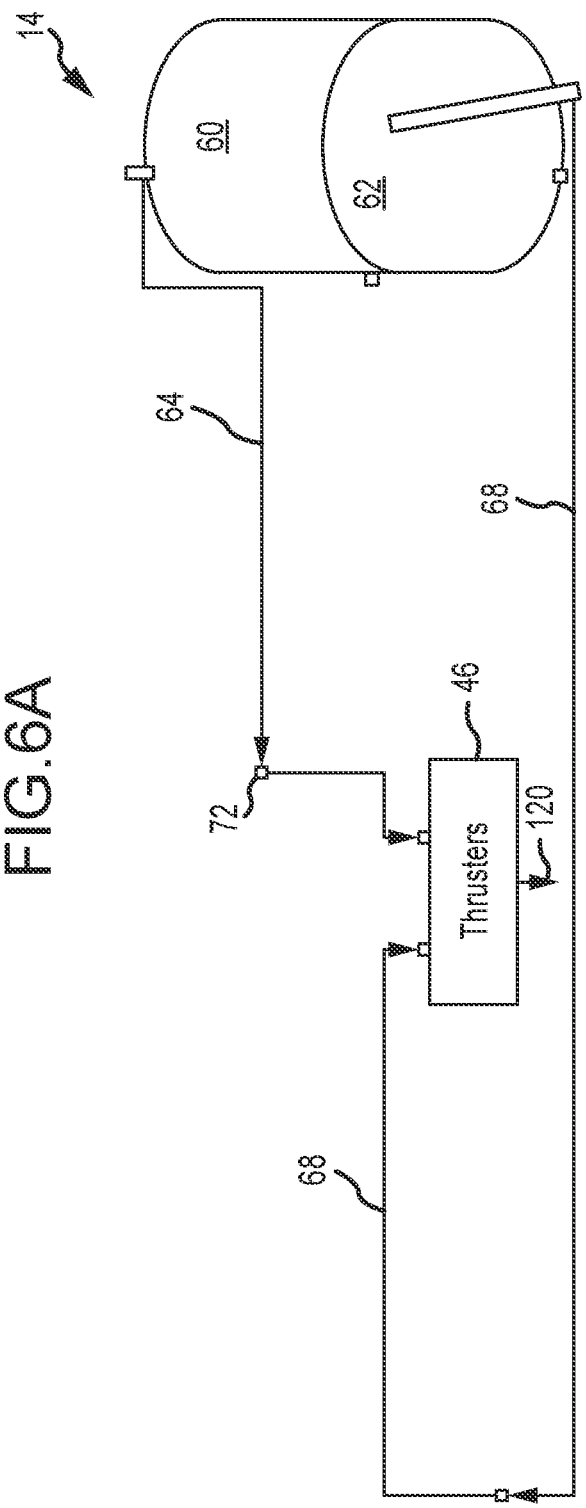

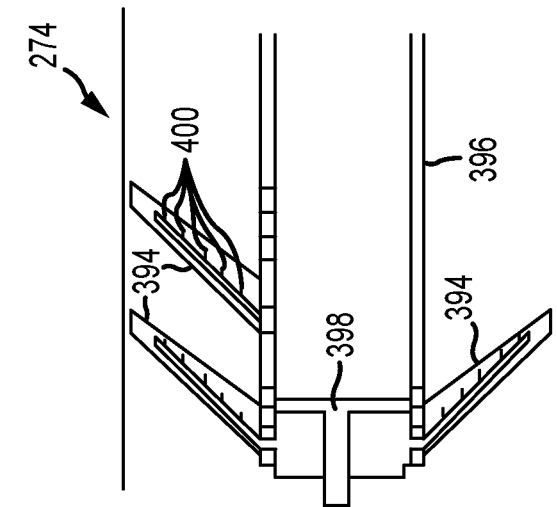
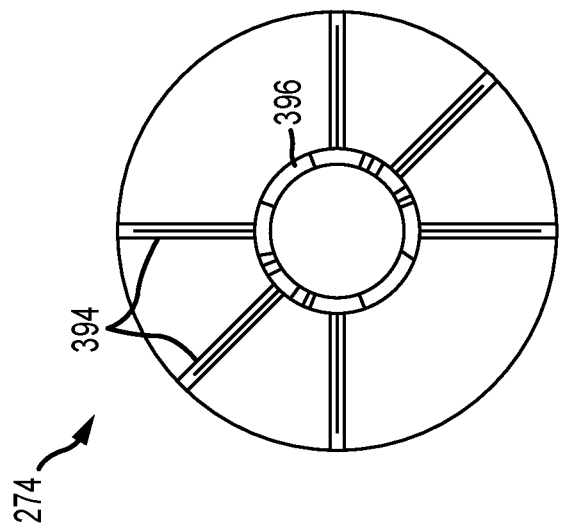

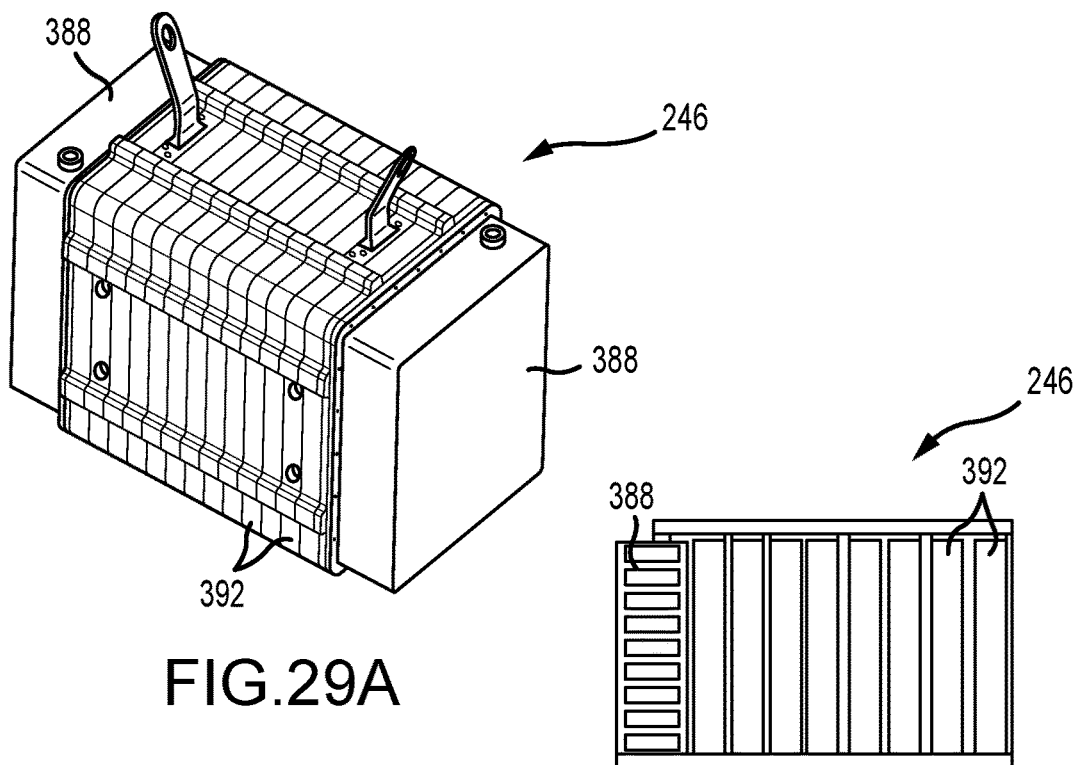
FIG.29A
FIG.29B
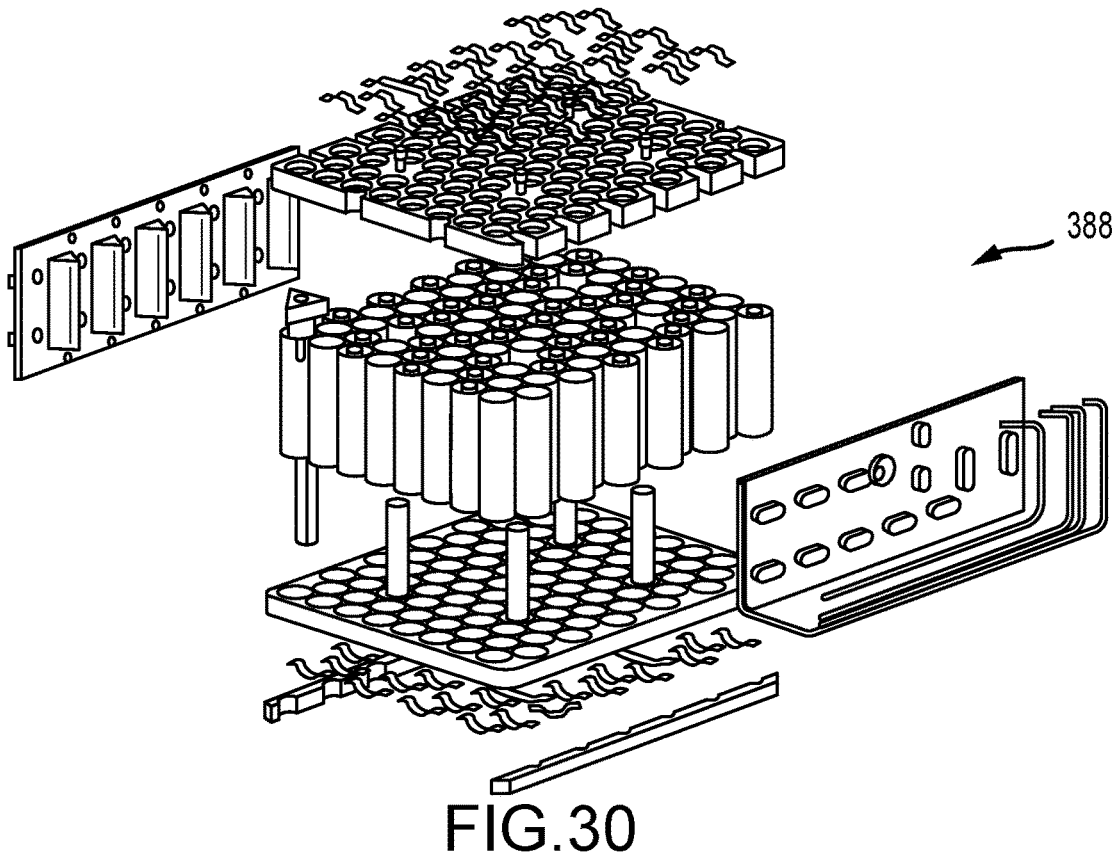
FIG.30

INTEGRATED VEHICLE FLUIDS FOR UPPER STAGE LAUNCH VEHICLE WITH INTERNAL COMBUSTION ENGINE

CROSS-REFERENCE TO RELATED APPLICATION

This application is a continuation of U.S. patent application Ser. No. 17/683,014 filed on Feb. 28, 2022, which is a continuation of U.S. application Ser. No. 16/111,623 filed on Aug. 24, 2018, now U.S. Pat. No. 11,261,828, which is a continuation of U.S. application Ser. No. 15/795,675, filed on Oct. 27, 2017, now U.S. Pat. No. 10,718,294, the entire disclosures of which are incorporated herein by reference in their entireties.

FIELD OF THE INVENTION

The invention generally relates to rocket propulsion systems for space launch vehicles placed and maintained in planetary orbits. More specifically, the invention relates to systems and methods for propelling and powering an upper stage of a space launch vehicle by using ullage gases generated by the propellants to generate power by an internal combustion engine. The power generated by the internal combustion engine replaces power and reaction control systems traditionally powered by separate hydrazine systems and batteries, and eliminates the need for separate systems used for pressurizing the main propellant tanks, such as helium-based systems.

BACKGROUND OF THE INVENTION

There are increasing demands to lower the cost of space transport to geostationary and other orbits as well as perform missions which are simply not possible with existing launchers such as manned exploration of the moon and Mars. Implicit is the demand that reliability be enhanced and certainly not degraded. Unspoken but also implicit is that commercially viable launchers must fill this broad range of demands since single-purpose launchers such as the Saturn rocket or Space Shuttle are cost prohibitive, even for governments with substantial space budgets. The commercial launchers presently being used for most missions are the result of decades of evolution and have become highly refined and proven. Each individual system on the launchers has been raised to a high level of performance which is very difficult to improve upon, even with large investments in engineering development. Since only incremental improvements can be expected by addressing individual systems, there is a need to view space vehicle systems in a more broad sense to determine if substantial improvements can be accomplished.

One example of a high performance, highly evolved upper stage is the Centaur®. The Centaur® upper stage is capable of delivering payloads to nearly any orbit from Low earth Orbit to interplanetary trajectories. The Centaur® is capable of delivering a high energy to the payload by burning liquid hydrogen ($LH_2$) and liquid oxygen ($LO_2$) in a very high efficiency, low weight engine such as the RL10. The total mass of the Centaur when empty is less than 2.5 mt, yet it can contain in excess 20 mt of propellant. Propellants are stored in lightweight stainless steel tanks whose structural rigidity is provided primarily by the pressure of the propellants within the tank. In order to keep the tanks from collapsing prior to the loading of propellant, the tanks are pressurized with gas. In the Centaur®, a common double bulkhead is used to separate the $LO_2$ and $LH_2$ tanks. The two stainless steel containers are separated by a very thin layer of insulator which is contained within a hermetic cavity. Therefore, the appearance is of a single tank, but it is divided into the separate $LO_2$ and $LH_2$ tanks with an intermediate vacuum cavity. The extreme cold of the liquid hydrogen on one side of the bulk head creates a vacuum within the intermediate cavity. The insulator prevents the two metal bulkheads from contacting thereby maintaining a low thermal conductivity, thus preventing heat transfer from the comparatively warm $LO_2$ to the super cold $LH_2$. The exterior of the tanks are also insulated to suppress heat flows from the external environment to the propellants.

While on the ground and filled with propellants, the tank pressures are controlled by valving which maintains the tanks within a specific pressure band. The propellants within the tanks boil due to external heating and the vapor formed is passed through these regulating valves which hold the tank internal pressure within band regardless of the heating and attendant boil off vapor mass flow. By controlling the tank pressure at which the propellants boil, their saturation conditions are established. For the sake of maximizing the density of the propellants and hence reducing the size of the vehicle tanks, the pressures and temperatures are kept as low as possible within the tanks. These vent valves are thus precision cryogenic regulators that are complex, costly and heavy.

While on the ground, loads imparted to the vehicle are quite low, and the stiffening effects of the low internal pressures controlled by vent valves are sufficient to maintain structural integrity of the vehicle. However, during the ascent phase of flight and also prior to operation of the upper stage engines, the pressures within the vehicle tanks must be raised. In the case of ascent, the vehicle must be further stiffened so that it can survive the very high bending and compressive loads generated by aerodynamic, thrust and inertial effects. Pressures are raised prior to engine start to permit the proper operation of the engine pumps. These high capacity pumps must receive propellants whose pressure is substantially above their saturation pressure. This saturation pressure was effectively set prior to liftoff by the valving controlling tank pressures. Without system pressure maintained above saturation pressure, the propellants would boil within the pumps and they would cease to function properly. This margin is commonly referred to as Net Positive Suction Pressure (NPSP) and is commonly on the order of 3-10 psi.

In most modern upper stage vehicles, these pressurization demands are met by introducing gaseous helium into the ullage spaces of the propellant tanks. This helium is stored in separate vessels, typically at high pressure, and is delivered via valves to the propellant tanks at need. Helium is used since it has a low density, is chemically inert, and does not condense to a liquid at the cryogenic temperatures seen in the LO2 and LH2 tanks. Hence it can be used to pressurize both the LO2 and LH2 tanks with a mass penalty. Once the upper stage engines are operating, it is possible to perform the pressurization task by bleeding small amounts of warm H2 and O2 gases from the engine. This reduces the amount of helium required for the mission. The amount of helium required is thus dictated by the size of the propellant tanks, their pressure and the number of burns which are expected to be performed. The mass of the hardware required to contain this helium is very significant and many approaches have been taken to suppress system complexity and weight. However even the most advanced existing systems have strict limitations on their capabilities. These systems all have a limited amount of GHe and hence the number of engine burns, tank size, and other factors are all limited. Even a small leak of helium from the storage systems can result in a catastrophic loss of pressurant and hence mission failure.

During flight the upper stage propellant tanks will continue to absorb energy from the environment, albeit at a lower rate than what was present prior to launch. During engine burns, elevated tank pressures are maintained with GHe, gaseous O2 or H2 to establish and maintain sufficient NPSP and hence will end up at the end of a burn at a tank pressure above the saturation condition of the propellants. As heat is applied to the liquid propellants, they will gradually increase in temperature until their saturation pressure matches the partial pressure of H2 or O2 in the ullage gas. At this point, the propellants begin to boil. Tank pressures rise as the boil-off continues. If no action is taken prior to the next start of the engines, the system must be pressurized above this new higher pressure. The incremental increases in tank pressures therefore directly drive the peak operating pressures of the tanks, and hence their mass. Therefore, tank designs may have to account for much higher pressures, such as a 60 psia capability, which results in a substantial mass penalty.

To mitigate this pressure building effect on missions lasting more than a few minutes, it is common to vent the pressure in the ullage space to a level close to the original saturation pressure. Especially on the $LH_2$ tank, during a mission to geostationary orbit, this venting may be performed multiple times. The energy absorbed from the environment is stored in the enthalpy of the ullage gases which therefore must be subsequently dumped overboard.

A significant limiting factor for all missions in space is accounting for the ullage losses associated with the continual boil off of cryogens. It is this propellant loss that has prevented to date the use of cryogenic propulsion systems for missions to the moon or indeed any mission with a duration that is much longer than one day. One of the most effective approaches for reducing losses is to apply a very low thrust to settle the propellants within the tanks to fixed locations, generally towards the aft end of their respective tanks. Less than a thousandth of one G is required to achieve this effect. Settling thrust segregates the liquid and gaseous phases of each propellant. Cold liquid propellant is thus physically separated from much warmer gas by the settling thrust. The quiescent gaseous ullage, in a microgravity environment without significant convection, then behaves as an excellent insulator and blocks heat from entering the liquid propellant surfaces. Heat is conducted down the side walls from the warm ullage side of the tank to the cold liquid side but this is inhibited by the relatively long conductive distances, reduced thermal conductivity due to the cryogenic operating temperatures and low wall thicknesses. Naturally the thinner these walls are the better. Thus it can be seen that a tank with a low gage and hence low allowable operating pressure is also thermally superior. All of these effects conspire to slow boil off when settling is imposed.

Settling thrust is typically provided by one or more small rockets fueled by hydrazine. On the Saturn S-IVB stage, the ullage gases were burned in a small thruster to maintain vehicle settling and some of the heat of the burning H2 and O2 was used to warm cold helium up for use in the pressurization system. Other vehicles such as the Delta Cryogenic Second Stage simply vent the boil-off gas aft to produce a small amount of settling thrust during long duration missions. Most often though, these waste ullage gases are simply dumped. Depending on vehicle design and mission duration, these wasted propellants can weigh into the hundreds of pounds. Naturally, the amount of time that a hydrazine system can support settling is strictly limited by the amount of propellant that it contains. Despite the best conservation efforts, hydrazine-based settling can at best be sustained for a handful of hours. Once settling is lost the surface tension effects within the propellants will gradually cause the interior of the propellant tanks to be fully wetted, temperature segregation will be lost and boil off rates can triple.

The vehicle must also provide a means for changing its attitude, and this function is also typically done with a hydrazine fueled thruster system. On the Centaur® vehicle, the attitude control thrusters and settling thrusters share a common supply system. While the settling function consumes the vast majority of hydrazine capacity, the attitude control task cannot be ignored. Settling thrusters can be commanded off, but the vehicle attitude must be stabilized for various reasons to include (i) maintaining radio links to the ground, (ii) providing an optimal attitude relative to the sun so that components such as avionics do not get too hot or cold, and (ii) suppressing heating of the main propellant tanks. Even if settling is eliminated, the attitude control function alone can consume hundreds of pounds of propellant over the course of a multiday mission. This propellant requirement is insupportable by most commercial upper stage launch vehicles.

Regarding the use of hydrazine as a propellant, while its application to space vehicles is widespread, there are a number of problems associated with its use. Hydrazine is a highly toxic, highly corrosive fluid that is compatible with only a handful of materials. Handling hydrazine requires hazardous procedure precautions, often requiring the use of positive-internal pressure inflatable SCAPE (Self Contained Atmospheric Protective Ensemble) suits to protect technicians loading a vehicle. Hydrazine can only be used in a narrow band of temperatures near room temperature. Hence, elaborate thermal control measures including heaters are mandatory, thus burdening the electrical storage system and exacerbating propellant heating. Hydrazine is also quite costly. Hydrazine is also a very inefficient fuel, delivering only a miserly specific impulse of 235 seconds. The advantages of Hydrazine are that as a fuel, it is simple and reliable to use assuming the appropriate environmental conditions can be maintained during its storage and delivery to a reaction chamber. Hydrazine is catalytically decomposed in a simple reaction chamber and does not require an ignition system or even an oxidizer. Nevertheless, the continued use of hydrazine sets harsh boundaries on improving overall vehicle operations and costs.

The electrical systems on the upper stage currently use large electrochemical batteries to provide power. This battery technology has evolved over decades to favor batteries of increasing power density and attendant sophistication. The desire to provide redundancy has doubled the storage demand. Even with the best modern technology, these batteries are extremely heavy, costly and can only supply enough power for less than a day's operation of a vehicle such as a Centaur®. Without a means to recharge these batteries, they set a strict limit on mission duration. Unfortunately the two common sources of power for recharge are solar panels and fuel cells, and these systems are both very costly to incorporate on a vehicle. Use of solar panels requires vehicle orientation control relative to the sun, and are physically bulky with complex deployment mechanisms. Most spacecraft that use solar panels are effectively in zero-G conditions, and hence large deployed solar panels are never exposed to high loads. A vehicle like Centaur® will generate acceleration forces in excess of 2 G's, and hence the mounting system for even a small solar array would be very heavy.

Fuel cells, while being more compact than batteries and are efficient and seemingly simple, are quite costly and complex to operate and support due to their intolerance of inert gases within the reactant streams and due to the necessity to dispose of the water they produce. To date, only manned vehicles such as the space shuttle can justify their cost and complexity.

While cost reduction, increased simplicity and reliability are primary goals in an improved vehicle, there is also an increasing need to expand mission capabilities beyond merely moving heavier payloads. Current missions are performed over a maximum flight duration of less than a day. However if the vehicle could efficiently fly for longer, it would be extremely valuable. Missions such as those to the moon require coast durations measured in days. The increasing amount of space junk in orbit will soon require the deliberate disposal of not only obsolete satellites but also the stages which placed them in orbit. This disposal activity at present would impose large performance penalties which would drastically increase the cost to orbit. However by performing disposal maneuvers at optimal times, this function can be accomplished with a minimum of cost. Missions such as space junk removal require a vehicle be capable of flying for days to weeks. In summary if one wishes to improve vehicle system performance and cost, yet expand the mission duration and improve reliability, a broader view of the vehicle must be taken to include a simultaneous analysis of vehicle thermodynamics, power, propellant and pressurant storage limitations, vehicle structural and thermal interactions, and the demands of widely varying missions. While it may be possible to redesign vehicle systems on a micro level, that is, to redesign selected systems based on specific mission requirements, this design approach inevitably compromises the majority of missions and can also create a proliferation of system designs that are all slightly different and likely incompatible. This micro level design solution is the origin of the present state of most space vehicle capabilities.

The use of waste ullage gas was recognized in the 1960's as a potential source of fuel for an auxiliary engine on the Saturn S-IVB. NASA recognized that these ullage gases could be captured and reused within an internal combustion engine that could be used to provide power for the upper stage vehicle. Although this recycling or reuse of the ullage gases was recognized development stalled with the proof of concept of a H2/O2 burning internal combustion engine. The concept was never flown.

There are a number of examples of improvements made to rocket propulsion systems in order to increase main engine propulsion efficiency, or to simplify the components of a launch vehicle, with one intent being increasing the available payload of the vehicle.

One example of such a reference is the U.S. Pat. No. 5,282,357 for a high-performance dual-mode integral propulsion system. This reference discloses a propulsion system in which pure hydrazine is used as the fuel for both a bi-propellant rocket engine for high thrust performance and in multiple mono-propellant thrusters for station keeping and attitude control functions. The use of the common fuel for both modes of operation significantly reduces propellant weight and inert propulsion system weight. For station keeping, the mono propellant thrusters can be augmented in performance by employing either electrothermal or additional direct chemical energy, arc jet operation, or force fuel acceleration to provide increased specific impulse values.

The U.S. Pat. No. 6,135,393 provides a spacecraft attitude and velocity control thruster system that incorporates mono-propellant RCS thrusters for attitude control and bi-propellant scat thrusters for velocity control. Both sets of thrusters are designed to use the same liquid fuel, supplied by a pressurized non-pressure regulated tank, and operate in a blow down mode. In the propulsion system, such station keeping and attitude control thrusters may function in conjunction with a large thrust apogee kick engine that uses the same propellant fuel. Hydrazine and bi-nitrogen tetroxide are preferred as the fuel and oxidizer, respectfully.

Despite improvements in general rocket technology, to include increasing the efficiencies of rocket engines and components, there is still a need to provide even greater efficiencies, and to simplify space launch vehicle systems while carrying larger payloads over longer durations.

SUMMARY OF THE INVENTION

In accordance with aspects of the present disclosure, a system, methods and sub-systems or sub-combinations are provided to supply all required vehicle functions including attitude control, propellant settling, propellant tank pressurization control, hardware actuation and purging and power generation without the need for any fluids other than the primary propellants present in the main vehicle tanks. For simplicity, LO2 and $LH_2$ will be described herein as the primary propellants. However, it should be appreciated that other liquid propellants may be substituted. For example, according to aspects of the present disclosure, the oxygen and/or hydrogen may be replaced with methane, kerosene, nitrogen tetroxide, hydrazine, hydrogen peroxide, nitrous oxide, etc. The system thus has a capability to perform these functions without any limits other than the mass of the primary vehicle propellants. The overall system can be referred to as an integrated vehicle fluid (IVF) module that provides these functions. The waste or ullage gases from the hydrogen and oxygen tanks that are typically vented overboard, are used as the fuel and oxidizer to run an internal combustion engine to provide power for other vehicle functions. The power output shaft from at least one engine can be used to drive a number of secondary devices to include one or more generators that generate electrical energy for storage in one or more small batteries. Power from the shaft is also used in other secondary devices such as one or more pumps to modulate and regulate fluid pressures in the vehicle, to include most importantly, pressures in the LO2 and LH2 tanks. Alternatively or additionally, power from the batteries may be used to drive the various components.

In a first exemplary embodiment, the IVF module has one or more pumps that move a substantially liquid propellant using mechanical work and that generate a large pressure differential to operate various components, including accumulators. The one or more pumps circulate the propellant through heat exchangers that transfer heat directly from thrusters to the propellant. Similarly, propellant such as hydrogen gas is circulated around the internal combustion engine to transfer heat directly from the internal combustion engine to the hydrogen gas, which is then fed into the internal combustion engine.

In a second exemplary embodiment, the IVF module has one or more pumps that move a substantially gaseous propellant using mechanical work and that generate a small pressure differential. A separate coolant loop scavenges heat from various components of the IVF module and transfers heat to the propellants through heat exchangers. Aspects of these two embodiments are described in more detail below. It will be appreciated that these embodiments are exemplary in nature and that one aspect from one embodiment could apply to the other embodiment, or any other embodiment. For instance, the type of engine used in one embodiment could be used in the other embodiment.

Regarding the first exemplary embodiment, one or more internal combustion engines (ICE) can be one of many selected types of engines to include a piston engine or a Wankel engine. This engine burns the gaseous hydrogen (GH2) and gaseous oxygen (GO2) from the upper stage propellant tanks. The GH2 is introduced into the engine through a flow control valve that throttles the mass flow of the GH2. Before the GH2 enters the engine for combustion purposes, the hydrogen is used to cool the exterior of the engine, maintain pressure in the crank case, and cool the internal chamber of the engine. The GO2 is injected either into the hydrogen before or at the intake port or directly into the engine combustion chamber at an elevated pressure, similar to fuel injection in a diesel engine. In circumstances when the space vehicle requires additional power output from the engine, it is also contemplated that $LH_2$ can be mixed with the GH2 bled from the hydrogen tank to temporarily feed the engine. This additional cold fluid enables greater cooling capacity for the engine and increases the H2 density within the combustion chamber thus allowing more O2 to be introduced and hence more energy released. This mixing can be modulated by an intake control valve. Under most circumstances, however, the ullage hydrogen is all that is required to power the engine in order to provide sustained power for all upper stage systems.

In another important aspect of embodiments of the present disclosure, the exhaust from an internal combustion engine, composed primarily of high temperature hydrogen rich gas, is used to power one or more of the settling thrusters with a very high efficiency of thrust generation, as discussed further below. Therefore, the hydrogen ullage gas undergoes a single recycling use through the engine. Either a piston engine, Wankel engine, or turbine engine is contemplated for use in the present invention. As compared to a piston engine, a Wankel engine has no intake or exhaust valves, has fewer moving and lubricated parts, a very simple crank system, and is a dynamically balanced engine due to its symmetrical disposition with respect to the movement of the rotor. Because of this simplicity the engine is very light. The three chamber configuration of the rotary engine has distinct hot and cold areas that can enable very simple gas cooling, yet may achieve higher exhaust gas temperatures that can be used as the exhaust gas for the settling thrusters.

Regardless of the type of engine used, because of the limitations on combustion physics and materials, the engine preferably operates at a very low mixture ratio between 0.6 and 2. This range precisely matches the boil off characteristics of the vehicle which often generates more H2 than O2. Hence the engine more effectively uses the waste gases from the vehicle. According to some embodiments of the present disclosure, to accomplish all known vehicle functions requires a total shaft power of less than 10 kW and more commonly less than 2 kW. This allows the engine to be only moderately efficient and with a very small displacement on the order of 200 cc. High exhaust pressures can be tolerated by the engine, (such as in the range of 10-20 psia) which enables at least a 5-10 psia thruster chamber pressure in the settling thrusters by simply direct venting from the engine exhaust into the receiving chamber to the thrusters, without any further pressurization requirements. Settling thrust thereby generated is in the precise band to provide continuous low G forces. With respect to generation of electrical power, a very simple yet effective electric power generation is achieved by an electric starter/generator that is driven by the output shaft of an engine. The starter/generator generates electrical current for storage in one or more rechargeable batteries. For example, a combination or array of multiple lithium ion batteries may comprise a single battery pack. The starter/generator, associated electronics and the battery pack may also be cooled with hydrogen flowing through the IVF module. The battery pack can then provide electrical power for all the other upper stage systems, as well as power for pressurization pumps to pressurize the propellant tanks. The battery pack maintains a minimum charge and will discharge during peak loading conditions. The battery pack is easily recharged during vehicle coasts in which power loading is reduced since system duty cycle for lateral thrusters and pressurization is low during this period. By inclusion of the battery, this removes many restrictions on peak power and total available energy that were an inherent concern for prior space launch vehicles that solely relied upon battery power for many functions. The battery pack can be less than 5% of the capacity of present batteries with a proportional reduction in mass and volume. The drastic reduction enables the use of less exotic, lower power density battery designs without significant mass penalty but with large cost benefits.

The starter/generator permits the repeated startup and shutdown of the IC engine as required for ground testing and flight operations. If desired, the engine can be shut down for extended periods and all vehicle power provided by the vehicle battery pack. Settling can continue to be supported without the operation of the IC engine and hence low-boil off, settled thermodynamic conditions can be maintained for even longer periods. When the batteries have been discharged to their low limit the IC engine can be restarted and the system loads transferred effectively to the generator which simultaneously recharges the battery pack. In a preferred embodiment the starter and generator functions are performed by a single electromechanical device.

In a preferred embodiment, the IVF system performs the function of ground venting of the main propellant tanks via a ground vent valve. These valves are connected to the airborne system via disconnects which actuate once the vehicle has achieved liftoff. Because the ground valves are not restricted in mass, their regulation capability is far more precise and stable than a mass and volume restricted airborne valve. Their flow capacity is also far higher and hence higher heating rates or lower tank pressures can be readily accommodated. Since the high heating rates requiring these valves are not present during flight, the lower capacity airborne systems are used once the vehicle is placed in the vacuum of space.

One important aspect of embodiments of the invention is that the launch vehicle can operate for long settled periods with thrust supplied only from the ullage gases. This sustained vehicle settling drastically reduces propellant losses in the tanks. Empirical testing has shown that boil off can be reduced to less than a third of normal losses. Unlike hydrazine based systems, this settling capability is generated by fluids that would typically have been merely dumped.

According to aspects of the present disclosure, multiple levels and sources of settling thrust are provided and integrate the airborne main tank vent function into the settling thrusters. Ultra-low forces can be generated by simply venting cold GH2 gases though the settling thruster. This also accomplishes the venting of the main $LH_2$ tank during flight described in the background. Because this is accomplished with multiple axial thrusters, the vent rate can be modulated and there are redundant valves to enable this critical function. Thus a rapid tank vent can be accomplished without the need for dedicated vent valves as is the requirement with presently known vehicles. These vent events produce axial thrust which helps further settle the vehicle, and by modulating the axial thrusters, the vehicle attitude can be maintained by the guidance system. The need for precisely balanced vent systems as required in known vehicles is thus eliminated.

Although a rapid tank vent can be commanded, it may be more effective to simply burn off the excess ullage. Low thrust for sustained coast settling, (such as in the range between about 0.5. to 2 lbf) may be provided directly by the hydrogen rich ICE exhaust gas fed to the axial thrusters. Since the hydrogen fed to the ICE is supplied by the tank ullage, this gradually consumes the H2 ullage gas which would have to be vented in any event to reduce tank pressure. According to aspects of the present disclosure, combinations of direct H2 tank syphoning and ICE hydrogen burn off can be executed as required by mission needs, external heating requirements, or power demands. In nearly every case except direct venting of cold gas, the specific impulse of these settling thrusters are at least 50% higher than for existing hydrazine thrusters thereby providing a powerful performance enhancement.

Greater thrust and gradual LO2 tank vent down is obtained from the axial thrusters by adding GO2 to the ICE exhaust gases at the axial thrusters or in the exhaust lines leading to them thereby increasing the energy release. According to embodiments of the present disclosure, by adding GO2 to the ICE exhaust, a demand for GO2 is created from the accumulator which during a coast phase is replenished from the LO2 tank ullage. Thus in addition to direct venting of the LO2 tank through an axial thruster, excess GO2 is effectively burned off via the axial settler.

High axial thrust (4-25 lbf) and simultaneous LH2 and LO2 tank vent down may be obtained by adding further GH2 from the ullage to the ICE exhaust stream as well as adding GO2. This mode is effectively the highest rate of tank venting while generating peak axial thrust. This mode may be used during the highest settling demand periods immediately prior to and after main engine operation.

The ability to allow tank pressures to be reduced while taking full advantage of the vented gas allows efficient re-saturation of the liquid propellants at lower pressures. Since tank pressures are not allowed to rise uncontrolled, design pressures can be reduced on the vehicle main tanks. As described, this design pressure reduction has a profound positive effect on vehicle tank mass and its overall thermal efficiency. Both of these factors amplify the performance benefits of the IVF system.

According to some aspects of the present disclosure, the lateral thrusters are supplied from small accumulators which are held by a control system at a low pressure (approximately 200-500 psia) and near-ambient temperature. These thrusters burn H2 and O2 at a moderate mixture ratio between 1 and 4. The inlet mixture ratio is bounded by the temperature and pressure limits imposed on the storage accumulators. Because of this the high performance inherent (a specific impulse in excess of 350 seconds) in a H2/O2 thruster is obtained without need to bring cryogenic liquids and maintain them in thermodynamic stasis at each thruster inlet valve. In addition the seals, seats and other soft goods are not exposed to cryogenic conditions and hence are simpler, more reliable and less prone to leakage. Regenerative cooling of the thruster combustion chamber enables the total deletion of high temperature alloys and complex assembly methods from the thruster.

In some embodiments, the lateral thrusters can operate in two modes. The first is the standard combustion mode whereby H2 and 02 are ignited within the thruster to produce on the order of 10-35 lbf of thrust. In each axis there are twin redundant thrusters so two levels of force are immediately available. The thrusters can also be operated in cold gas mode by only commanding a H2 inlet valve open. This provides a capability to produce very small impulses using a low-temperature and non-condensable exhaust. Precision vehicle maneuver in close proximity to other vehicles becomes straightforward without the threat of high temperature plumes either damaging or contaminating sensitive radiation shielding or other elements of the vehicle being docked.

According to some aspects of the present disclosure, the IVF module may include two small accumulators for containing GO2 and GH2. These accumulators are periodically replenished from either the gaseous ullage or from the liquid propellants in the vehicle tanks. Whenever the main upper stage engines are operating, GH2 and/or LO2 can be bled from the main engine pumps. During coast phases when the engines are not operating low pressure fluids from the main propellant tanks (either gaseous or liquid) are pumped up to an accumulator pressure of between 200 and 500 psia with small pumps which are driven through clutches or via electric motors by the internal combustion engine. Fluids exiting the main engine bleeds or the IVF pumps may be quite cold and might require warming prior to storage in the accumulators. This is accomplished by warming them in heat exchangers which are part of the exhaust system of the internal combustion engine and the downstream axial thrusters. The temperature of these gases is controlled by either simple mechanical thermostatic devices or via sensors and active computer control. These control devices modulate the amount of heat which is added to the cold gases exiting the pumps to achieve a steady temperature of gas delivered to the accumulators. Gases stored in the accumulators are thus stabilized within a narrow pressure and temperature band which is close to room temperature.

During low duty cycle periods the accumulators are replenished via the IVF pumps using ullage gas. This is typical of coast periods of a mission when the main engines are not operating and tank pressurization events are not occurring. This enables the best use of the waste boil off gases. Compression of gases though requires a larger expenditure of energy by the IC engine due to the larger enthalpy change associated with gaseous compression. This limits the total mass flow which can be supported by ullage gas compression. When ullage gases are flowing through the pumps, the need for heat addition from the IC engine exhaust and axial thrusters is low since much heating is accomplished simply by the heat of compression added in the IVF pump.

For high duty cycle periods when rapid and simultaneous pressurization of both hydrogen and oxygen tanks is required along with high settling thrust, the pumps consume liquid cryogens which are more efficient to compress and raise to accumulator pressure. These liquid cryogens require more heat addition from the axial thrusters but far larger mass flows can be supported by the IC engine power output. The use of liquid cryogens of course debits the vehicle main propellants and decreases the amount of LH2 and LO2 available to the main engines. The amount of liquid cryogens thus consumed however is compensated by the elimination of dry mass, hydrazine and helium from the vehicle. Effectively, these liquid propellants are converted to gaseous pressurants which are then later reused to generate power, settling and axial thrust.

The stabilization of the accumulator pressure and temperature simplifies the design of downstream devices such as the thrusters and pressurization valves. The thrusters can be operated with a narrow range of mixture ratios and thrust output since the inlet conditions are bounded. Similarly the pressurization valves can be sized to address only a restricted inlet density band unlike the situation with typical existing systems where valves must be capable of throttling inlet gases with a pressure band in the thousands of psi and temperature swings in the hundreds of degrees. The near-ambient storage conditions in the accumulators also enable the use of elastomeric and other materials in the construction of downstream valves and components. The combination of low pressure and ambient temperatures enables leakage of hydrogen and oxygen to be minimized with simple and reliable seats. The necessity for specialized, low-rate and hence costly cryogenic components is thus eliminated.

According to some aspects of the present disclosure, the oxygen and hydrogen pumps for the IVF module may be small, with displacements typically on the order of 1-10 cc in some embodiments. The pumps can either be driven with mechanical clutches off of the internal combustion engine shaft or be driven by motors supplied with electricity from the starter/generator/batteries. The pumps are commanded by the IVF controller to turn on whenever their respective accumulator reaches its low pressure limit or can be directly commanded whenever significant fluid loads are imminent.

In a fashion similar to the thrusters, according to some aspects of the present disclosure, the modules may contain valves whose function is to deliver warm GO2 and GH2 to the respective main propellant tank ullages for tank pressurization. These gases are bled from the IVF accumulators at need, typically immediately prior to upper stage engine start and during engine operation but also during booster ascent. The lines leading to the main tanks for pressurization are in one embodiment separate from the vent lines leading from those same ullage spaces to the intakes of the pumps and internal combustion engine. This prevents the ingestion of warm, high pressure gas into these devices which are optimized to induct the colder, lower pressure gas resident in the ullage spaces.

The mass of the ullage gases which remain inside the vehicle at the completion of the mission may also dramatically be reduced by the IVF module. According to aspects of the present disclosure, the hydrogen tank, pressurized with warm H2 from the accumulators, will have approximately half the mass as would be encountered in prior systems. This is due to the elimination of GHe (a heavier molecule than H2), the overall warmer temperature of the ullage, plus the reduction in the peak pressure required. The GO2 ullage is also considerably lighter due to the increased temperature and decreased pressure.

The IVF system also can supply gaseous H2 and O2 to actuate valves on the main vehicle and main engines. The propellant flow control systems on the vehicle are often actuated by medium pressure gaseous helium (GHe). Typically this gas enters into a piston in cylinder arrangement and the supplied pressure forces the piston to move which then actuates a ball, butterfly or poppet valve. The GHe is trapped in a dead-headed cavity adjacent to extremely cold liquid propellants. The gradual cooling of this actuation gas can adversely affect the opening and closing characteristics of the cryogenic valve. Venting the GHe causes the valve to then close. With the elimination of GHe from the vehicle, the IVF system provides either gaseous H2 or O2 as a replacement. Unlike in a GHe supplied system where the amount of gas is strictly limited, an IVF based system enables the actuation gas to be flowed through the valve actuator so that the temperature conditions within the valve actuation cavity remain stable over extended durations. The performance of the valve can be stabilized and control improved.

The IVF system can supply either one way or recirculating purges of either GH2 or GO2 to either prevent the ingress of external atmosphere into components on the vehicle, maintain stable temperature conditions at sensors or to thermally condition components such as avionics boxes, actuators, or to provide vapor cooling of structures. Vapor cooling is a technique whereby heat is blocked from moving down a structure by intercepting it with cold gas. Such techniques can drastically reduce heating in the main vehicle tanks and further extend flight operations by suppressing boil off. For example, a vapor retention device may be located at the junction of a propellant tank and the feed line where the liquid propellant exits the tank. The device has apertures that permit liquid propellant to exit the tank and restrict gaseous propellant from entering the tank through the feed line. In one instance, upon completion of an engine burn, the feed line between the tank and the engine is filled with liquid propellant. As the liquid furthest from the tank and closest to the engine warms, it transforms into a gas. The retention device at the port captures rising gas bubbles at the port due to surface tension effects. This prevents the warmer gas from entering the tank and warming the liquid propellant. In addition, by controlling the movement of the gas, as liquid propellant within the feed line continues to transform into gas, the gas pushes the remaining liquid propellant toward the tank, thus recapturing some of the liquid propellant and making it available for later use. The gas forms an insulative barrier to prevent boil off of more liquid propellant in the tank and prevent slip flow and liquid propellant from returning into the feed line. After every burn of the engine, the process repeats.

While the IVF system takes advantage of the internal combustion engine to provide electrical power for vehicle systems and for the operation of the IVF pumps, this is not the boundary of what can be done with the power produced. The nature of the IVF system is that it taps less than the total power which is available from the engine. The shaft power can be used for any function in the nature of an auxiliary power unit. It can circulate fluids for cooling or hydraulic power and can drive much larger pumps than those described for the internal IVF use. Large boost pumps which raise the pressure of propellants entering the main engines can be directly driven by the IVF engine and such pumps can also be used to circulate propellants within the vehicle or between docked vehicles. Boost pumps can further minimize or eliminate the need for direct tank pressurization since they provide the main engine's required NPSP by direct application of work to the fluid. The electrical generation system can be augmented with multiple generators including those for higher voltage which supports the use of multiple or higher power electromechanical actuators for driving engine thrust vectoring or other uses. The IVF engine can be used on an intermittent basis in concert with solar power or fuel cell systems. These systems can be sized for average loads but the IVF engine can be activated when peak demands are expected such as prior to and during main engine burns. In this way these other systems can be reduced in mass and cost with an overall benefit to system performance.

Moreover, the entire IVF system can be placed in a safe condition and vented of gases if it is not needed. This is a common requirement for rendezvous and docking with crewed space stations. Unlike a hydrazine system which can at best isolate the remaining propellant with pyrotechnic valves, the IVF can dump the accumulators and render itself completely inert. The possibility of inadvertent operation of a thruster or engine is thus completely eliminated.

In a preferred embodiment, a modular design is provided for the integrated fluid system. More specifically all elements are mounted to a single common panel and share a single set of fluids and electronic interfaces to the main vehicle. The module in one embodiment would contain two opposing pairs of pitch thrusters, one pair of yaw thrusters, and a pair of axial or vehicle settling thrusters. The accumulators, being quite small, can be closely coupled to the thrusters and also the pressurization control valves with a minimum of intervening plumbing thus minimizing leak sources and component count. The internal combustion engine, starter/generator and all electronic controls can share a common radiation enclosure which enables thermal stabilization of the components in space within a band near room temperature. The combination of all these masses on a rigid, shock and vibration isolated panel suppresses the movement of vibration energy both to and from the module. The module can be completely inspected and validated prior to installation on the vehicle. In the event of a fault after installation, it can be readily removed and replaced as a unit. In the preferred embodiment, the module can be mounted on existing available space on the aft deck of the vehicle and because of its small size, no modifications are required to the existing vehicle.

Regarding the second exemplary embodiment, in accordance with other aspects of the present disclosure, the system, methods and sub-systems or sub-combinations may be varied and still provide all required vehicle functions including attitude control, propellant settling, tank pressurization and venting, hardware actuation and purging and power generation without the need for any consumable fluids other than the liquid oxygen and liquid hydrogen present in the main vehicle tanks.

According to some aspects of the present disclosure, gas accumulators may be eliminated. It can be more efficient to recirculate gas from the ullage to the IVF modules and then add it back into the ullage at a higher enthalpy. By more efficiently and effectively capturing and moving heat, larger tanks, such as main propellant tanks for long duration flights, may be pressurized as needed. Small flow rates cause gas to become super-hot. According to aspects of the present disclosure, gas flow rates may be increased, compared to other embodiments, with high speed electrically-powered compressors and with system pressure differentials. However, to keep the power demands within reason, the pressure rise from the compressors must be small. This requires the system to work at low pressures. For example, the thrusters and the ICE induction must work at low pressure. According to aspects of the present disclosure, separate axial and lateral thrusters may be replaced with fewer low pressure thrusters that work for all attitude adjustments and settling functions. According to aspects of the present disclosure, the IVF module may function between 10 and 100 psia. This means that the effects of leaks are about as small as possible and weight is absolutely minimized.

It is also an option not to use heat from the thrusters to vaporize liquid oxygen or liquid hydrogen for increasing enthalpy. For example, a multi-cylinder internal combustion engine, such as a 6-cylinder ICE, may replace a Wankel engine. The ICE has the excellent balance and low vibration of a Wankel engine, but provides larger heat rejection area to capture heat required to do the larger scale pressurization. An ICE can also deliver target power with at least one cylinder not firing. Even with reduced pressure rise, the system demands a power output on the order of 70 HP (per module).

According to some aspects of the present disclosure, use of Nitronic 50 alloy as the material of the intake valves within the ICE eliminates the need for lubricating oil along the valve stem which would otherwise come into contact with pure oxygen and lead to formation of a pressure-sensitive gel capable of explosive reaction.

According to further aspects of the present disclosure, independent coolant systems may be incorporated to extract heat instead of, or in addition to, using the vented gases from the propellant tanks to capture heat directly from heat sources. Thus, a coolant, such as Krytox, or fluorocarbon ether polymers of polyhexafluoropropylene oxide, with a chemical formula: $F-(CF(CF3)-CF2-O)n-CF2CF3$, where the degree of polymerization, n, generally lies within the range of 10 to 60, may be circulated by a circulation pump in a loop including, for example, the ICE, a heat exchanger associated with a compressor for pressurizing the vented gas, and the generator associated with the output of the ICE. Heat is extracted from the ICE to increase the temperature of the coolant. In at least one embodiment, a heat exchange structure surrounds each ICE cylinder and allows higher heat transfer coefficients and hence greater, more consistent and controlled heat extraction from the cylinders while minimizing the mass of coolant required to fill the ICE cooling channels. The coolant then interfaces with the vented gas in a heat exchanger to warm the vented gas. In at least one embodiment the heat exchanger is a counterflow centrifugal heat exchanger. The reduced temperature coolant then cools the gas compressor motors and the generator before returning to interface with the ICE. Optionally, if desired, the coolant may also interface with the thrusters and/or other components to capture further heat. An actively cooled exhaust valve associated with the ICE enables modulation of the pressure within the exhaust manifold and hence the heat transfer to the coolant from the hot exhaust gases. This valve also maintains pressure within the ICE when it is shut down during extended duration flight in space.

The ICE exhaust system can provide more than 50% of all the waste heat that is reclaimed for increasing system enthalpy. This coolant system can increase the amount of waste heat gathered from the system and allow controlled modulation of heat extraction by both directly extracting heat from the ICE and bypassing coolant around the ICE thereby maximizing heat extraction during pressurization and minimizing heat extraction when the system is solely generating electricity. Use of the coolant system to scavenge waste heat from all major electrical loads, such as the compressor motors, generator units and coolant recirculation motors makes this energy available to the vented gases used for various functions. This substantially increases the amount of available energy for pressurization as well as cooling these motors.

According to aspects of the present disclosure, heat from the ICE is extracted and moved through the system by two independently controlled, redundantly powered coolant recirculation pumps-one for the first vented propellant gas (e.g., oxygen) and one for the second vented propellant gas (e.g., hydrogen). By varying the coolant flowrate through the heat exchanger associated with each propellant loop, as well as by varying the flowrate of the coolant in each propellant loop, the heat delivered to the two sides of the system can be controlled directly without need for additional valves or other devices. Also positive flow can be guaranteed even with one side at very low flow such that coolant freezing is avoided. By utilizing two pumps, one for each propellant, loss of ICE coolant flow is avoided in the case of loss of one of the pumps. Loss of one pump halts the use of that associated coolant loop, but preserves the other.

Discharge from the two compressors is supplied to the propellant tanks, the ICE and the thrusters. Different terms may be used to refer to the vented gas as the gas travels to different parts of the IVF module. For example, the gas may be referred to a pressurant gas when the gas with increased enthalpy is returned to the ullage space of the tanks. In addition, the gas may be referred to as a reactant when the gas travels to the ICE. Since the reactants feeding into the ICE are from a compressor, the ICE thus is effectively turbo-supercharged, allowing the displacement and mass of the ICE to be reduced. Lastly, the gas supplied to the thrusters may be referred to as a propellant. The higher pressure supplied to the thrusters enables much higher thrust output without increasing the thruster size and mass.

According to other aspects of the present disclosure, a separate coolant system may be provided to cool the IVF system batteries and electronics. In one embodiment, a control unit comprises one or more arrays of lithium ion batteries combined with multiple computer slices. The coolant flows through and immerses portions of the controller unit. The batteries are completely immersed in a flowing reservoir of oil. The oil not only cools the batteries, but isolates the batteries from external vibrations. A coolant feed line transports the coolant to a heat exchanger under the power of a coolant pump. The avionics heat exchanger interfaces with either or both reactants to cool the reactants flowing towards the ICE.

According to some aspects of the present disclosure, to modulate mass flow and heat flow the discharge out of the compressor is split. One passage (the "hot" passage) leads to the heat exchanger and the other (the "cold" passage) does not. A "hot" pressurization valve modulates the gas flow through the heat exchanger to achieve variable heat rejection. A "cold" pressurization valve effectively sets the compressor pressure ratio by restricting the flow above that required by the heat exchanger. By this means both hot gases (which has flowed through the heat exchanger) and cold gases (those bypassing the heat exchanger) are produced. Heat rejection is thus relatively independent of compressor flowrate. The combined flow is delivered to the tank ullage for pressurization. Hot and cold gases may be bled from the main pressurization supply line to serve other functions.

The reactants (e.g. oxygen or hydrogen) cannot be at extreme cryogenic conditions when introduced into the ICE in order to protect ICE lubrication and avoid combustion produced icing. According to some aspects of the present disclosure, two stages of heat exchange are available to condition the oxygen and hydrogen gases flowing to the ICE. Both hydrogen and oxygen feeds for combustion are warmed by the primary heat exchanger coolant by bleeding gas from the "hot" side of their respective compressor/heat exchanger. The hydrogen is further warmed by removing waste heat from the IVF controller avionics-thus reducing this energy demand.

According to some aspects of the present disclosure, the coolant discharged from the heat exchanger immediately adjacent to the motor driving the cryogenic compressors may be used to both cool the motor stator and to keep the bearings at a temperature which permits use of lubricants. This eliminates additional systems to achieve this function, such as specialized cryogenic bearings, and prolongs bearing life.

According to some aspects of the present disclosure, a high-flow capacity, sonic-metering, low-pressure-drop, variable-position pintle style valve may be used to modulate the flow of vented gas discharged from each compressor. These valves establish the compressor operating point (combined pressure rise and flowrate) by controlling the total flow rate. They also control the heat rejection by the heat exchanger. Preferably, the heat exchanger and control valves are designed for the maximum heat rejection conditions which correlate to the highest mass flow. However these sizes would be too large under partial power conditions. Excessive gas flow would lead to overcooling of the coolant since the gas temperature can easily overpower the ICE heat generation.

According to some further aspects of the present disclosure, a variable position liquid propellant atomizing mixer valve can be placed upstream of the compressor and heat exchanger. In concert with temperature instruments placed at the compressor inlet and an active control system, this valve is capable of atomizing liquid and mixing the atomized liquid with incoming vent gas even with zero differential in their total pressures. The vaporizing liquid serves to cool the incoming vent gas to a specified target value at the inlet of the compressor. It allows the system to operate over a wide range of temperatures and to simplify the design and operation of the compressor by actively holding its inlet conditions within an optimal band. This allows the system to add mass to the vent gas so that temperatures do not become excessive. Thus, there can be two pressurization modes-recirculation and recirculation with mass addition.

According to some aspects of the present disclosure, a counter helical flow, coaxial-annular heat exchanger may be used to induce rotation of the coolant and the vent gases to improve the performance, i.e. heat transfer, of the heat exchangers. A compressor expels vent gas with a rotation, which means that the gas has radial and tangential velocities. The heat exchanger has fins that preserve and induce this rotation, which stratifies the gas based on density, and thus, temperature. Since the gas flows through an inner space of the heat exchanger, the colder, denser gas is positioned against the interface with the coolant. Likewise, the heat exchanger induces rotation of the coolant, which flows through an outer space of the heat exchanger, and the hotter, less dense coolant is positioned against the interface with the ullage. Therefore, the steepest possible temperature gradient is established between the coolant and the gas, which maximizes heat transfer and improves the performance of the heat exchangers.

According to some aspects of the present disclosure, a single gimbal platform on each module supporting two independently controlled thrusters and the exhaust nozzle from the ICE may be used. This permits control of the force vector from both thrusters and ICE exhaust. The gimbal can rotate to produce combined settling and pitch/yaw/roll torques or can be pointed radially outboard to produce a balanced thrust of both thrusters and ICE exhaust. The platform can be gimbaled to produce reverse thrust to achieve spacecraft separation without significant impingement of gases on the spacecraft. This eliminates the need for spacecraft separation springs. A failure in one thruster can be compensated for by adjusting thrust on the remaining thruster with no degradation in vehicle control.

According to some aspects of the present disclosure, a laser-sintered additive manufactured structure that combines both thrusters on a module into a common housing along with their propellant feedlines, may be used. The single structure acts as the structural gimbal platform. This approach eliminates most plumbing and leakage points on the thruster system downstream of the propellant valves.

According to some aspects of the present disclosure, a single-design low feed pressure (<60 psia) variable thrust and mixture ratio thruster may be used to achieve vehicle control and settling with much larger vehicle and payload mass. Use of a sonic-metering variable position pintle valve for each thruster's propellant (e.g., oxygen and hydrogen) flow control in concert with redundant pressure and temperature instruments upstream of the valves and an active control system permits the thruster to adapt to widely varying inlet temperatures and pressures to produce stable thrust or to increase/decrease thrust with a turndown ratio of nearly 10. This variable thrust design makes the combustion device element small enough to gimbal and thus allows for the removal of all but four thrusters from the system. This leads to a drastic reduction in valves, ignition systems etc. The variable mixture ratio thruster allows the system to adjust its propellant consumption to match tank boiloff (typically a very low mixture ratio) while keeping mixture ratio higher for ignition events.

According to some aspects of the present disclosure, the thruster system preferably separates the propellant flow control valves from the thruster combustion devices by flex lines that enable large gimbal angles and also prevent thermal soak-back from the hot combustor into the propellant valve and the propellants immediately upstream of the valve. This prevents rapid transients in propellant inlet conditions and enables high reliability ignition events with controlled mixture ratio and avoids transient over-temperature events from excessively high mixture ratios.

Preferably, the thruster system also uses a cryogenic temperature capable propellant feedline rotational slip joint at the interface of the thrusters and their flexible feedlines. This redundantly sealed swivel permits large rotational motion of the gimbaled thrusters without excessive hose twist.

According to some aspects of the present disclosure, hot and cold bleed valves are used to supply the thrusters with variable temperature propellants gases. During main pressurization events when thrusters are firing for settling the demand from the thrusters is effectively a leak in the system that reduces energy flow back to the tanks. During these periods the thrusters use cold propellant which contains the least enthalpy and hence reduces the energy drain on the system. During periods when removal of energy from the system is desired, as when the ICE is operating to recharge batteries, propellant is bled from the hot side of the compressor. This gas has gained heat from the coolant and hence acts to cool the ICE. Any desired combination of cold and hot gas can be produced thus permitting precision thermal control of the IVF system across the range of output power.

According to some aspects of the present disclosure, during high power operations, the exhaust valve, mixer valve and thrusters may be used as the primary thermal management system. During periods when large amounts of electrical power are desired without tank pressurization the ICE must reject all the heat that would be normally be scavenged and used for pressurization. According to some aspects of the present disclosure, embodiments of the IVF system can produce in excess 100 kW of electrical power that is available for payload and vehicle functions other than pressurization. The hydrogen mixer valve, which normally supplies only a fraction of the mass that enters the compressor, is opened more fully to reduce the temperature entering the compressor to saturation levels. The compressor does not operate under power but this cold gas flows through the compressor and into the heat exchanger where the gas removes heat from the circulating coolant. By taking advantage of the heat of vaporization of the hydrogen far more energy can be absorbed into this gas before the gas is exhausted out the thrusters. No oxygen flow is required at the thrusters since combustion at the thruster is not required with warm hydrogen gas being vented to space through the thruster injector. The ICE exhaust valve is adjusted to the fully open position to minimize pressure within the exhaust manifold and hence reduce heat transfer to the manifold cooling passages. This reduces the total heat that must be rejected by the coolant loop up to approximately 50%.

According to some aspects of the present disclosure, the one or more rechargeable batteries having commercially available lithium ion cells may be used. The battery is completely immersed in fluorocarbon oil as a means to thermally control battery cell temperature by circulating oil between the cells. This dense oil also creates a buoyancy effect on the cells such that approximately 60% of the mass of the cells is supported by fluid. The oil also serves as a damper to suppress cell resonances due to external vibration. This enables the battery to operate with greater reliability in space flight and to sustain higher charge and discharge rates than would otherwise be practical with conducting cooling alone.

According to some aspects of the present disclosure, the individual cells may be joined by an interconnecting tab using a visible light laser welding technique. The laser spot pattern allows an increase the conductive path between the cells without increasing the gage of the interconnect. This permits a simple construction that allows high current flows with minimal voltage drop.

According to some aspects of the present disclosure, a control and communication system architecture may be used in which each IVF module contains a controller consisting of multiple physically connected but functionally separate chassis slices each of which has dedicated functionality such as running the ICE or running the hydrogen pressurization system. According to aspects of the present disclosure, each controller contains at least one slice containing rechargeable lithium ion main vehicle batteries. The slices are joined together so that their mass is additive to that of the batteries and the coolant contained within so that their combined mass attenuates high frequencies and they can share a common vibration isolation and thermal control system.

According to some aspects of the invention, each of one or more slices comprises a central processing unit (CPU) for control and processing of system operation and communication. One CPU slice may be redundant to and provide backup for a second CPU slice. In addition, each slice comprises two redundant field programmable gate arrays (FPGA) that perform the logic functions assigned to that slice. One FPGA is primary (FPGA A) and the second (FPGA B) is redundant, but receives all of the same communications and performs all of the same decision making as the primary FPGA, but its output signals are suppressed. Further still, each FPGA comprises three redundant modules. If, during operation, the output of any module differs from the other two modules, the entire FPGA is rebooted and the secondary FPGA controls operations and communications. After the primary FPGA has rebooted, the secondary FPGA can continue to control operations and communications or control can pass back to the primary FPGA.

According to some aspects of the present disclosure, avionics thermal control may be achieved by circulating fluorocarbon oil using a small, redundant, electrically driven pump to cool the avionics. This dielectric oil, which may also be used to cool the batteries, is used to flood the battery slices and the avionics slices. The battery cells and their interconnections are immersed in flowing coolant to stabilize and moderate their temperatures even under high charge and discharge conditions. Cold coolant flows from the pump through channels in high power dissipation slices until it returns to the battery reservoirs and then to a heat exchanger where cold hydrogen gas is used to remove the accumulated heat. In this way the coldest coolant is supplied to the high power switches and near-room temperature return coolant floods the batteries. The coolant is capable of remaining liquid even with cryogenic hydrogen on the other side of the heat exchanger. In this way the controller can handle the production, rectification and control of over 50 kW of electricity without device overheat. Approximately 5 kW of waste heat is dissipated under peak conditions within the small confines of the controller assembly. Coolant channels may be formed in the chassis slices using direct laser sintering to avoid extensive external plumbing and reducing the potential for leaks.

According to some aspects of the present disclosure, a Controller Area Network (CAN) with flexible data rate (FD) bus may be used as the primary data bus for a critical space borne system. Commands and functional data flow over redundant CAN FD (A &B) buses. This bus minimizes conductors and is resistant to noise and interference. Data received by any given slice FPGA A over CAN A is shared with FPGA B and vice versa. A complete loss of one bus can thus be tolerated without affecting function. The controller slices can be seen as individual redundant computers with tightly bound functions with minimal direct interaction with the adjacent slices. In this way, in one embodiment, approximately 20 computers, bound by a common redundant bus, work asynchronously to achieve IVF function with minimal central control.

According to some aspects of the present disclosure, gallium nitride (GaN) high electron mobility transistors may be used to provide radiation resistant switching in a high-power environment. GaN power switches are used to drive high power motors with electrical demands in excess of 40 kW. These switches exhibit good tolerance to radiation-induced damage and minimal tendency towards radiation induced burnout. This enables the construction of efficient, compact and cost-effective power switch inverter arrays and buck-boost electronics.

According to some aspects of the present disclosure, a high voltage power system with variable voltage may be used to suppress corona discharge during ascent. Corona is an electrical discharge phenomenon associated with low pressures and a relatively high local electrical potential. It can occur during the ascent of a rocket through the upper atmosphere as the external pressure falls. Generally voltages above 100V are susceptible to corona depending on the gas present in the surroundings. Helium, often used to purge vehicle systems to keep condensable gases from freezing on cold hardware, has a relatively low breakdown voltage. In the second exemplary embodiment, the IVF system operates at two voltages: approximately 30V for typical electrical loads and above approximately 300V for high power motors. Operation of hardware at about 300 V during ascent would inevitably cause corona discharge which could damage electronic components or disturb the function of the system. According to aspects of the present disclosure, the IVF power management slices adjust their high-Voltage power output to approximately 100V after liftoff and keep this voltage below the breakdown level. The power output of the system is limited during this period but basic functions of the lubricant and coolant pumps as well as low compressor flows can be supported. After vacuum is achieved voltage can then be raised without concern about corona. The IVF system can also commence a purge of the controller prior to liftoff with gaseous oxygen. Oxygen has a very high breakdown voltage that is in excess of 400V. Operation with an O2 purge can be conducted at full operating voltage.

According to some aspects of the present disclosure, the internal combustion engine and associated generator may have a maximum rated output of approximately 300V. In at least one embodiment, the battery may also produce 300V. With this configuration, the battery output is sufficient to drive components with large voltage requirements, for example a compressor, but the internal combustion engine and generator must operate at full output to charge the battery. However, it should be appreciated that power switches operating at high voltages, such as 300V, are more vulnerable to radiation damage and failure than switches operating at lower voltages, for example, approximately 100V or less. It should also be appreciated that high voltages can induce failure in a cell, which can cause an entire, multi-cell battery to fail.

Alternatively, according to other aspects of the invention, lower voltage batteries may be utilized, for example 30V batteries. In this configuration, buck-boost converter is placed between the output of the generator and the batteries to adjust that output of the generator as needed to protect and charge the batteries. In addition to the batteries, many other components, including switches and valve motors for example, also operate at lower voltages. With lower voltage demands, operating the internal combustion engine at lower speeds, including at idle, can generate sufficient power to charge the batteries and also reduce wear and tear on the engine. Lower voltages also protect switches against radiation damage. But if needed, the internal combustion engine and generator can be operated for periods of time at or above the maximum rated output to supply power as may be needed. As one example, the internal combustion engine can power the associated generator to run a 300V compressor. As another example, if one generator fails, a second generator may be operated above the maximum rated output to provide some compensation for the absence of the first generator. Similarly, the internal combustion engine may be operated above its maximum rated output for limited periods of time. It should be appreciated that the voltage needs and output may vary depending upon the particular mission and that the maximum rated output may be increased or decreased as is appropriate.

According to some aspects of the present disclosure, placing ignition coils and high voltage leads within the ICE interior, while maintaining positive pressurize within the ICE at all times, avoids corona discharge and achieves coil cooling. The spark ignition system on the ICE must function during ascent and the output of the ignition coil is in excess of 10,000V—well above the corona breakdown voltage. The ignition coils and the high voltage lead leading to the spark plugs are placed within the camshaft cavity which receives a positive hydrogen pressure from the crankcase ventilation system. This pressure is sufficient to prevent breakdown of these high voltage elements. This gas is recirculated by the lubrication transport system. Gas and lubricating oil is impinged on the ignition coils to maintain them within operating temperature.

According to some aspects of the present disclosure, a near zero-overlap intake/exhaust cam and independent oxygen and hydrogen intake runners may be used to prevent backfire of the ICE and assure proper cylinder mixture ratio. Hydrogen and oxygen when present at the proper mixture ratio can ignite with very low ignition energy. When valves "overlap" the exhaust valve is still slightly open when the intake valve begins to open. This means that, depending on the pressure in the exhaust manifold, exhaust gases can also flow from there back into the intake manifold. This means that if a combustible mixture is present at the intake port that it can light off before entering the combustion chamber causing a backfire. This is a common problem for hydrogen-burning terrestrial ICEs. It is of special concern for the IVF ICE at low idle conditions when operating on the ground. Under these conditions at the end of the exhaust stroke there are residual hot combustion gases within the cylinder that can backflow into the intake manifold upon the opening of the intake valve at the start of the intake stroke. This can initiate the backfire—a highly undesirable behavior.

According to some aspects of the present disclosure, the ICE may use tuned but separate oxygen and hydrogen intake supply runners that remain separate until a few millimeters from the intake valve. The geometry at their intersection and the large density difference results in the accumulation of a zone nearly pure oxygen immediately adjacent to the intake valve and another zone of nearly pure hydrogen immediately upstream. The area of local mixing is displaced from the intake valve so that the ignition source is not present in that area. The ICE valve timing reduces valve overlap to a very small value and hence no exhaust products can re-enter the cylinder and backflow to the intake area. Upon opening of the intake valve the two separated gas slugs are ingested and their passage by the intake valve creates a vigorous mixing that creates a combustible mixture within the cylinder. This assures that the ICE can be readily started at low RPM.

According to some aspects of the present disclosure, two IVF modules are required per vehicle to provide the requisite redundancy and performance margins. The configuration of thrusters is such that the thrusters within the two modules work in concert to achieve the proper roll, pitch and yaw maneuvers. Because the two modules are interconnected they can preserve overall system function even if a single or multiple components on one module are inoperative. For example, the GO2 compressor or pump on one module can act to supply the oxygen to the thrusters on the other module and vice versa. It is within the scope of the present disclosure that more than two IVF modules may be used. In accordance with methods of the invention, a number of functions are provided within an integrated fluid design. The methods provide various functions to include production of mechanical energy by an internal combustion engine that has an output shaft, and the generation of electrical power through an electrical starter/generator that communicates with the shaft of the engine. Electric current from the alternator may be stored in a battery.

Another function is sustained vehicle settling to drastically reduce propellant losses in the upper stage propellant tanks.

Another function includes a modular design for a plurality of thrusters that utilize waste ullage gas, the thrusters being arranged for both attitude and settling capabilities. The thrusters may utilize the hydrogen rich exhaust gas from the internal combustion engine or may be traditional combustion-type thrusters that burn the H2 and O2.

Various other features and advantages of the system and methods will become apparent from review of the following detailed description, taken in conjunction with the drawings.

BRIEF DESCRIPTION OF THE DRAWINGS

FIG. 6A is another schematic diagram illustrating yet another aspect of the invention, namely, provision of a thruster assembly for sustained vehicle settling using exhaust gas from the ICE;

FIG. 6B is another schematic diagram for the aspect of FIG. 6A, but using ullage gases for powering the thruster assembly;

FIG. 25A is a front elevation view of one exemplary embodiment of a mixer valve for adding liquid to the vented gas;

FIG. 25B is a cross-sectional, side elevation view of the mixer valve of FIG. 25A;

FIG. 29A is a perspective view of one embodiment of a controller unit;

FIG. 29B is a cross-sectional, front elevation view of the controller unit of FIG. 27A; and FIG. 30 is an exploded, perspective view of one embodiment of a battery;

DETAILED DESCRIPTION

Figure 1:
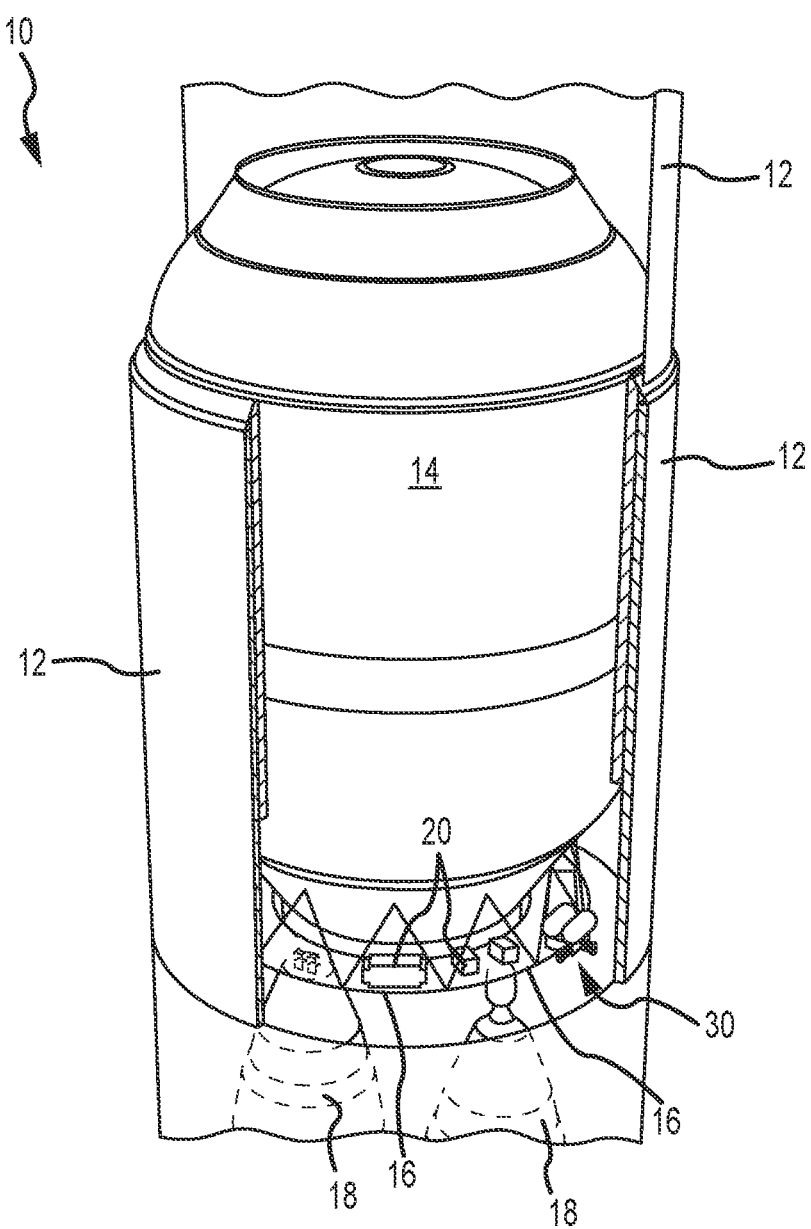
FIG. 1 is a fragmentary perspective view of part of an upper stage of a space launch vehicle illustrating a first exemplary embodiment of an IVF module mounted to the aft deck of the upper stage.

FIG. 1 illustrates the upper stage 10 of a space launch vehicle in accordance with the first exemplary embodiment of the disclosure. The outer covering or shell 12 is broken away to view the propellant tanks 14, which comprise the liquid hydrogen tank 60 and the liquid oxygen tank 62 with a common bulkhead separating the tanks. The aft of the vehicle includes a circumferential deck 16 that provides for mounting of various system components 20 such as avionics, fluid and mechanical devices as well as the IVF module 30 of the present invention. FIG. 1 also illustrates the main propulsion rockets 18 that are used to propel the upper stage 10. In the Figure, the relatively small size of the IVF module 30 is shown. Preferably, there is an IVF module mounted on opposite sides of the aft deck 16. Twin IVF modules are able to generate more than enough power to supply all of the upper stage system requirements, yet reduce overall vehicle weight by eliminating much of the wiring harness mass associated with traditional vehicles that use battery power. The elevated DC voltages that can be provided by the battery of an IVF module is also valuable for reducing EMA actuator mass. The particular vehicle 10 illustrated is a conceptual 41 ton propellant capacity upper stage. However, the IVF module of the present invention can be used with any type of upper stage vehicle that has at least some minimal space for mounting of exterior components.

Figure 2:
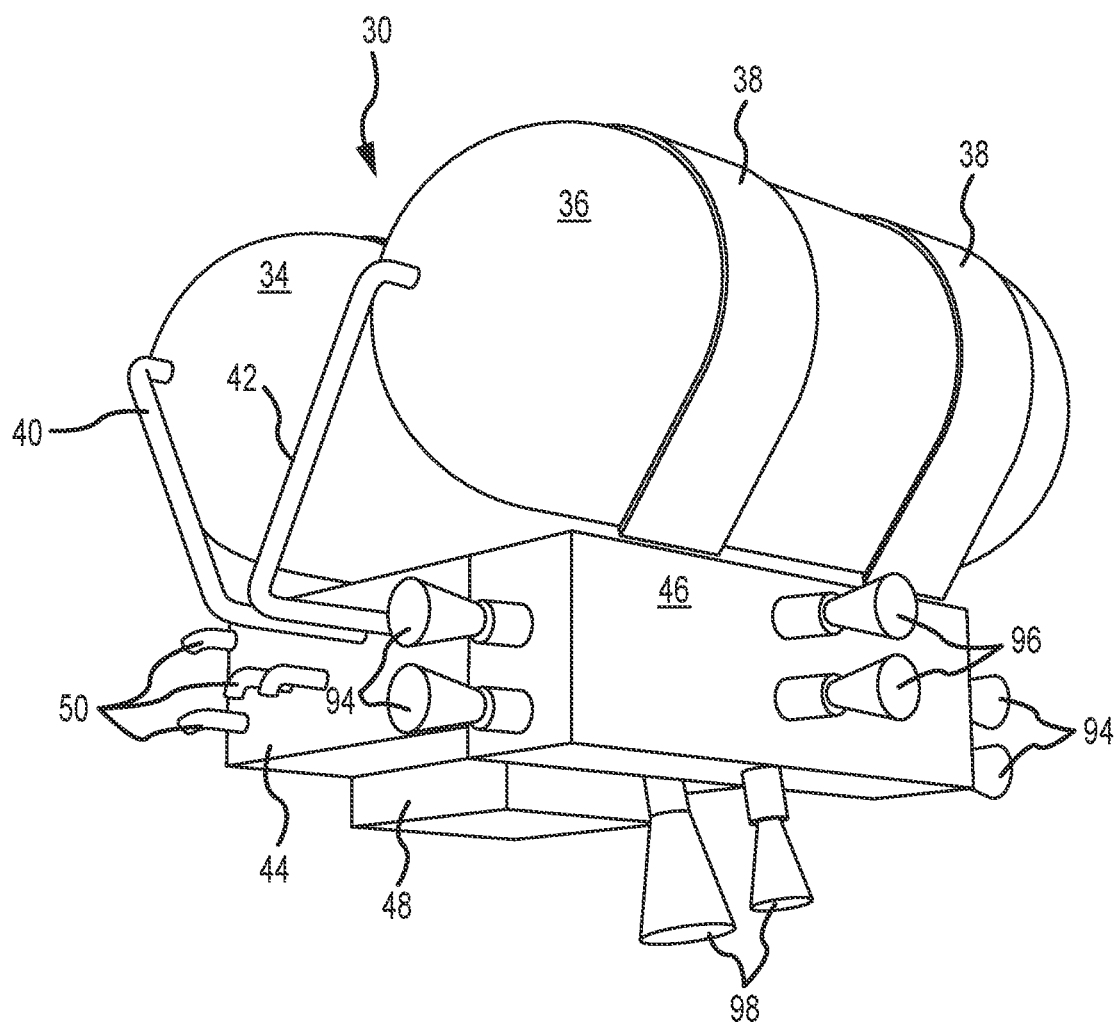
FIG. 2 is an enlarged perspective view of the first exemplary embodiment of the IVF module.

Referring to FIG. 2, an example is provided for a first IVF module design. In this Figure, major structural components of the IVF module are illustrated to include a GO2 accumulator 34, a GH2 accumulator 36, and mounting straps 38 that can be used to mount the accumulators to a frame of the module. Lines 40 and 42 communicate with the accumulators 34 and 36, and represent either vent, purge, or pressurization lines associated with the accumulators. A housing 44 is provided for the internal combustion engine (not shown), and a plurality of various other gas/liquid lines 50 are shown protruding from the frame for delivering gas or liquid throughout the system. A thruster group or assembly 46 is illustrated as another component of the module having a plurality of thrusters for settling and attitude control of the upper stage. As shown, the thruster assembly 46 includes a pair of axial thrusters 98, two pairs of opposing pitch thrusters 94, and a pair of yaw thrusters 96. A vehicle battery 48 is also illustrated and is secured to the IVF module, the battery 48 being charged by a generator connected to the output shaft of the ICE as discussed below.

Figure 3:
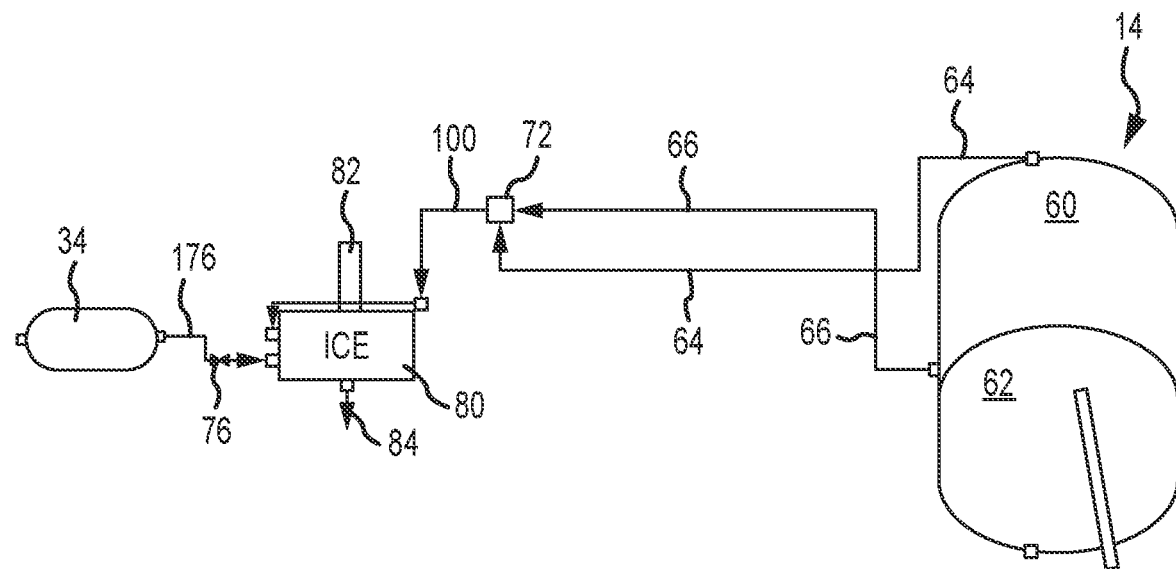
FIG. 3 is a schematic diagram illustrating one aspect of the invention, namely, the provision of an internal combustion engine in the IVF system to produce mechanical power.

FIG. 3 illustrates one aspect or concept of the present invention, namely, the provision of a small internal combustion engine (ICE) 80 that is used to provide power for the upper stage systems. In a preferred embodiment, the size of the ICE 80 is approximately 200 cc, and runs at a preferred mixture ratio between 0.6 and 2.0. As shown in the FIGURE, ICE 80 receives its GH2 fuel from the liquid hydrogen tank 60 by vent line 64. The oxidizer, GO2, is provided by an oxygen accumulator 34, through line 176, and metered through valve 76. The hydrogen vent line 64 communicates with a hydrogen intake mixture valve 72 that modulates the amount of hydrogen provided to the ICE. Depending upon demand, the ICE can also receive hydrogen through a dedicated hydrogen bleed line 66 that provides liquid hydrogen to the intake mixture valve 72. The metered amount of hydrogen is then combusted with the oxygen within the ICE, thereby producing a mechanical output shown as shaft 82. The exhaust gas from the ICE 80 is captured in exhaust line 84 that can be used for powering the axial thrusters as discussed below. The hydrogen vent line 64 would typically be used to dispose of waste ullage hydrogen gas. In the present invention, however, the waste ullage hydrogen is used to fuel the ICE. Optionally, the GH2 carried by line 100 downstream of the valve 72 can be used to cool the engine exterior, maintain pressure in the crank case, and cool the internal rotor of the ICE.

Figure 4:
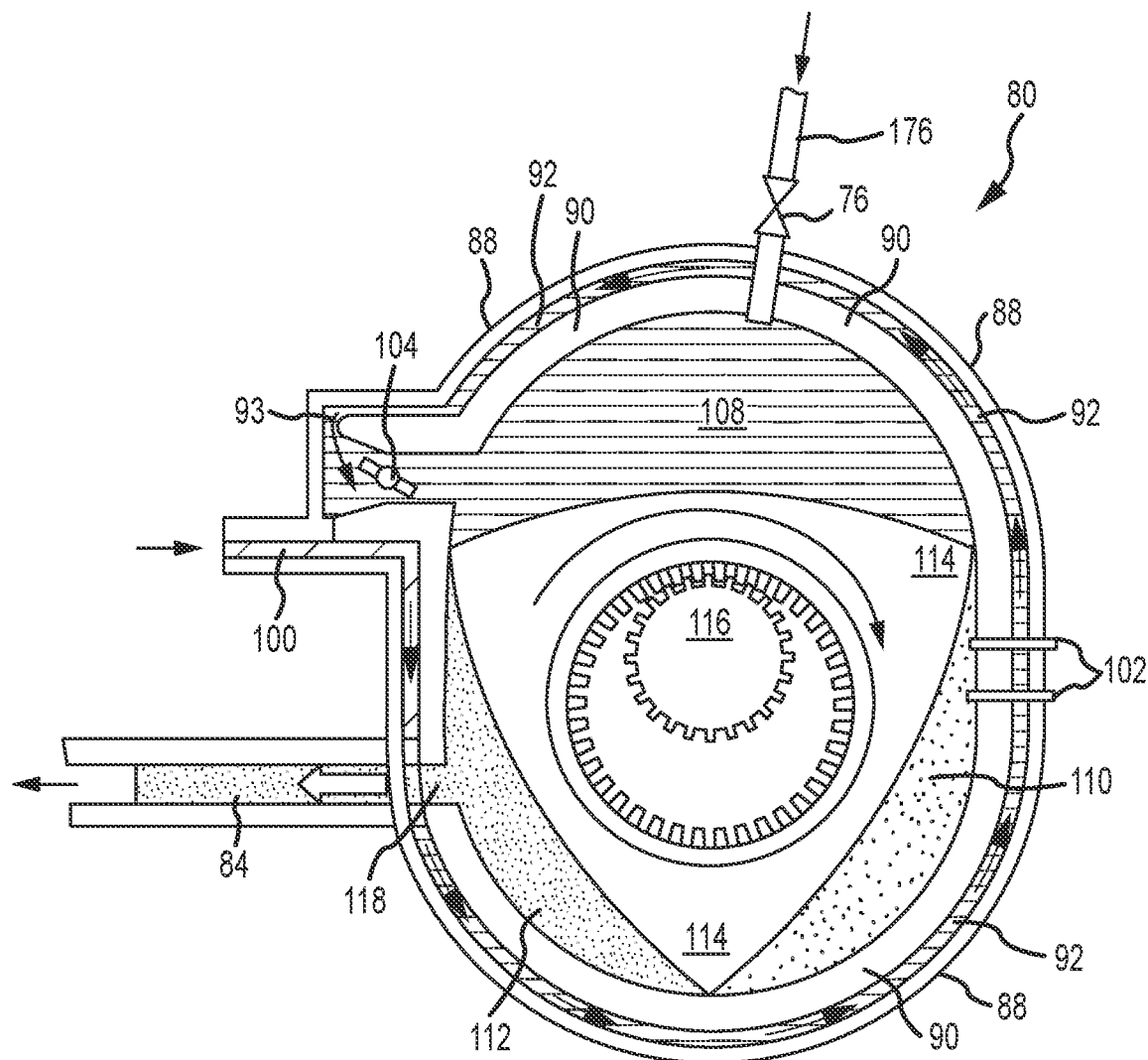
FIG. 4 is a cross-sectional schematic diagram of an ICE of the present invention, in the form of a Wankel engine.

Referring to FIG. 4 a particular construction is provided for the ICE 80 in the form of a Wankel engine. As illustrated, GO2 is provided through line 176, while the GH2 is provided through line 100 downstream of the intake mixture valve 72. The hydrogen is first circulated in a gap 92 between the engine block 90 and a cooling jacket 88. As the low pressure GH2 is circulated, it warms by heat transfer from the block 90, and finally flows to the intake port 93. Valve 104 can be used to meter the GH2 flowing into the ICE. Once inside the engine, the hydrogen first enters the fuel intake chamber 108. A solenoid injector valve 76 opens at the correct moment during the intake phase to inject the GO2. This injector also prevents GO2 back flowing into the GH2 system, and also controls the engine mixture ratio. As the rotor 114 rotates about the eccentric shaft 116, the hydrogen and oxygen are then compressed with an area defined as the combustion chamber 110. Spark plugs 102 provide the source of ignition for igniting the fuel within the combustion chamber 110. The expansion of the gases in the combustion chamber provide the motive force for rotating the rotor 114, thus moving the combusted gas to the portion of the engine defined as the exhaust chamber 112. The high temperature, GH2 rich and pressurized gas exits the exhaust port 118 into the exhaust line 84. Although one will appreciate the simple, yet effective design for a Wankel engine incorporated in the IVF system of the present invention, it shall be understood that a standard piston engine can also be used as the ICE 80. The GO2 and GH2 are provided to the piston engine in the same manner as illustrated for the Wankel engine. More specifically, the GO2 is provided through line 176, while the GH2 is provided through line 100 downstream of the intake mixture valve 72. The hydrogen can be circulated in a gap between the engine block and cooling jacket of the piston engine. As the low pressure GH2 is circulated, it warms by heat transfer from the block, and finally flows to a fuel intake port of the piston engine. Valve 104 can be used to meter the GH2 flowing into the piston engine. Once inside the engine, the hydrogen is transferred to the cylinders. One or more injector valves can be used to inject the GO2 into the cylinders for mixing with the GH2. Spark plugs 102 provide the source of ignition for igniting the fuel within the cylinders. The expansion of the gases upon ignition provide the motive force for rotating a crankshaft of the piston engine, and the combusted gases are evacuated from the cylinders to the portion of the engine defined as the exhaust chamber 112. The high temperature, GH2 rich and pressurized gas exits the exhaust port 118 into the exhaust line 84.

Figure 5:
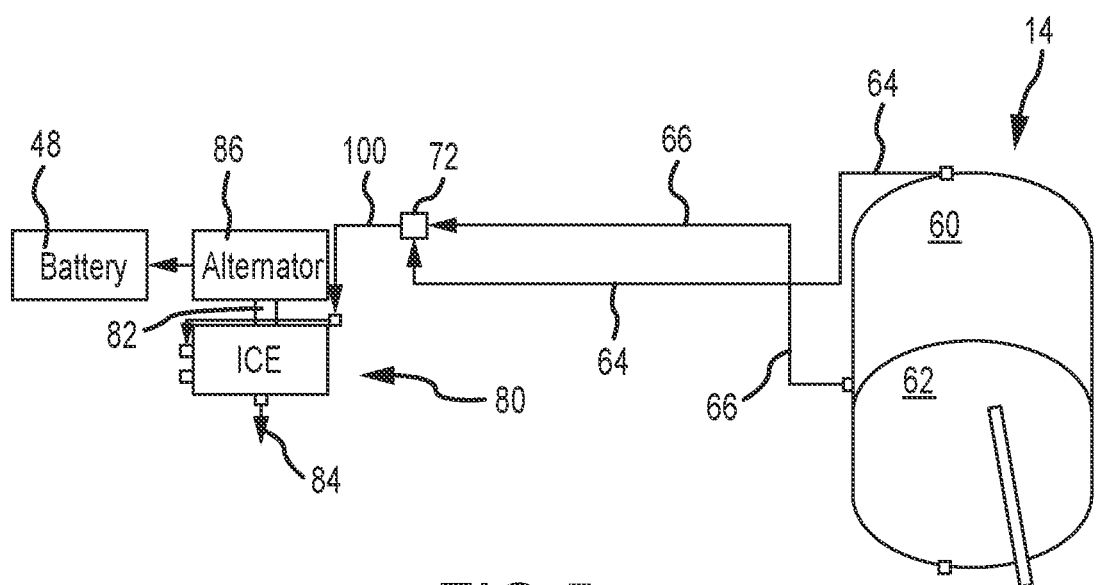
FIG. 5 is another schematic diagram for another aspect of the invention, namely, the provision of electrical power.

Referring to FIG. 5, in another aspect of the present invention, electrical power is provided by an electrical alternator 86 that is driven by the output shaft 82 powered by the ICE 80. The alternator 86 in turn provides electrical current for charging a battery 48. For IVF system pumping requirements to charge the accumulators as discussed below, power can be supplied either from the battery 48, or power can be provided by the output shaft 82 to a clutch (not shown) connected to the accumulator pumps. The clutch can be engaged and disengaged to operate the pumps. As the vehicle operates, the battery 48 will discharge during peak loading requirements, but will recharge during vehicle coasts, i.e., those times during which power demands are low. The use of a rechargeable battery 48 removes previous restrictions on peak power and total available energy that was a problem with prior launch vehicle systems in which power was limited to only battery power.

FIG. 6A is another schematic diagram illustrating another aspect of the invention, namely, sustained settling modes provided by the thruster assembly 46. The thruster assembly as mentioned includes a pair of axial thrusters 98 that provide settling thrust. For long duration, low thrust settling, the high temperature, high pressure exhaust 84 can be used directly from the ICE to generate thrust 120. However, the thrust 120 provided in this mode is limited by the peak mass flow through the engine and the allowable engine combustion temperature. Using the exhaust gas of the ICE is a very efficient method for sustained settling, since the ICE is normally operating to provide vehicle power and will rarely cease to operate for any extended period of time. Therefore, there is a constant flow of exhaust gas 84 that can be used for providing thrust. In another vehicle settling mode shown in FIG. 6B, settling thrust can be provided directly through the GH2 ullage vent line 64 to the thruster assembly, with oxygen provided directly through the GO2 ullage vent line 68. These ullage gases are then combined and combusted in combustion chamber of the thrusters. The ullage gases provide more than sufficient fuel and oxidation material for running the axial thrusters.

Figure 7:
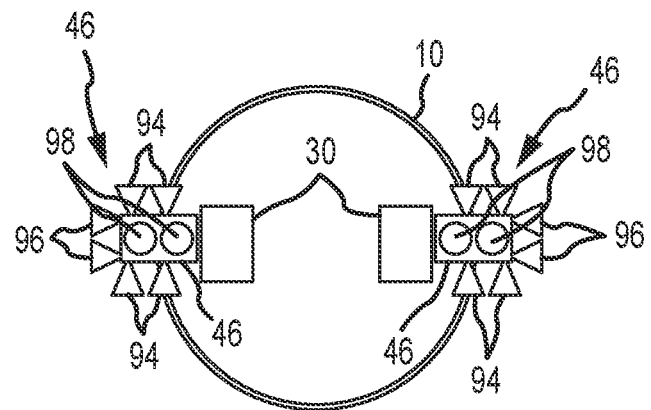
FIG. 7 is a simplified schematic diagram illustrating one example of port and starboard positioning of separate IVF modules for the upper stage of the vehicle.

Referring to FIG. 7, a schematic diagram is provided showing that a pair of IVF modules 30 is used, each having the same construction, and mounted to opposite sides of the vehicle 10 when looking at the vehicle outer diameter in schematic cross section. The IVF modules 30 are generally illustrated showing the thruster assemblies 46 having the pitch thrusters 94, yaw thrusters 96, and axial thrusters 98. The pair of IVF modules 30 provides redundancy without adding significant weight.

Figure 8:
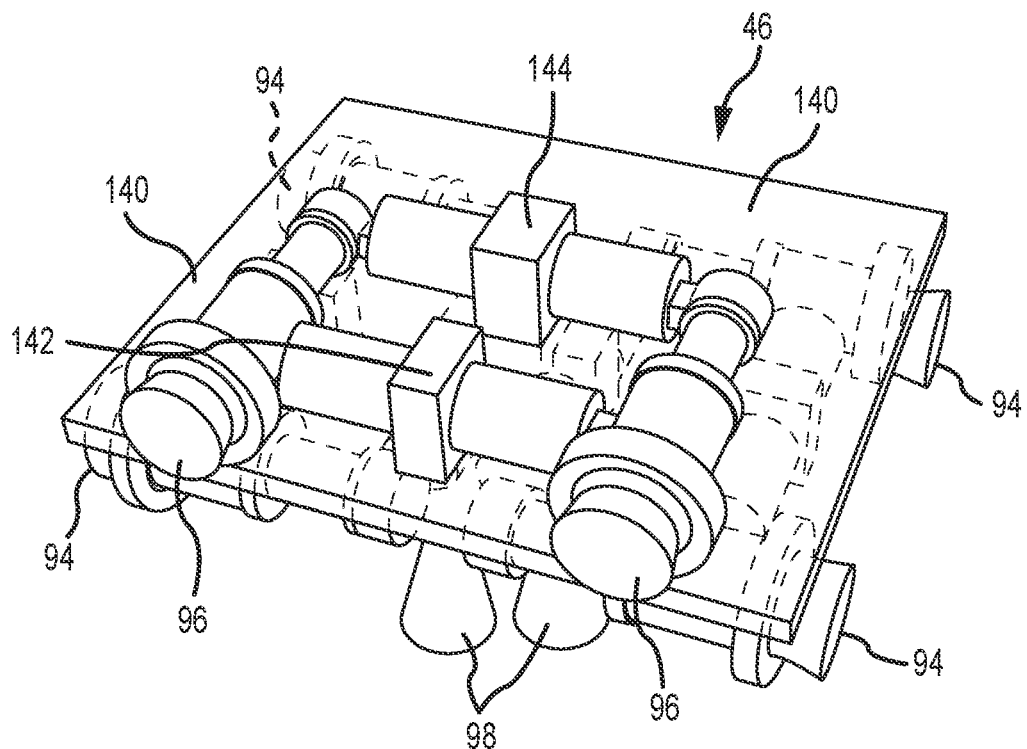
FIG. 8 is a perspective view of one example construction for a thruster assembly including a panel to which the thrusters may be mounted, along with hydrogen and oxygen manifolds for delivery fluids to the thrusters.

Referring to FIG. 8, an example is provided for a specific thruster assembly construction. Specifically, a panel 140 can be used to mount the yaw thrusters 96 on one side of the panel, while the two pairs of pitch thrusters 94 can be mounted on the other side of the panel 140. A hydrogen manifold 142 comprises a plurality of lines and fittings for carrying hydrogen to the thrusters, while an oxygen manifold 142 also comprises a plurality of lines and fittings for carrying oxygen to the thrusters. The axial thrusters 98 can also be mounted to the panel 140, or may be mounted to a separate panel. It is noted that the particular thruster panel assembly shown in the FIG. 8 can be modified to allow the thrusters to conveniently fit within the space available on the mounting structure of the space vehicle. As compared to in the FIG. 2, the FIG. 8 shows a different, yet functional arrangement for the thrusters.

Figure 9:
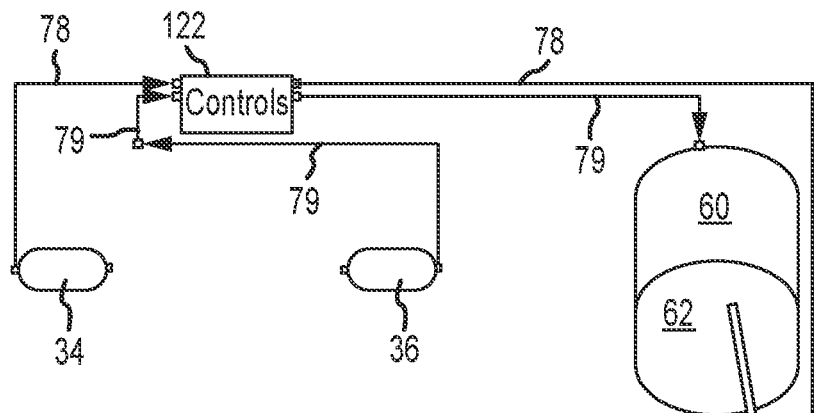
FIG. 9 is a schematic diagram illustrating one aspect of the invention, namely, tank pressurization and vent with accumulators.

Referring to FIG. 9, yet another concept is illustrated with respect to tank pressurization for some embodiments of the invention. As shown, both the LH2 60 and LO2 tanks 62 have respective pressurization lines. Specifically, an oxygen pressurization line 78 pressurizes the oxygen tank 62, while the hydrogen pressurization line 79 pressurizes the hydrogen tank 60. The accumulators 34 and 36 are maintained at an adequate pressure, and the tank pressurization controls 122 monitor and adjust pressurization. In this model, the accumulators supply all of the pressurization required for the propellant tanks to operate.

Figure 10A:
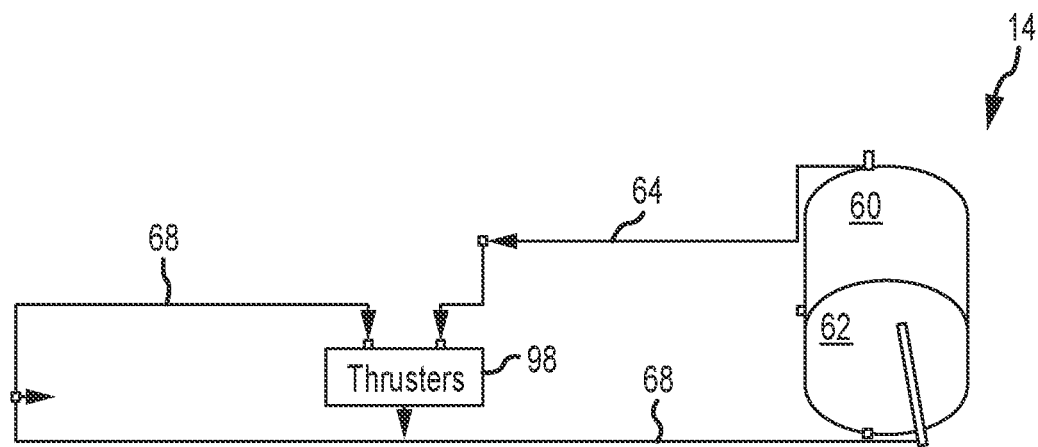
FIG. 10A is a schematic diagram illustrating another aspect of the invention, namely, venting the propellant tanks directly through the thrusters.
Figure 10B:
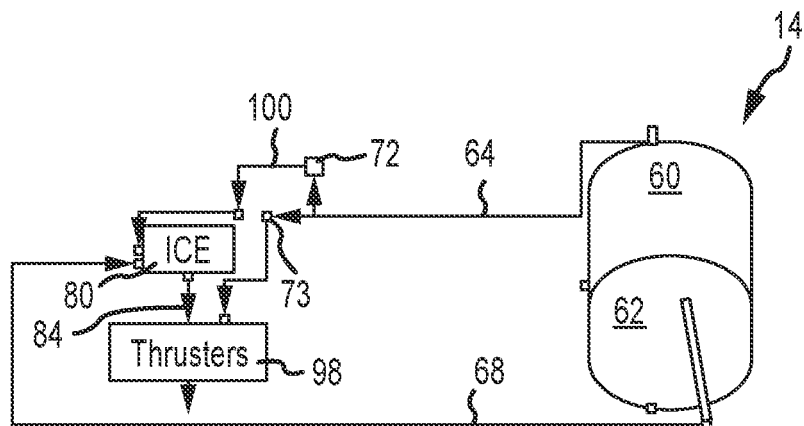
FIG. 10B is a schematic diagram illustrating the aspect of FIG. 10A, but venting through the ICE.

FIGS. 10A and 10AB illustrate an example of tank venting for some embodiments of the invention. Referring to FIG. 10A in one tank venting mode, the propellant tanks can be directly vented through the axial thrusters 98. The ullage gases are combined and combusted in the axial thrusters. As shown, the GH2 vent line 64 and GO2 vent line 68 both connect to the axial thrusters. The high thrust forces that can be generated with use of the ullage gases in this manner are very valuable to prevent vehicle shutdown caused by slosh of the LO2 and GH2. This high thrust producing venting mode can be activated at any time to relieve pressure in the propellant tanks, as well as to provide on demand, additional thrust for settling and attitude control. Referring to FIG. 10B in a low flow venting mode, the GH2 and the GO2 demands from the ICE engine 80 can be sufficient for relieving pressure in the propellant tanks to maintain them in optimal pressure conditions. The vent lines 64 and 68 provide the flow of GH2 and GO2, respectively to the ICE 80. The operation of the ICE 80 in this low venting mode provides continuous settling of the vehicle, and suppresses heating within the tanks to prevent boil off of the propellants.

Figure 11:
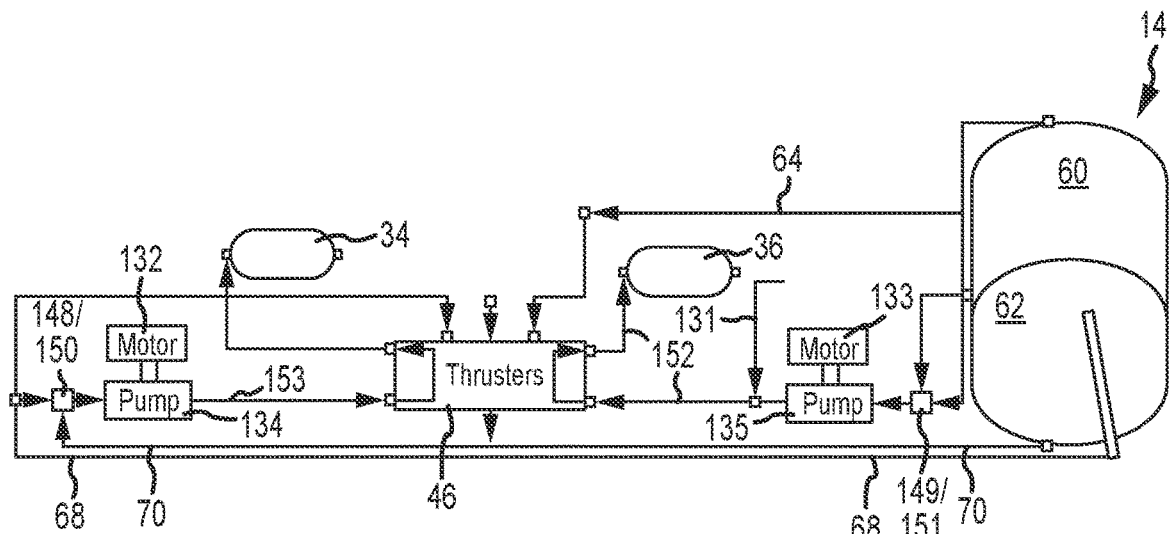
FIG. 11 is schematic diagram illustrating another aspect of the invention, namely, accumulator replenishment.

Now referring to FIG. 11, in accordance with another aspect or concept of the first exemplary embodiment of the present invention, accumulator replenishment is illustrated.

One fundamental concept of accumulator replenishment is that the accumulators 34 and 36 must be pressurized. Accordingly, pumps 134 and 135 are provided to pressurize the lines 153 and 152 that charge the accumulators 34 and 36, respectively. Drive motors 132 and 133 drive the pumps 134 and 135. The drive motors 132 and 133 may be powered by either the ICE 80, or may be electrically powered by the battery 48. A LO2 bleed along with a GO2 vent from tank 62 are controlled respectively by a liquid inlet valve 148 and ullage gas inlet valve 150. In the FIG. 11, these valves 148/150 are shown as a single block. These valves then meter the ullage gas or liquid oxygen through the pump 134 for ultimate delivery to the GO2 accumulator 34. The outlet line 153 from the pump 134 carries the ullage gas/liquid oxygen in a heat exchange relationship through the thruster group 46, functioning to extract heat as necessary from one or more of the thrusters in the assembly 46. The line 153 then carries the gaseous oxygen to the accumulator 34. The same arrangement is provided for hydrogen in which liquid hydrogen or GH2 ullage are provided through the inlet control valves 149/151, the pump 135 delivers the liquid/gaseous oxygen through outlet line 152 and in a heat exchanger relationship with the thruster group 46. Line 152 then carries the gaseous hydrogen to the GH2 accumulator 36. In summary, the motor driven pumps pressurize the ullage or liquid up to the necessary accumulator pressures. Liquid compression enables high pressure requiring only low shaft power from the drive motors 132 and 133. Heat is selectively added as needed through the thruster group 46 to thereby deliver primarily GH2 and GO2 through the lines 152 and 153, as most $LH_2$ and LO2 will boil when coming in contact with the thruster group 46.

Figure 12:
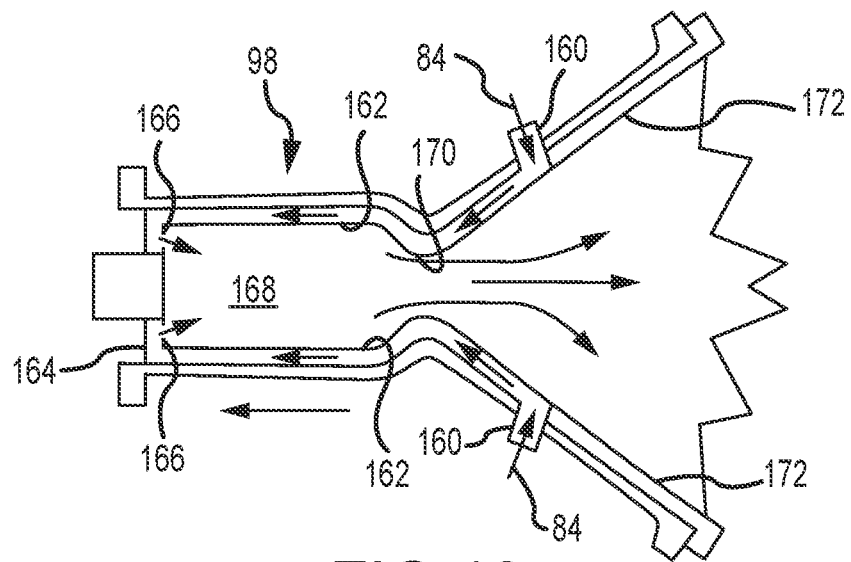
FIG. 12 is a schematic diagram of one type of axial thruster, namely, exhaust gas thrusting.
Figure 13:
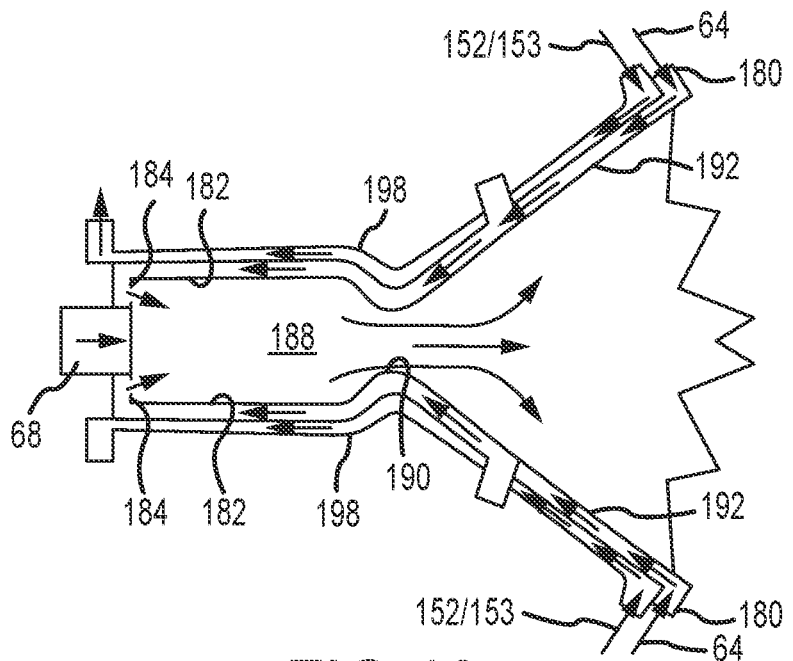
FIG. 13 is a schematic diagram of another type of axial thruster, namely, one that combusts GH2 and GO2.

Referring to FIGS. 12 and 13, in another aspect of the invention, different types of axial thrusters are illustrated. Referring first to FIG. 12, one example of exhaust gas thrusting is illustrated. The exhaust 84 from the ICE 80 communicates with one or more inlet ports 160 of a thruster 98. The GH2 rich exhaust gas at high temperature is then routed through internal passageways 162 of the thruster to the aft or rear end 164 of the thruster. At that point, the high temperature and pressurized gas is vented through one or more openings 168 into a first smaller chamber 168, through a nozzle or restriction 170, and then is allowed to expand within the cowl 172. The thrust is provided by the expanding gas as it passes through the nozzle 170 into the cowl 172. Therefore, efficient means are provided for axial thrusting by simply utilizing the exhaust gas from the ICE 80. Although the axial thruster 98 is illustrated, it is also contemplated that the exhaust gas 84 can be used to power any of the other thrusters.

Referring to FIG. 13, another type of thruster is illustrated in which ullage GH2 is combined with ullage GO2 and then combusted to create gas expansion and production of thrust. More specifically, one or more ullage gas inlets 180 are provided for receiving ullage GH2, such as through vent line 64. Similarly, oxygen can be provided through GO2 vent line 68. The GH2 flows through passageways 182 to cool the thruster, and through openings 184 to join the GO2 in the combustion chamber 188. An ignition source (not shown) ignites the GO2 and GH2, resulting in an expansion of gas through nozzle 190 into the cowl 192. FIG. 13 also shows the heat exchange that can occur with the liquid or gaseous propellants carried in the lines 152/153. As shown, a simple heat exchanger 198 is illustrated as a jacket that allows flow of the propellants over the exterior of the thruster to absorb heat from the thruster. The propellants are then carried downstream to the respective accumulators.

Figure 14:
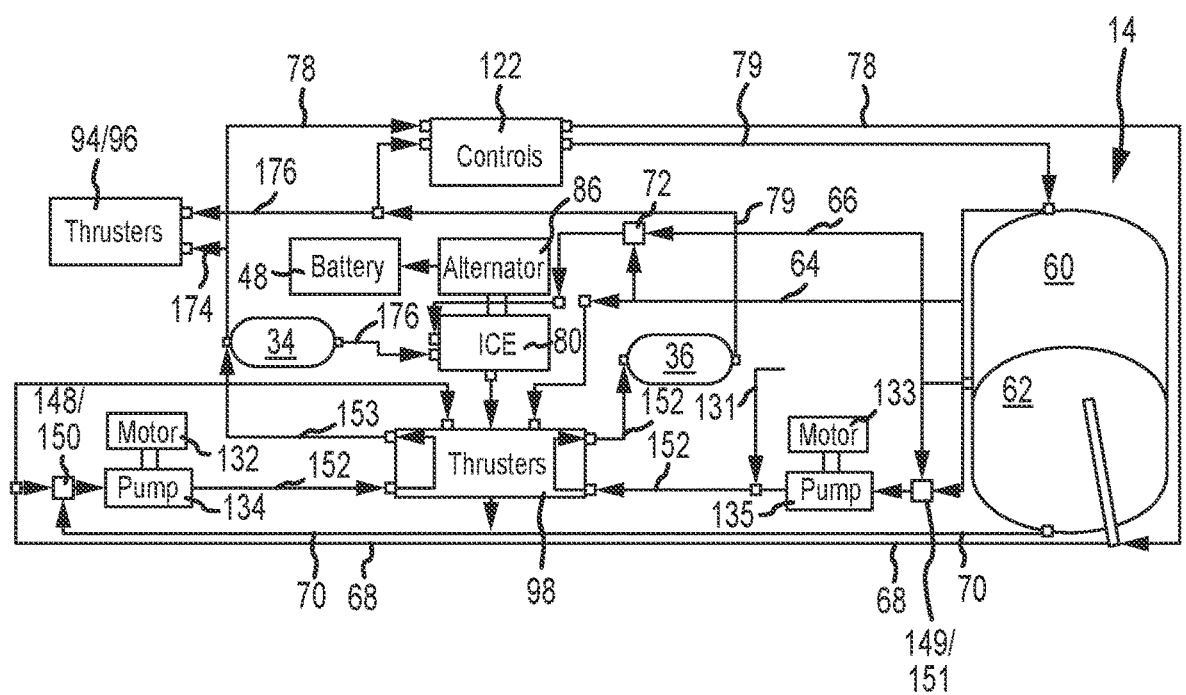
FIG. 14 is another schematic diagram illustrating basic functions of and exemplary embodiment of an IVF module.

Referring to FIG. 14, a system overview is provided showing the basic functions of the first exemplary embodiment of an IVF system. In general, the IVF system provides functions to include attitude control, sustained settling, tank pressurization, and a power supply. The ICE 80 provides power for an alternator 86 to generate current to be stored by the battery 48. The ICE 80 can also provide power to the drive motors 132 and 133 for powering the oxygen and hydrogen pumps 134 and 135 in order to pressurize the accumulators 34 and 36. The accumulators store GO2 and GH2 at high pressures, and provide the source of high pressure to pressurize the propellant tanks. Tank pressurization controls 122 monitor and maintain the $LH_2$ tank 60 and LO2 tank 62 at the proper pressures. The exhaust gas 84 from the ICE 80 can be used to drive the axial settling thrusters 98. Alternatively, ullage gas, supplemented with liquid hydrogen under peak demands, provides sustained settling thrust that greatly reduces losses in the tanks. The ICE 80 as well as the settling thrusters 98 can be cooled from the waste ullage gases by first passing the gases in a heat exchange relationship prior to combustion. The ICE 80 and the battery 48 work together to share power demands. Specifically, power boosts can be easily provided by changing the fuel mixture ratio for the ICE in order to either more quickly charge the battery 48 or to provide the necessary mechanical power for other vehicle systems.

Figure 15:
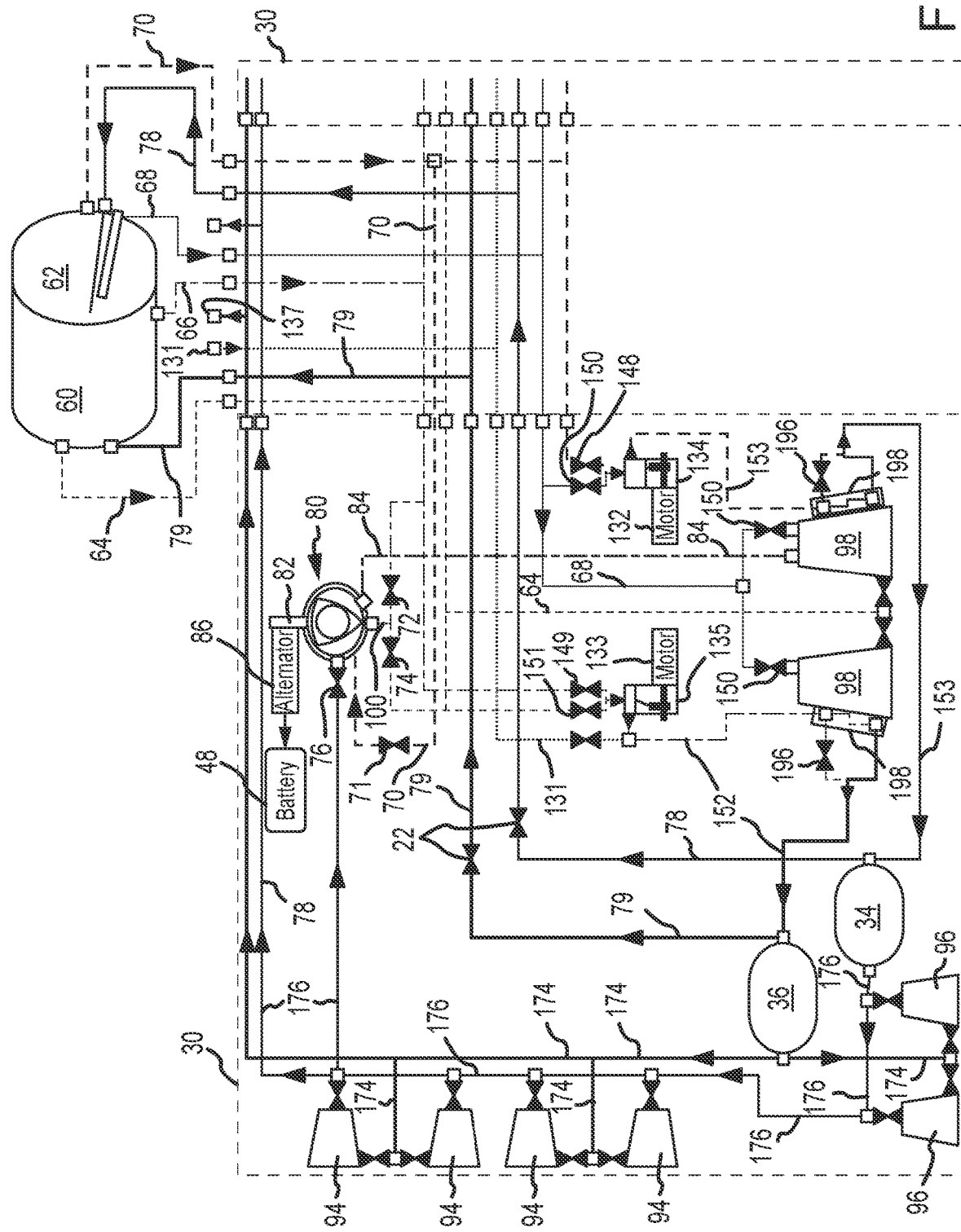
FIG. 15 is a system schematic illustrating the primary elements within one exemplary embodiment of an integrated fluid system and fluid connections between the elements in the system.

Referring to FIG. 15, a schematic system diagram is provided with a more detailed view of a plumbing schematic showing the system components of FIG. 14 and manner in which they are interconnected. More specifically, an IVF module 30 is shown with components, and the general piping connections between the components. The additional IVF module 30 shown on the right side of the diagram within the dotted lines has the same piping configuration as the fully illustrated IV module on the left side of the figure, but for clarity, the piping configuration is not shown for the right side IVF module. The various vent, purge, and bleed lines/elements are illustrated as they communicate with the propellant tanks. As also discussed in part with reference to the prior Figures, these vent, purge and bleed lines include hydrogen vent 64, hydrogen pressurization 79, GH2 bleed 131, H2 purge 137, LH2 bleed 66, GO2 vent 68, GO2 pressurization 78, and LO2 bleed 70.

For the axial thrusters 98, the schematic diagram shows the heat exchangers 198 that receive the pressurized gas/liquid through the lines 152/153 that are pressurized by the pumps 134 and 135. Bypass valves 196 allow the fluid/gas to be delivered directly to the accumulators without passing through the heat exchangers 198. As shown, only one of the axial thrusters 98 communicates with the exhaust line 84 for receiving the GH2 rich heated gas, while both of the axial thrusters are shown as being capable of operating as combustion type thrusters in which lines carry the ullage GO2 and GH2 to the axial thrusters for combustion.

For the pitch and yaw thrusters, these are preferably combustion type thrusters, each receiving GH2 and GO2 from the accumulators as shown. Specifically, pitch thrusters 94 and yaw thrusters 96 receive GO2 from line 176 that connects directly to the GO2 accumulator 34, and thrusters 94 and 96 receive GH2 fuel from lines 174 that connect directly to the GH2 accumulator 36.

As also discussed previously, the combination of vent and bleed lines from the LH2 and LO2 tanks provide fuel and an oxidizer to the ICE 80 that produces power for the vehicle. FIG. 15 also shows a supplemental method of providing oxidizer to the ICE 80 by inducting oxygen directly into the ICE 80 from the LO2 tank ullage instead of from the accumulator 34 and through the injector 76. Specifically, FIG. 15 shows the supplemental method by an extension of the LO2 bleed line 70 that connects directly to another intake port of the ICE 80. A throttle valve 71 connected inline can be used to meter the LO2 into the ICE 80 at a desired rate. One advantage of this supplemental method is that the ICE 80 can be operated without having to operate any system pumps.

The attitude and settling thrusters operate with combustion of the propellants, or at least one of the thrusters can produce thrust by using the exhaust gas from the ICE. The accumulators are pressurized, and control pressures in the propellant tanks. The IVF module is small, but can produce power and thrust to service all of the vehicles needs in these requirements.

Figure 16:
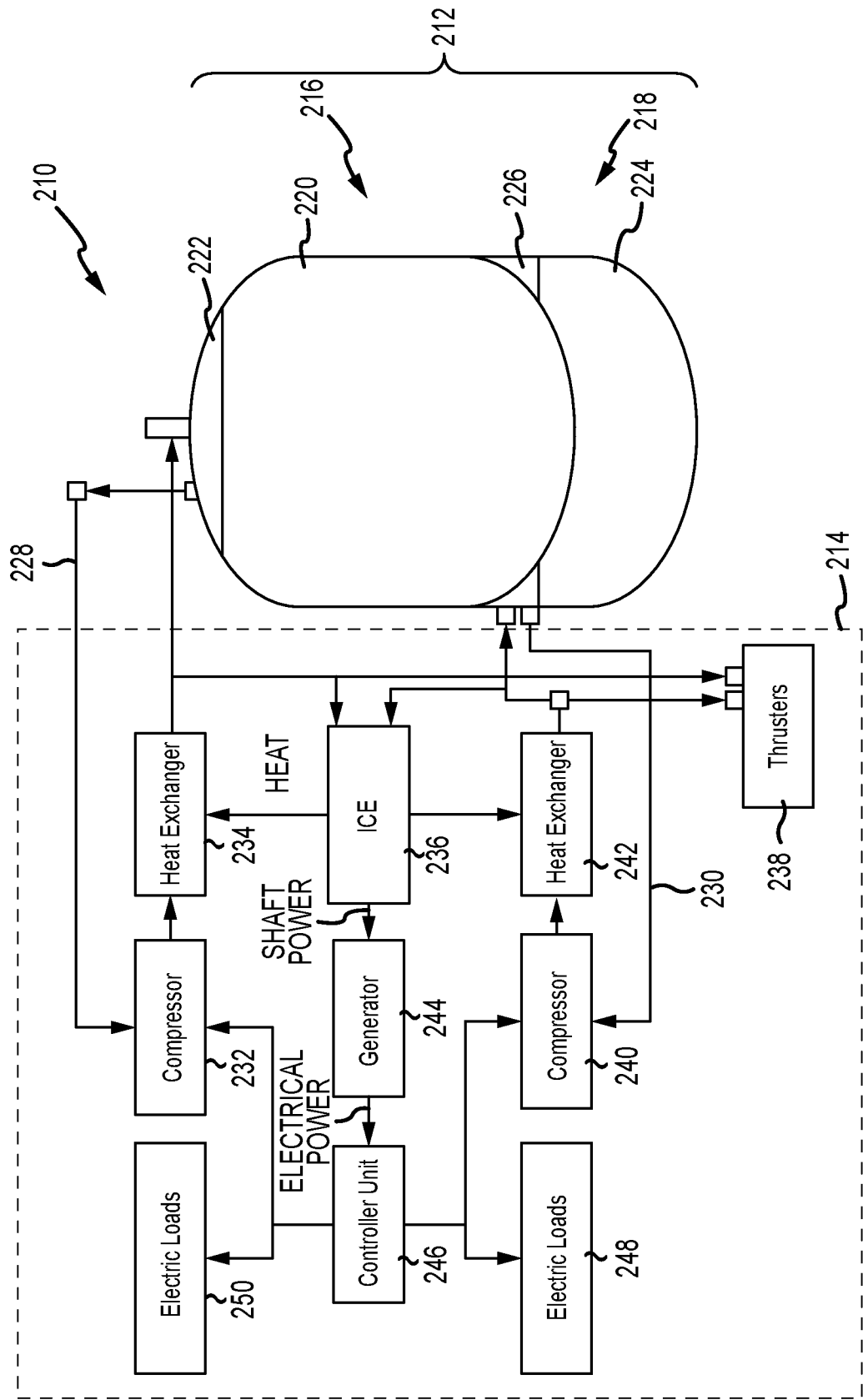
FIG. 16 is a schematic view of a second exemplary embodiment of an integrated vehicle fluid (IVF) system illustrating various components for utilizing ullage from tanks.

FIG. 16 illustrates an integrated vehicle fluid (IVF) system 210 of an upper stage of a launch vehicle in accordance with a second exemplary embodiment of the disclosure. The IVF system 210 uses conventional gases from the tanks to pressurize the tanks, generate electricity, and provide attitude adjustment for the upper stage of the launch vehicle. According to aspects of the present disclosure, the IVF system 210 comprises tanks 212 and at least one IVF module 214. In the depicted embodiment, the tanks 212 are a hydrogen tank 216 and an oxygen tank 218. It should be appreciated that other propellants may be utilized instead of, or in combination with, hydrogen and/or oxygen including, but not limited to, methane, kerosene, nitrogen tetroxide, hydrazine, hydrogen peroxide, nitrous oxide, etc. The hydrogen tank 216 has liquid hydrogen 220 and hydrogen gas 222, and the oxygen tank 218 has liquid oxygen 224 and oxygen gas 226. The hydrogen tank 216 and the oxygen tank 218 have a hydrogen gas line 228 and an oxygen gas line 230, respectively, that extend from the tanks 216, 218 to an IVF module 214. Generally, hydrogen gas 222 and the oxygen gas 226 travel through these lines 228, 230 and interact with several components in the IVF module 214 to provide the pressurization, electric power generation, and attitude adjustment functions for the IVF system 210. To enhance clarity, the gases 222, 226 vented from ullages space of the tanks may be referred to as a pressurant gas when returning to the tanks for pressurization, a reactant when entering an internal combustion engine for combustion, or a propellant when used in a thruster. In various embodiments of the disclosure, the IVF module 214 operates with gas pressures between 15 and 100 psia to minimize the effect of leaks and to reduce weight. Even with low pressures, the IVF module 214 can produce approximately 70 hp or 52.2 kW of power.

A compressor 232 draws in the vented hydrogen gas 222 and increases the pressure of the hydrogen gas 222. As a result, the hydrogen gas 222 circulates through the IVF system 210, and the enthalpy, or total energy, of the hydrogen gas 222 is increased for the various functions of the IVF system 210. The compressor 232 expels the hydrogen gas 222 into a heat exchanger 234 that transfers heat to the hydrogen gas 222, which further increases the enthalpy of the hydrogen gas 222. After exiting the heat exchanger 234, the hydrogen gas 222 can travel back to the ullage space in the hydrogen tank 216 as a pressurant gas for pressurization, travel to an internal combustion engine (ICE) 236 as a reactant for combustion and electric power generation, and/ or travel to a thruster assembly 238 as a propellant for attitude adjustment. The oxygen gas 226 travels through the IVF module 214 in a same or similar manner using a separate compressor 240 and a separate heat exchanger 242.

If the hydrogen gas 222 travels back to the hydrogen tank 216, the increased enthalpy of the hydrogen gas 222 increases the pressure within the hydrogen tank 216. After the launch vehicle has reached orbit and the main engines have shut off, it may be necessary, for instance, to re-start the main engines to change the orbit or flight path of the vehicle. The pumps (not shown) that supply the main engines with propellants have a requisite intake pressure for operation. Therefore, the IVF system 210 can pressurize the hydrogen tank 216 to supply the main engine pumps with propellant at a predetermined pressure. Similarly, the oxygen gas 226 can travel back to the oxygen tank 218 as a pressurant to increase the pressure within the oxygen tank 218.

If the hydrogen gas 222 and the oxygen gas 226 with increased enthalpy travel to an ICE 236 as reactants, the hydrogen gas 222 is combined with the oxygen gas 226 and then combusted in the ICE 236. As shown in FIG. 16, the ICE 236 generates heat, which is scavenged by a coolant system (described below) and supplied to the heat exchangers 234, 242 to increase the enthalpy of the hydrogen gas 222 and the oxygen gas 226. The ICE 236 produces mechanical work by rotating a shaft. A generator 244 is operatively interconnected to the shaft of the ICE 236 and generates electric power from the mechanical work. As shown in FIG. 16, the generator 244 supplies electric power to a controller unit 246, which then directs the supply of electric power to the compressors 232, 240, other various electric loads 248 in the IVF system 210, for example battery recharging, and electric loads 250 in the upper stage of the launch vehicle. For example, the generated electric power can be used to run a boost pump for the liquid oxygen as the main engines run to help prevent cavitation within the liquid oxygen pump supplying the main engines and to assist the oxygen pump.

If the hydrogen gas 222 and the oxygen gas 226 travel to the thruster assembly 238 as propellants, the propellants 222, 226 are vented or combusted in at least one thruster. As described in greater detail below, in at least some embodiments of the invention the at least one thruster is positioned on a platform that can gimbal relative to the upper stage of the launch vehicle. The at least one thruster provides attitude adjustment of the upper stage of the launch vehicle among other functions such as settling liquids in the tanks 212.

Figure 17:
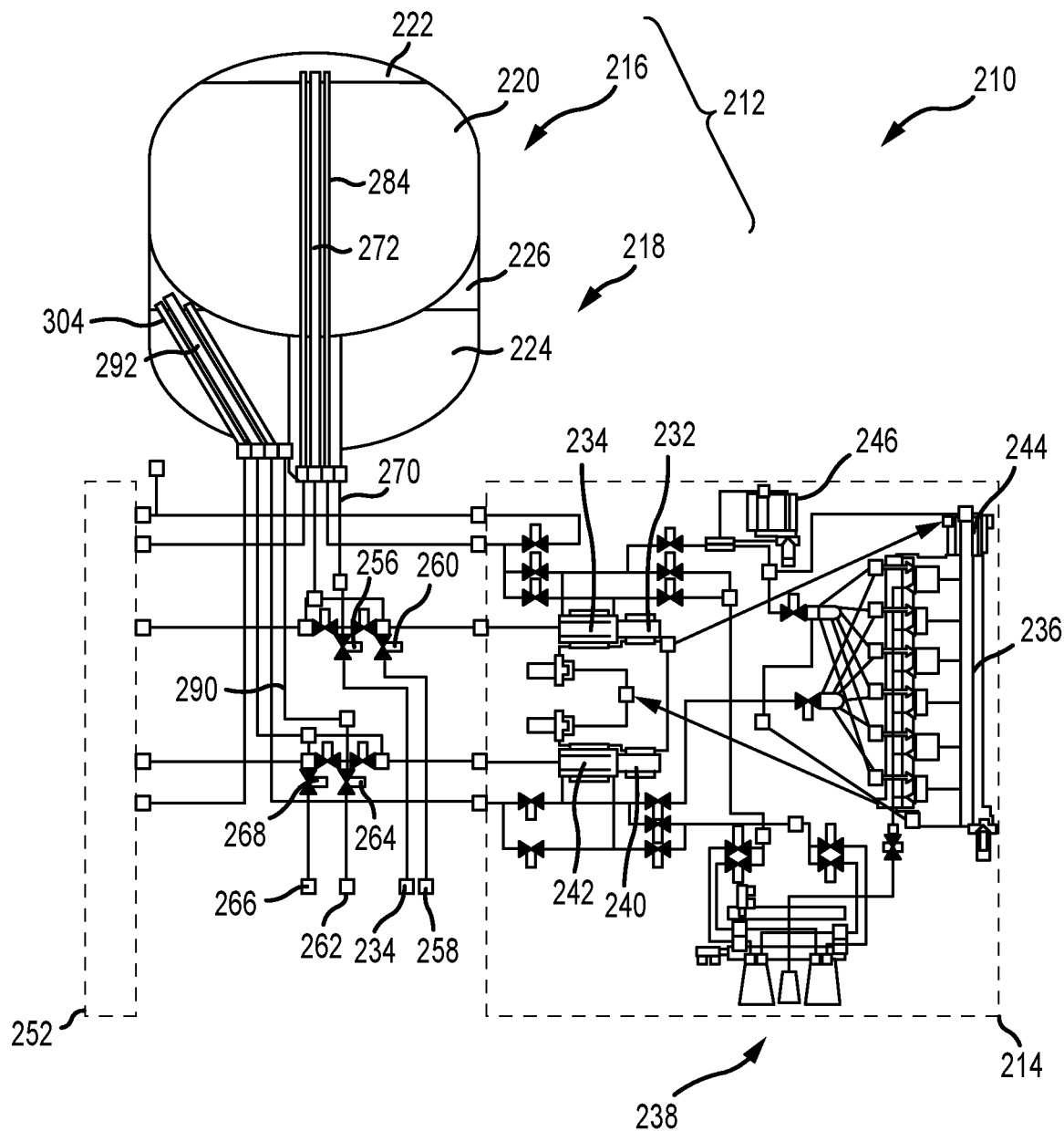
FIG. 17 is a detailed schematic view of the second exemplary embodiment of an IVF system illustrating the physical lines between various components.

While FIG. 16 illustrates the general relationship between components of the IVF system 210, FIG. 17 illustrates some of the physical linkages between components of the IVF system 210. The IVF system 210 comprises the tanks 212, a first IVF module 214, and a second IVF module 252 in this embodiment. The first IVF module 214 comprises compressors 232, 240, heat exchangers 234, 242, an ICE 236, a thruster assembly 238, a generator 244, and a controller unit 246. Though not depicted, the second IVF module 252 may also comprise these components in the same, or similar, configuration.

Fill and vent lines are shown for the tanks 212. A hydrogen fill line 254 supplies liquid hydrogen 222 to the liquid hydrogen line 270 and the hydrogen tank 216, and a hydrogen vent line 258 can vent hydrogen gas 220 from the ullage space of the hydrogen tank 216 and the hydrogen gas line 272. A hydrogen fill valve 256 controls the hydrogen fill line 254, and a hydrogen vent valve 260 controls the hydrogen vent line 258. Similarly, an oxygen fill line 262 supplies liquid oxygen 224 to the liquid oxygen line 290 and the oxygen tank 218, and an oxygen vent line 266 can vent oxygen gas 226 from the ullage space of the oxygen tank 218 and the oxygen gas line 292. An oxygen fill valve 264 controls the oxygen fill line 262, and an oxygen vent valve 268 controls the oxygen vent line 266. While the launch vehicle is on a ground surface prior to launch, the ambient environment constantly transfers heat to the tanks 212, which boils off liquid oxygen or liquid hydrogen. The fill and vent valves can manage the boil off by venting the gas and supplying the tanks 212 new liquid oxygen or liquid hydrogen as needed.

In addition, according to some aspects of the present invention, the gas lines 272, 292 and related pressurant lines 284, 304 can be stand pipes within the respective tanks 216, 218. In some embodiments, the stand pipes can be between approximately 3 to 4" in diameter and made from a polymeric composite, which is lightweight and can be buoyed within the liquid oxygen or liquid hydrogen. In addition, the stand pipes may have low heat transfer coefficients to help insulate the liquid oxygen or liquid hydrogen from, for example, warmer vent or pressurant gas. This creates temperature gradients within the tanks 212. Fiber optic or silicon diode temperature sensing devices can utilize the temperature gradients when the tanks 212 are in a low gravity environment to better estimate the amount of propellant within the tanks 212.

Figure 18A:
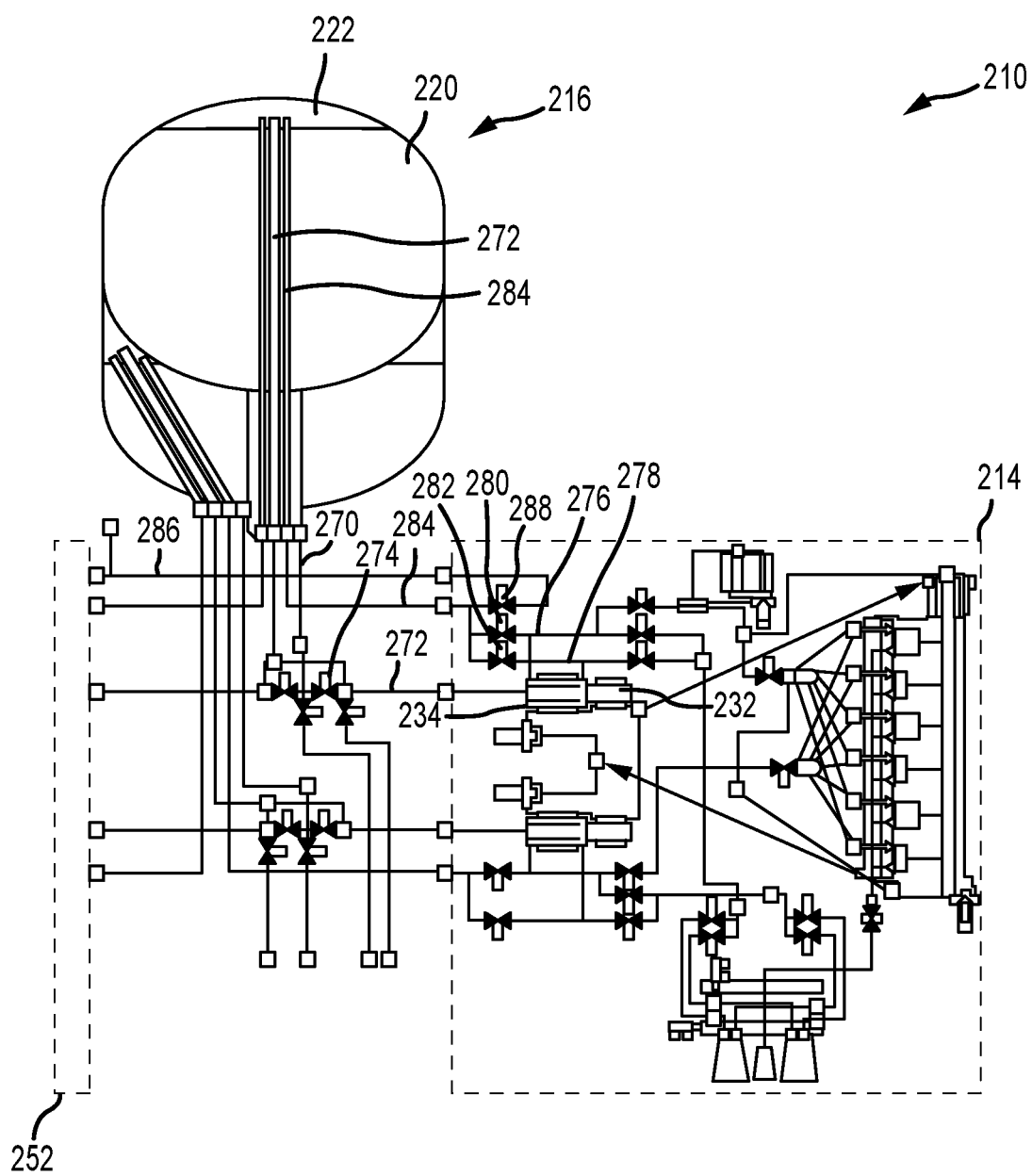
FIG. 18A is a detailed schematic view of the second exemplary embodiment of an IVF system illustrating the components and lines for pressurizing the hydrogen tank.

FIG. 18A illustrates the IVF system 210 and the components that pressurize the hydrogen tank 216. As shown, the hydrogen tank 216 has both liquid hydrogen 220 and hydrogen gas 222, and a liquid hydrogen line 270 draws liquid hydrogen 220 from the hydrogen tank 216 and a hydrogen gas line 272 draws vented hydrogen gas 222 from the hydrogen tank 216. The liquid hydrogen line 270 extends to a hydrogen mixer valve 274, which can introduce liquid hydrogen 220 to the vented hydrogen gas 222 flowing through the hydrogen gas line 272. Since the temperature and pressure of the hydrogen gas 222 are not constant in the hydrogen tank 216, the hydrogen mixer valve 274 can introduce varying amounts of liquid hydrogen 220 to control and normalize the characteristics, including temperature, of the vented hydrogen gas 222 flowing into the first IVF module 214. Adding liquid cools the gas, and as a corollary, adding more liquid cools the gas more than when less or no liquid is added to the gas.

Adding liquid hydrogen 220 to the vented hydrogen gas 222 can also contribute to the pressurization of the hydrogen tank 216. The liquid hydrogen 220 can receive heat from one or more heat sources, such as the hydrogen gas 222 or a heat exchanger, and then vaporize from a liquid to a gas. Energy is therefore transferred from the warm vented gas to the cold liquid and their streams are combined to form a gas stream of intermediate temperature. This temperature can be controlled by modulating the amount of liquid added. The temperature of the gas entering the compressor and the heat exchanger are thus controlled to optimize their operation regardless of ullage gas temperature conditions.

The vented hydrogen gas 222 enters the first IVF module 214 and is drawn into a compressor 232, which increases the pressure of the hydrogen gas 222, which increases the enthalpy of the hydrogen gas 222. After discharged from the compressor 232, the hydrogen gas 222 can travel through a hydrogen hot line 276 and through a heat exchanger 234 or bypass the heat exchanger 234 via a hydrogen cold line 278. The hydrogen gases 222 in each line 276, 278 have differing enthalpies and can be combined in varying amounts to supply the hydrogen tank 216 with the desired amount of enthalpy increase, and thus, pressure increase.

In the heat exchanger 234, coolant from a coolant loop transfers heat to the vented hydrogen gas 222, which increases the enthalpy of the hydrogen gas 222. The heat exchanger 234 discharges the hydrogen gas 222, and the hydrogen hot line 276 extends to a joint where the hydrogen hot line 276 merges with the hydrogen cold line 278. As noted above, the hydrogen cold line 278 contains hydrogen gas 222 that bypassed the heat exchanger 234 and did not receive a further increase in enthalpy.

A hydrogen hot pressurant valve 280 on the hydrogen hot line 276 and a hydrogen cold pressurant valve 282 on the hydrogen cold line 278 can modulate the flow rate of hydrogen gas 222 through each line 276, 278 to control the characteristics of the combined pressurant hydrogen gas 222 after the lines 276, 278 merge together. For instance, the hydrogen hot pressurant valve 280 can open more and/or the hydrogen cold pressurant valve 282 can close more to increase the enthalpy of the pressurant hydrogen gas 222, and vice versa to decrease the enthalpy of the pressurant hydrogen gas 222. This modulation determines the resulting pressure increase in the hydrogen tank 216.

Figure 18B:
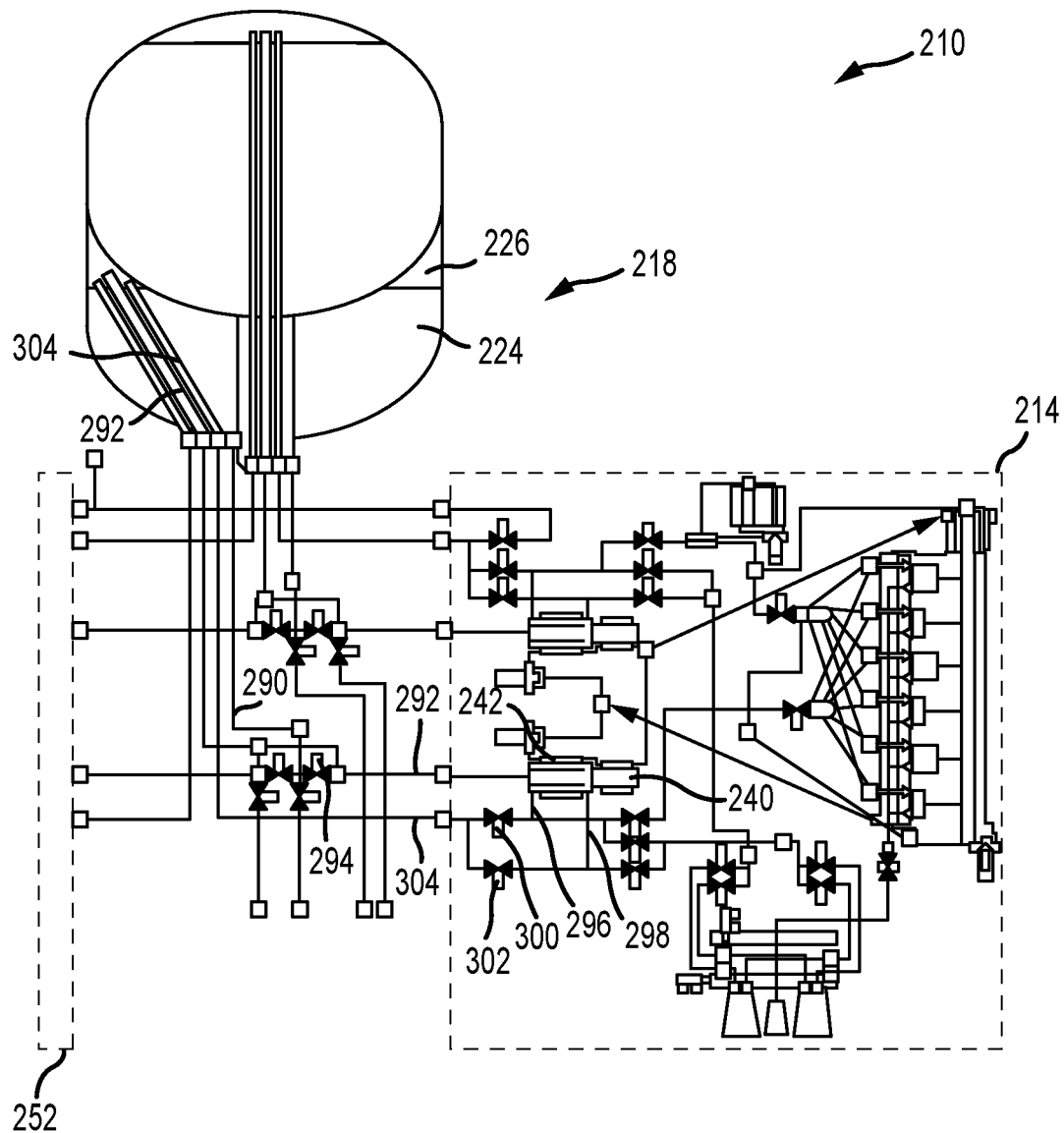
FIG. 18B is a detailed schematic view of the second exemplary embodiment of an IVF system illustrating the components and lines for pressurizing the oxygen tank.

FIG. 18B illustrates the IVF system 210 and the components that pressurize the oxygen tank 218. The components used to pressurize the oxygen tank 218 operate in the same or similar manner as those for the hydrogen tank 216. Thus, analogous to the description for FIG. 18A, a liquid oxygen line 290, an oxygen gas line 292, an oxygen mixer valve 294, an oxygen hot line 296, an oxygen cold line 298, an oxygen hot pressurant valve 300, an oxygen cold pressurant valve 302, and an oxygen pressurant line 304 operate to pressurize the oxygen tank 218.

Figure 19:
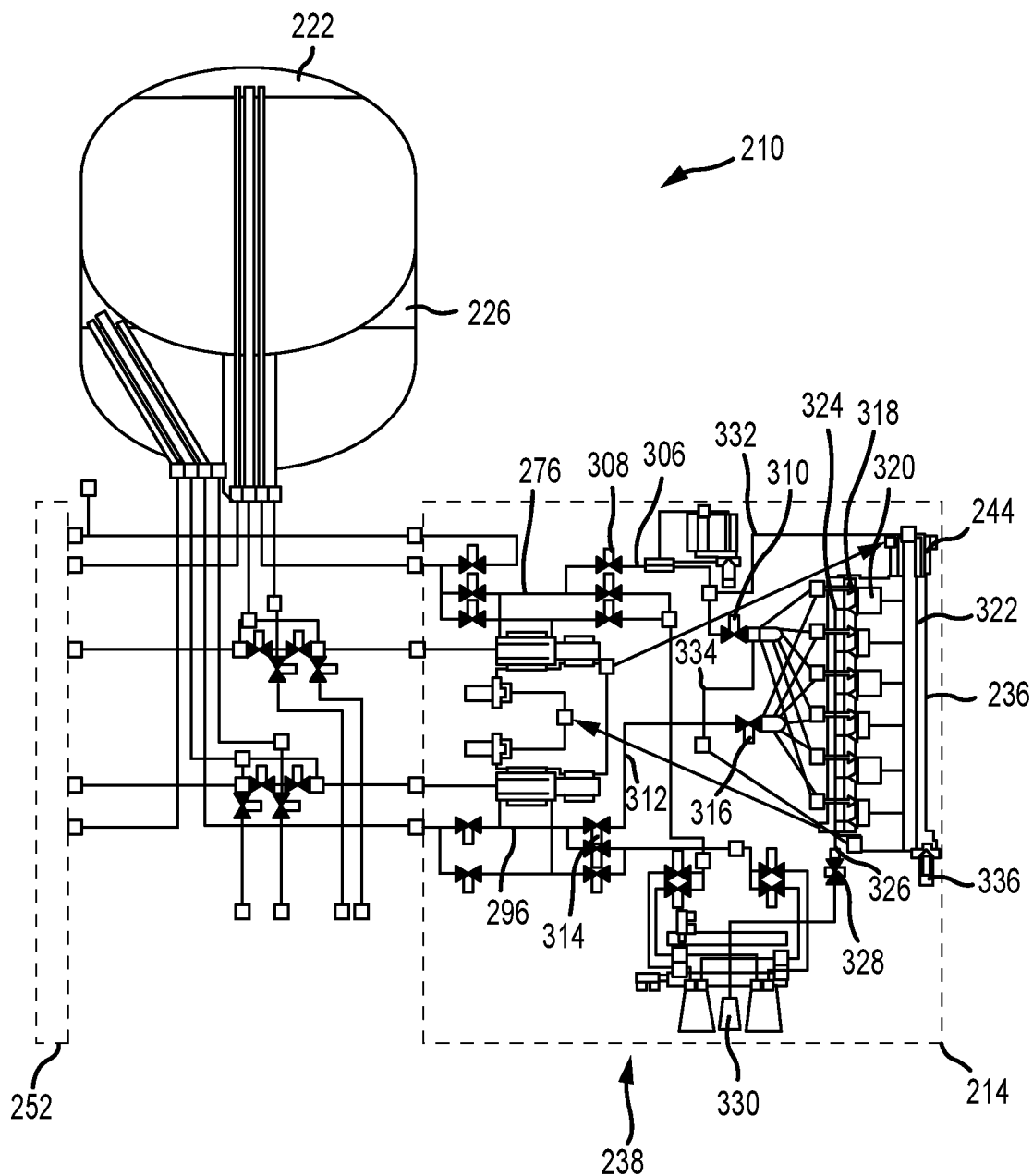
FIG. 19 is a detailed schematic view of the second exemplary embodiment of an IVF system illustrating the components and lines for generating electric power.

FIG. 19 illustrates the IVF system 210 and the components that produce electric power. In the depicted embodiment, the ICE 236 uses hydrogen gas 222 and oxygen gas 226, or reactants, to turn a crankshaft 322. A generator 244 is operatively interconnected to the crankshaft 322 and uses the rotating crankshaft 322 to generate electric power. The reactants 222, 226 are supplied by the hydrogen hot line 276 and the oxygen hot line 296, respectively. A hydrogen ICE line 306 extends from the hydrogen hot line 276, and a hydrogen ICE bleed valve 308 controls the flow of hydrogen gas 222 into the hydrogen ICE line 306. Similarly, an oxygen ICE line 312 extends from the oxygen hot line 296, and an oxygen ICE bleed valve 314 controls the flow of oxygen gas 226 into the oxygen ICE line 312. Reactants 222, 226 provided by the hot lines 276, 296 are not combined with gases 222, 226 from cold lines that bypass the heat exchangers. Generally, the ICE 236 is more efficient when supplied with reactants 222, 226 that have higher enthalpy. However, it will be appreciated that other embodiments may include gases 222, 226 from cold lines to control the enthalpy of the reactants 222, 226 flowing into the ICE 236.

Next, the hydrogen gas 222 travels to a hydrogen throttle valve 310, and the oxygen gas 226 travels to an oxygen throttle valve 316. These throttle valves 310, 316 precisely control the rate at which the reactants 222, 226 flow into the ICE 236. The throttle valves 310, 316 can be variable-position, pintle valves with redundant brushless DC motor linear actuators to accurately and precisely establish the flow rates of the reactants into the ICE 236. After the throttle valves 310, 316, the ICE lines 306, 312 split to deliver the reactants 222, 226 to an intake manifold 318 of the ICE 236. In the depicted embodiment, the ICE 236 is a six cylinder engine. Therefore, each ICE line 306, 312 splits into six smaller lines to deliver the reactants 222, 226 to each cylinder 320. Within the intake manifold 318, the reactants 222, 226 combine just before entering the combustion chamber, which is defined in part by the cylinder 320. Ignition of the combined reactants 222, 226 drives a piston down the length of the cylinder 320, which turns the crankshaft 322. Rotation of the crankshaft 322 turns the generator 244 that produces electric power. On the exhaust stroke, the piston travels back up the cylinder 320, and the combusted reactants 222, 226, or gas exhaust, are expelled through an exhaust manifold 324 of the ICE 236.

The gas exhaust travels through the exhaust manifold 324 and out into an exhaust line 326. An exhaust valve 328 controls the flow rate of the exhaust gas through the exhaust line 326 and hence the amount of back pressure that extends back through the exhaust manifold 324 and into the ICE 236. Further, the exhaust valve 328 can shut off when the ICE 236 shuts off to keep the ICE 236 pressurized for re-starting the ICE 236 and to prevent coronal discharge. The exhaust gas in the exhaust line 326 travels to an exhaust nozzle 330 of the thruster assembly 238 to contribute to the attitude adjustment function of the IVF system 210.

When the IVF system 210 requires large amounts of electric power generation without tank pressurization, then the IVF system 210 must manage the heat generated by the ICE 236. The hydrogen mixer valve can add liquid hydrogen to the hydrogen gas for vaporization to absorb heat generated by the ICE 236. Vaporization of the liquid hydrogen requires additional energy and allows the coolant loop to transfer additional heat from the ICE 236 to the liquid hydrogen. Operation of the compressor is not necessarily required, and the vaporized hydrogen gas can be vented out of the thruster assembly 238 with or without combustion. In addition, the exhaust valve can open more fully such that more heat is expelled through the exhaust nozzle 330 of the thruster group 238 and less heat is transferred from an exhaust manifold of the ICE 236 to the coolant loop.

Also shown in FIG. 19 is a system that ventilates the interior spaces of the ICE 236. While the ICE 236 is running, the combustion of reactants 222, 226 can create water vapor that blows by the piston and into the crank case. Having water vapor in the crankcase and/or other interior spaces of the ICE 236 after the ICE 236 has stopped running is undesirable. To ventilate or purge these interior spaces, a hydrogen ventilation line 332 extends from the hydrogen ICE line 306 to the ICE 236, and hydrogen gas 222 travels through the hydrogen ventilation line 332 and into the interior spaces of the ICE 236. The hydrogen gas 222 carries the water vapor to an opposing end of the ICE 236. A hydrogen ventilation line 332 can return the hydrogen gas 222 and water vapor to the hydrogen ICE line 306. Alternatively, the hydrogen ventilation line 332 can dump the hydrogen gas 222 and water vapor into the exhaust line 326.

Lastly, a lubrication pump 336 is depicted in FIG. 19. The lubrication pump 336 circulates a mixture of lubricant and blowby gases (e.g. water vapor or hydrogen) through the crankcase and other interior spaces of the ICE 236. The system uses the momentum of the gases to circulate liquid lubricant around the ICE without reliance on external G forces. The system can thus operate equally well under zero-G conditions and high G conditions. While the ICE 236 is running, the water vapor that blows by the piston contributes to the circulation of the lubricant by improving momentum transfer to the lubricant and hence augmenting its transport.

Figure 20:
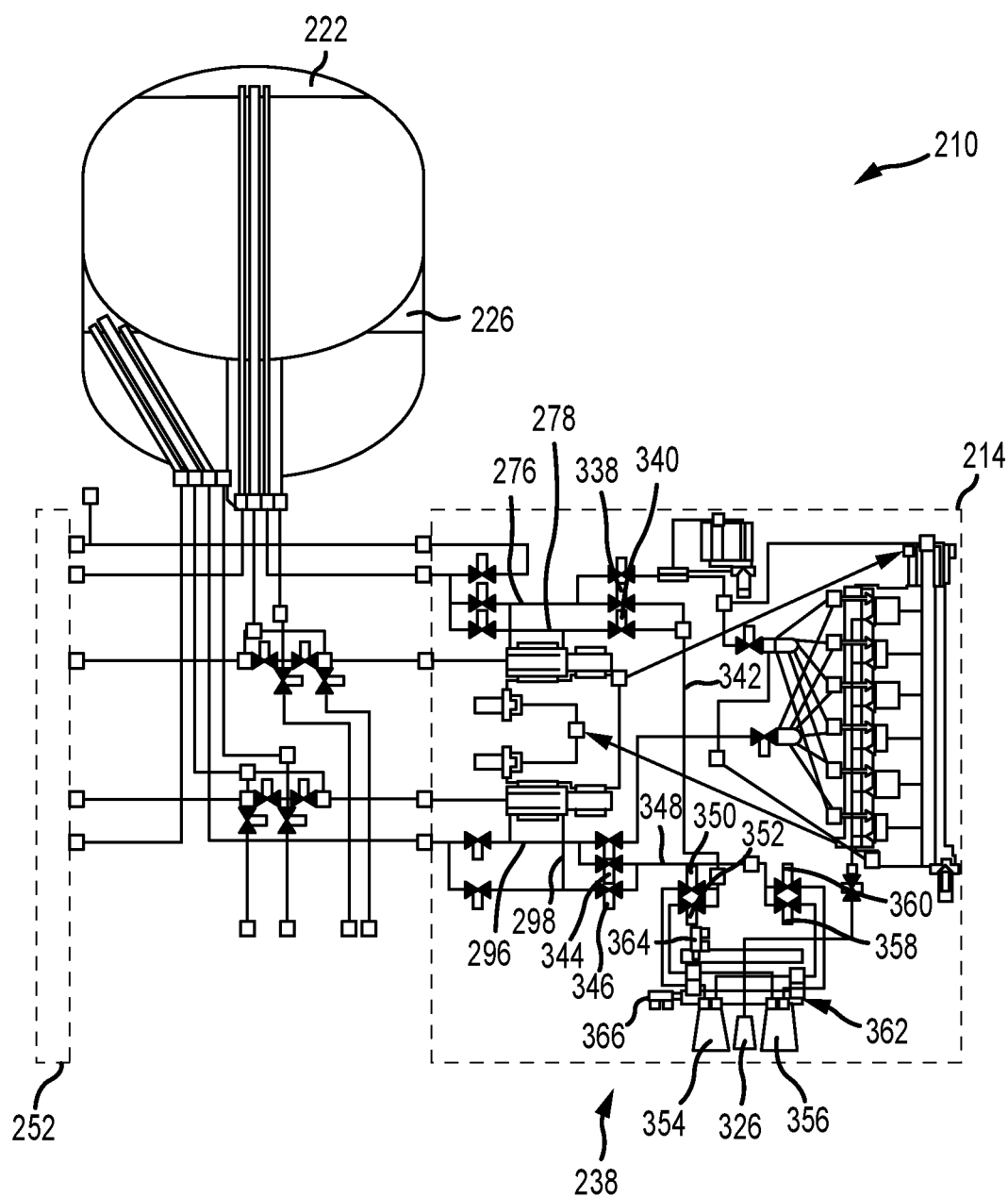
FIG. 20 is a detailed schematic view of the second exemplary embodiment of an IVF system illustrating the components and lines for supplying the thruster assembly with propellants.

FIG. 20 illustrates the IVF system 210 and the components that provide attitude adjustment for the upper stage of the launch vehicle consistent with the second exemplary embodiment. As noted above, a hydrogen hot line 276 and a hydrogen cold line 278 have hydrogen gas 222 with differing enthalpies. A hydrogen hot thruster bleed valve 338 is positioned on the hydrogen hot line 276, and a hydrogen cold thruster bleed valve 340 is positioned on the hydrogen cold line 278. These bleed valves 338, 340 modulate the flow of the hydrogen gases as the gases merge and form a combined hydrogen gas that flows through a hydrogen thruster line 342. As with the tank pressurization function, the bleed valves 338, 340 control the enthalpy of the combined hydrogen gas to optimize the combined hydrogen gas for use as propellants in a thruster, among other functions. For instance, use of colder hydrogen gas can reduce the enthalpy drain on the IVF system 210, and use of hotter hydrogen gas can contribute the heat rejection function of the IVF system 210.

Similarly, an oxygen hot line 296 and an oxygen cold line 298 provide oxygen gas with differing enthalpies, and an oxygen hot thruster bleed valve 344 on the oxygen hot line 296 and an oxygen cold thruster bleed valve 346 on the oxygen cold line 298 modulates the oxygen gases as the oxygen gases combine and flow through an oxygen thruster line 348.

As the hydrogen thruster line 342 approaches the thruster assembly 238, the hydrogen thruster line 342 splits into two lines, one line for each of a first thruster 354 and a second thruster 356. A hydrogen first thruster valve 350 controls the flow of the combined hydrogen gas into the first thruster 354, and a hydrogen second thruster valve 352 controls the flow of the combined hydrogen gas into the second thruster 356. Likewise, the oxygen thruster line 348 splits into two lines, an oxygen first thruster valve 358 controls the flow of the combined oxygen gas into the first thruster 354, and an oxygen second thruster valve 360 controls the flow of the combined oxygen gas into the second thruster 356. The mixture of propellants can be combusted in the thrusters 354, 356 to provide attitude adjustment for the upper stage of the launch vehicle. Modulation of the thruster propellant valves enables independent control of thrust and mixture ratio for each thruster.

According to some embodiments of the present invention, the thrusters 354, 356 and exhaust nozzle 330 are positioned on a common platform 362, which can be gimbaled relative to the rest of the vehicle. An elevation actuator 364 moves the platform 362 in one dimension, and an azimuth actuator 366 moves the platform 362 in another dimension. As a result, the thrusters 354, 356 and exhaust nozzle 330 can be articulated in a plurality of directions to provide attitude adjustment for the vehicle.

Figure 21:
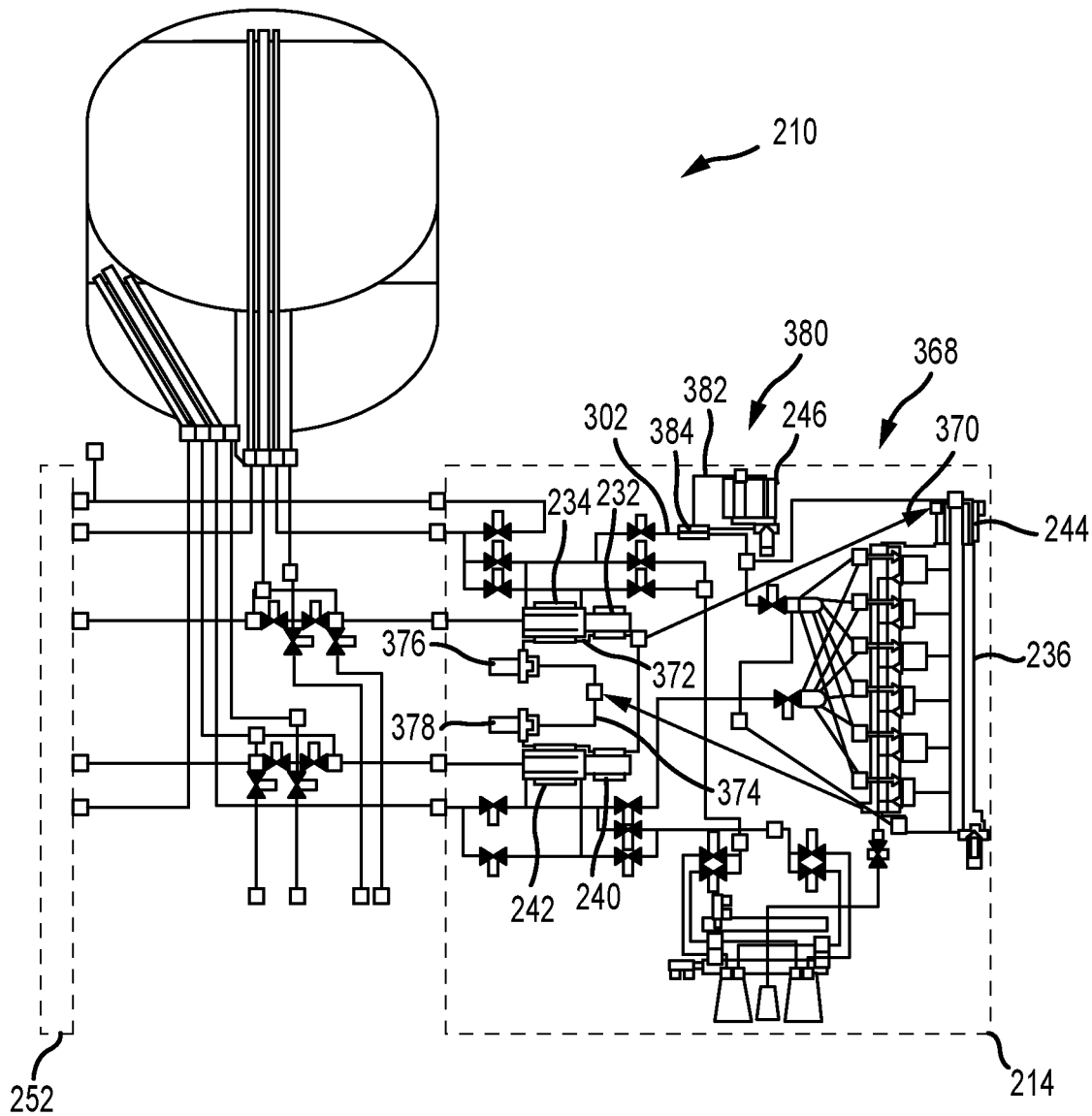
FIG. 21 is a detailed schematic view of the second exemplary embodiment of an IVF system illustrating the components and lines for cooling and heating various components.

FIG. 21 illustrates a coolant loop 368 that scavenges heat from various sources and transfers the heat to the hydrogen and oxygen gases through the heat exchangers 234, 242. The coolant loop 368 has a main coolant line 370 that circulates through the generator 244 and through the ICE 236. As the main coolant line 370 travels toward the heat exchangers 234, 242, the main coolant line 370 diverges into a hydrogen branch line 372 and an oxygen branch line 374. The hydrogen branch line 372 travels through the heat exchanger 234 for the hydrogen gas and transfers heat to the hydrogen gas. After exiting the heat exchanger 234, the hydrogen branch line 372 scavenges heat from the motor of the compressor 232 but also transfers heat to the bearings used within the compressor 232 to allow the bearings to function while the compressor acts on vented gas at cryogenic temperatures. Stated differently, cryogenic bearings, which are cost prohibitive, are not required as system function is achieved with non-specialized or customized parts, including bearings and motors. A first coolant pump 376 is positioned on the hydrogen branch line 372 to circulate coolant through the hydrogen branch line 372 and, generally, the coolant loop 368.

The oxygen branch line 374 travels through the heat exchanger 242 for the oxygen gas and transfers heat to the oxygen gas. Like the hydrogen branch line 372, the oxygen branch line 374 exits the heat exchanger 242 and scavenges heat from the motor of the compressor 240 but also transfers heat to the bearings within the compressor 240. The oxygen branch line 374 has a second coolant pump 378 to circulate coolant through the oxygen branch line 374 and through the coolant loop 368. The hydrogen branch line 372 and the oxygen branch line 374 merge back into the main coolant line 370, which then extends back to the generator.

The coolant pumps 376, 378, as directed by the controller unit, can control the relative amount of heat that is transferred to the hydrogen gas versus the oxygen gas without the need for additional valves or other flow control devices. For instance, the first coolant pump 376 can have a high flow rate through the hydrogen branch line 372 to transfer more heat to the hydrogen gas relative to the oxygen gas. Further, a single pump can function to circulate coolant to prevent the coolant from freezing in the event that one pump fails. The coolant pumps 376, 378 together also control the coolant flow through the main coolant line 370, and thus, the flow rate of the coolant through the various heat sources and how much overall heat is transferred to the hydrogen and oxygen gases. Similarly, the flow rate of the gases through the compressors and heat exchangers can be adjusted relative to the coolant flow rate to control the rate at which various IVF module components are cooled and the rate at which the gases are warmed by the oxygen and hydrogen heat exchangers 234, 242 and compressors 232, 240.

Also illustrated in FIG. 21 is a controller coolant loop 380 for the controller unit 246. The controller coolant loop 380 scavenges heat from various components of the controller unit 246 and transfers the scavenged heat to the hydrogen gas in the hydrogen ICE line 302, which further increases the enthalpy of the hydrogen gas flowing into the ICE 236 to improve the efficiency of the ICE 236. The controller coolant loop 380 has a main controller coolant line 382 that flows into a controller heat exchanger 384 to provide the additional heat transferred to the hydrogen gas.

Figure 22:
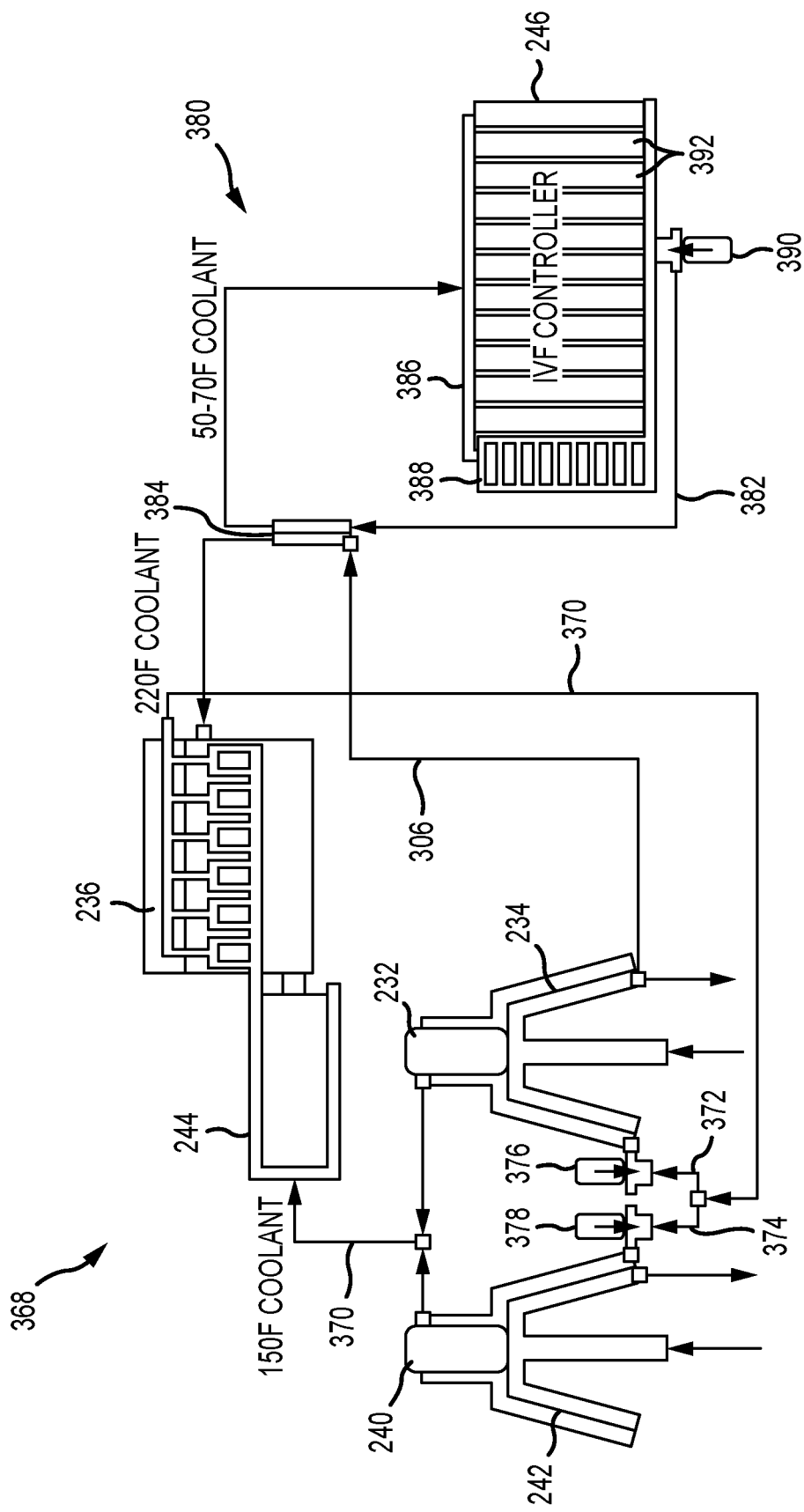
FIG. 22 is a schematic view of the second exemplary embodiment of an IVF system illustrating the components and lines for cooling and heating various components.

A further illustration of the coolant loop 368 and controller coolant loop 380 is provided in FIG. 22. In this embodiment, the sources of heat include, the ICE 236, the generator 244, the compressors 232, 240 (specifically, the motors of the compressors 232, 240), and the controller unit 246. One coolant loop 368 scavenges heat from the ICE 236, the generator 244, and the compressors 232, 240. In the depicted exemplary embodiment, the coolant exiting the ICE 236 has a temperature of approximately of 220° F., and the coolant is reduced to a temperature of approximately 150° F. upon exiting the interface with the oxygen and hydrogen compressors 232, 240 and prior to interfacing with the generator 244. Another coolant loop 380 scavenges heat from the controller unit 246.

It will be appreciated that various embodiments can scavenge heat from one or more components in various orders using any number of coolant loops. For instance, a coolant loop may circulate through the heat exchangers 234, 242 and the compressors 232, 240 before circulating through an exhaust manifold of the ICE 236, through the ICE 236, and then the generator 244 before returning to the heat exchangers 234, 242. Further, a single coolant loop can scavenge heat from all of the major heat-producing components of the IVF module. Further still, each component may have a single coolant loop for heat scavenging. After the coolant loop 368 passes through the exhaust manifold, the coolant loop diverges into six separate lines, one for each of the six cylinders of the ICE 236. As described elsewhere herein, the lines can pass around the cylinder with a particular geometry, such as a helix, to scavenge heat from the cylinder and the combustion chamber associated with the cylinder. After passing the cylinders, the six lines are collected into a runner line, and the coolant loop 368 continues on as a single line. As an alternative, rather than having a separate coolant line for each cylinder, multiple cylinders may be cooled by a single coolant line. For example, pairs of cylinders may be cooled by a single coolant line.

Also depicted in FIG. 22 is a controller coolant loop 380 that functions to cool the controller unit 246. A coolant supply manifold or reservoir 386 envelopes the controller unit 246 and batteries 388. A main controller coolant line 382 transports coolant from the reservoir 386 to the controller heat exchanger 384 where the coolant interfaces with a hydrogen ICE line 306 destined for the ICE 236. The controller heat exchanger 384 warms the hydrogen gas destined for the ICE 236, thereby reducing the temperature of the coolant for purposes of cooling the controller unit 246. The main controller coolant line 382 returns the coolant to the reservoir 386. A controller coolant pump 390 is part of the system and circulates the coolant within the main controller coolant line 382 and reservoir 386 as needed. Alternatively, the controller coolant loop 380 could interface with oxygen gas or both hydrogen and oxygen gas.

According to aspects of the present disclosure, the spacecraft avionics, in the form of a controller unit 246, may be physically combined with the batteries 388 for thermal control. Coolant is circulated among the batteries 388 and controller unit 246 by small redundant, electrically driven pumps 390. The coolant surrounding the batteries 388 and controller unit 246 may additionally function as a reservoir for coolant supply. The mass of the battery cells also serves to stabilize the temperature of the coolant and reduce variations in its temperature even with very small coolant mass. According to at least some embodiments, cold coolant flows through channels between individual battery cells and between controller slices 392 that comprise the controller unit 246. In one embodiment, the controller slices 392 are linearly aligned with a separate battery 388 at one end. Optionally, a second battery may be positioned at the opposite end, or at a discrete position separate from the controller unit. The coolant circulation channels may pass among individual batteries 388 and controller slices 392 or among groups of batteries 388 and controller slices 392. The chassis supporting the batteries 388 and controller slices 392 is preferably formed using laser sintering additive manufacturing. In this way, the channels and coolant flow paths are integrally formed and extensive external plumbing is eliminated thus reducing the potential for leaks.

As previously described, the controller coolant loop 380 also includes a heat exchanger 384. Heat generated by the batteries 388 and controller unit 246 may be advantageously used to increase the enthalpy of the propellant and power generation systems. More specifically, the heat exchanger 384 removes the accumulated heat from the batteries 388 and controller unit 246 which is used to increase system enthalpy and to decrease the temperature of the coolant. In this way, the coldest coolant may be supplied to the batteries 388 and high power controller slices 392. The coolant remains in a liquid phase even though it interfaces with cryogenic hydrogen gas on the other side of the heat exchanger 384. Because of this cooling, the controller unit 246 can handle production, rectification and control of over 50 kW of electricity without overheating. In one embodiment, approximately 5 kW of waste heat generated by the controller unit 246 and batteries 388 is dissipated in the generation of over 50 kW of electricity while maintaining the temperature of the coolant interfacing with the controller unit 246 and batteries 388 in a range of approximately 50° to 70° F.

Figure 23:
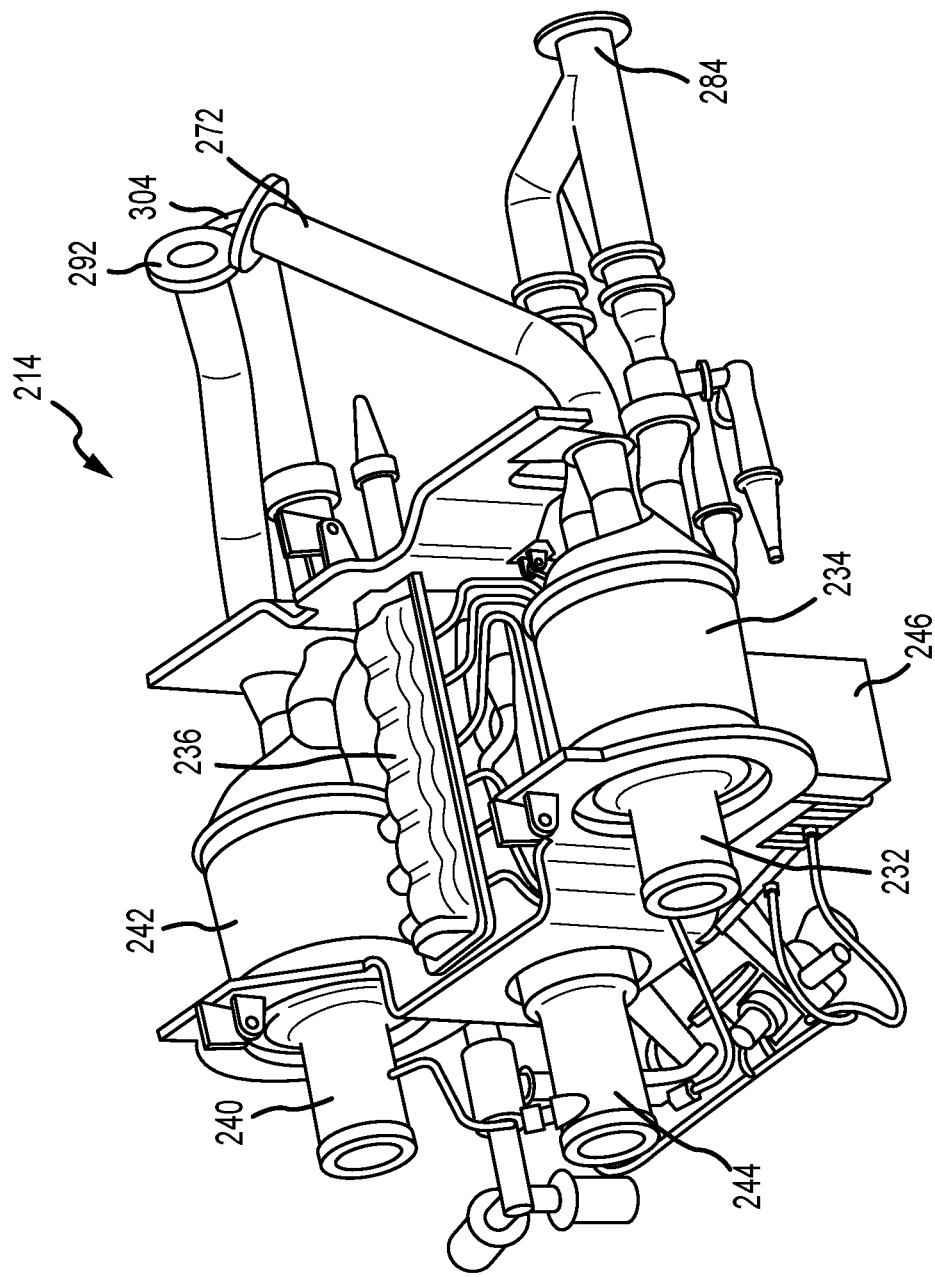
FIG. 23 is a perspective view of the second exemplary embodiment of an IVF module illustrating various components.
Figure 24:
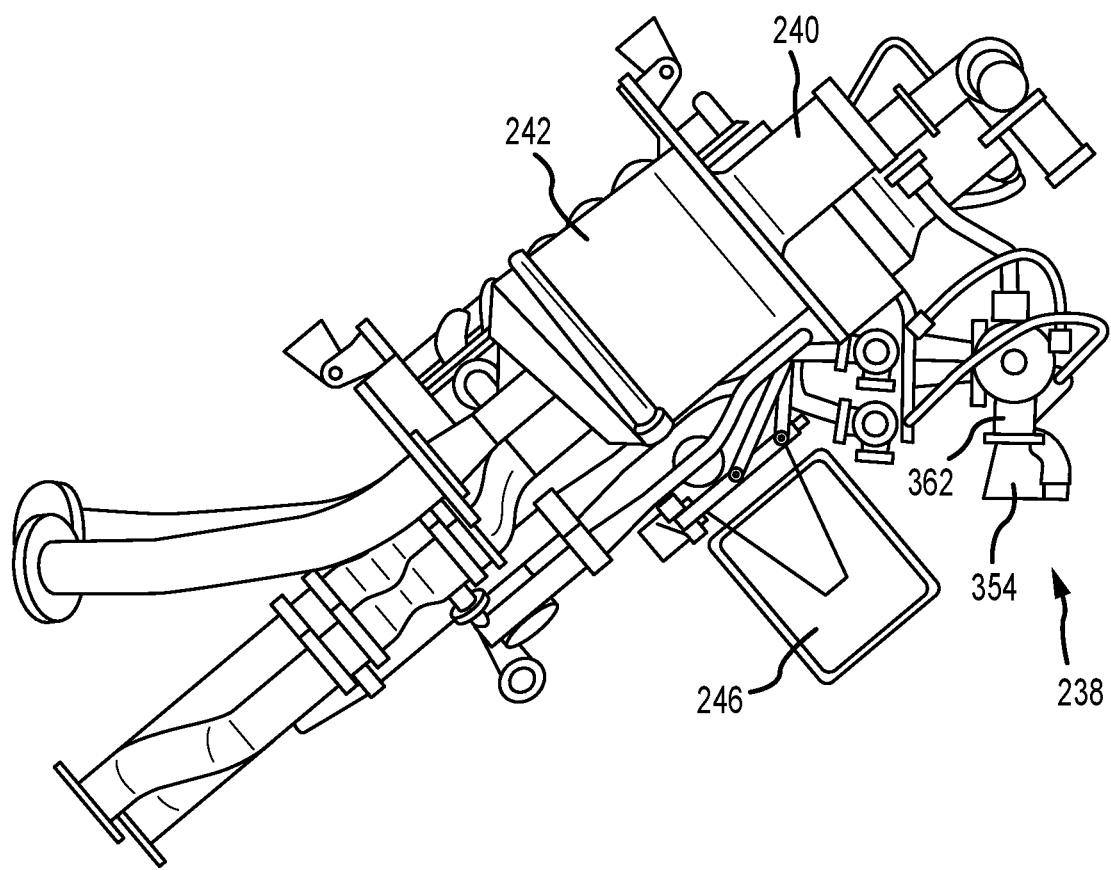
FIG. 24 is a further perspective view of the second exemplary embodiment of an IVF module illustrating various components.

FIGS. 23 and 24 are perspective views of the first IVF module 214 that show the spatial relationship between various components. The hydrogen gas line 272 provides hydrogen gas to the compressor 232 and the heat exchanger 234 for the hydrogen gas. Also, the oxygen gas line 292 provides oxygen gas to the compressor 240 and the heat exchanger 242 for the oxygen gas. The ICE 236 outputs mechanical work to the generator 244, which transfers the mechanical work to electric power. The hydrogen pressurant line 284 returns hydrogen gas with increased enthalpy to the hydrogen tank, and the oxygen pressurant line 304 returns oxygen gas with increased enthalpy to the oxygen tank. The controller 246 manages the various components of the IVF system. In FIG. 24, parts of the thruster assembly 238 are shown, including the first thruster 354 and the gimballed platform 362.

FIGS. 25A and 25B show an exemplary embodiment of the mixer valve 274. FIG. 25A is a front elevation view of the mixer valve 274, and FIG. 25B is a cross-sectional, side elevation view of the mixer valve 274 of FIG. 25A. As stated above, the mixer valves 274 can add liquid to the gas flowing out of the tanks to control and normalize the characteristics of the vented gas before the gas is drawn into the compressor. The gas lines draw vented gas from the ullage space of the tanks, but in a high gravity environment, the hot returning pressurant gas may not mix well with the gas already in the ullage space. Therefore, the gas lines may draw vented gas with varying characteristics. Similarly, a low gravity environment can result in vented gas with varying characteristics.

In the depicted embodiment, the mixer valve 274 comprises at least one spray bar 394 that extends from a central body 396, which houses liquid and a movable gate 398. With reference to FIG. 25B, the gate 398 moves slides axially within the body 396. In some embodiments, the vented gas flows in an annular space surrounding the central body 396, and the spray bar 394 extends from the central body 396 into the annular space. Each spray bar 394 has a plurality of ports 400, and liquid flows from the central body 396 into the spray bar 394 then exits through the ports 400. In some embodiments, the liquid exits the ports 400 in a direction that is substantially parallel to the flow of the gas. In other embodiments, the liquid exits the port 400 in a direction that forms an angle with the flow of the gas. The angle can be between approximately 5 and 45 degrees. As the gate 398 progressively opens, liquid flows from the central body 396 into more spray bars 394. The ports 400 may have the same or different sized and shaped openings. The mixer valve 274 can also include a venturi portion that accelerates the gas vented from the ullage space of the tank, thus reducing the local static pressure of the gas.

In another embodiment, the mixer valve 274 draws liquid into flowing gas by way of numerous small holes or perforations in a central pintle. The liquid is expelled at a right angle into the high speed gas stream and is immediately dispersed into droplets. A variable position gate valve varies the amount of liquid propellant drawn into the venturi portion. As the gate progressively opens, more perforations are exposed to the venturi portion, and more small streams of liquid propellant are drawn into the venturi portion. The small diameters of the streams allow the liquid to break into small particles, which increases the surface area of the particles for faster vaporization. The various embodiments of the hydrogen mixer valve 274 described herein can also apply to the oxygen mixer valve 294.

The compressor 214 circulates vented gas through the IVF system to serve the various functions of the IVF system. In some embodiments, the compressor is a high-flow, high-voltage, brushless direct current motor-driven compressor. Regarding the pressurization function of the IVF system, since heat is added to the gas at the discharge pressure of the compressor, the IVF system does not require an intervening pressure accumulator to pressurize the tanks. This also reduces the need to rely on vaporization of the liquid oxygen or liquid hydrogen to pressurize the tanks. In addition, the pressurized gas increases the efficiency of the ICE for electric power generation and increases the output of the thrusters in the thruster assembly.

Valves located downstream of the compressor modulate the flow of gas and establish the compressor operating point, which is the combination of the flow rate and the pressure increase of the incoming gas. The flowrate through the hot pressurant valve also controls the amount of heat transfer from the coolant in the coolant loop to the gas.

It will be appreciated that in some embodiments, the compressor is, for example, a centrifugal pump or a pump that relies on rotating components to increase the pressure of the gas. As described below, the compressor can discharge the gas at an increased pressure and with a rotation. Stated another way, the gas can exit the compressor having a longitudinal velocity along the line of exit, an outward radial velocity, and a tangential velocity about the longitudinal axis of the exit line or compressor discharge. The heat exchanger can act in concert with this rotational discharge to improve the performance of the heat exchanger.

Figure 26:
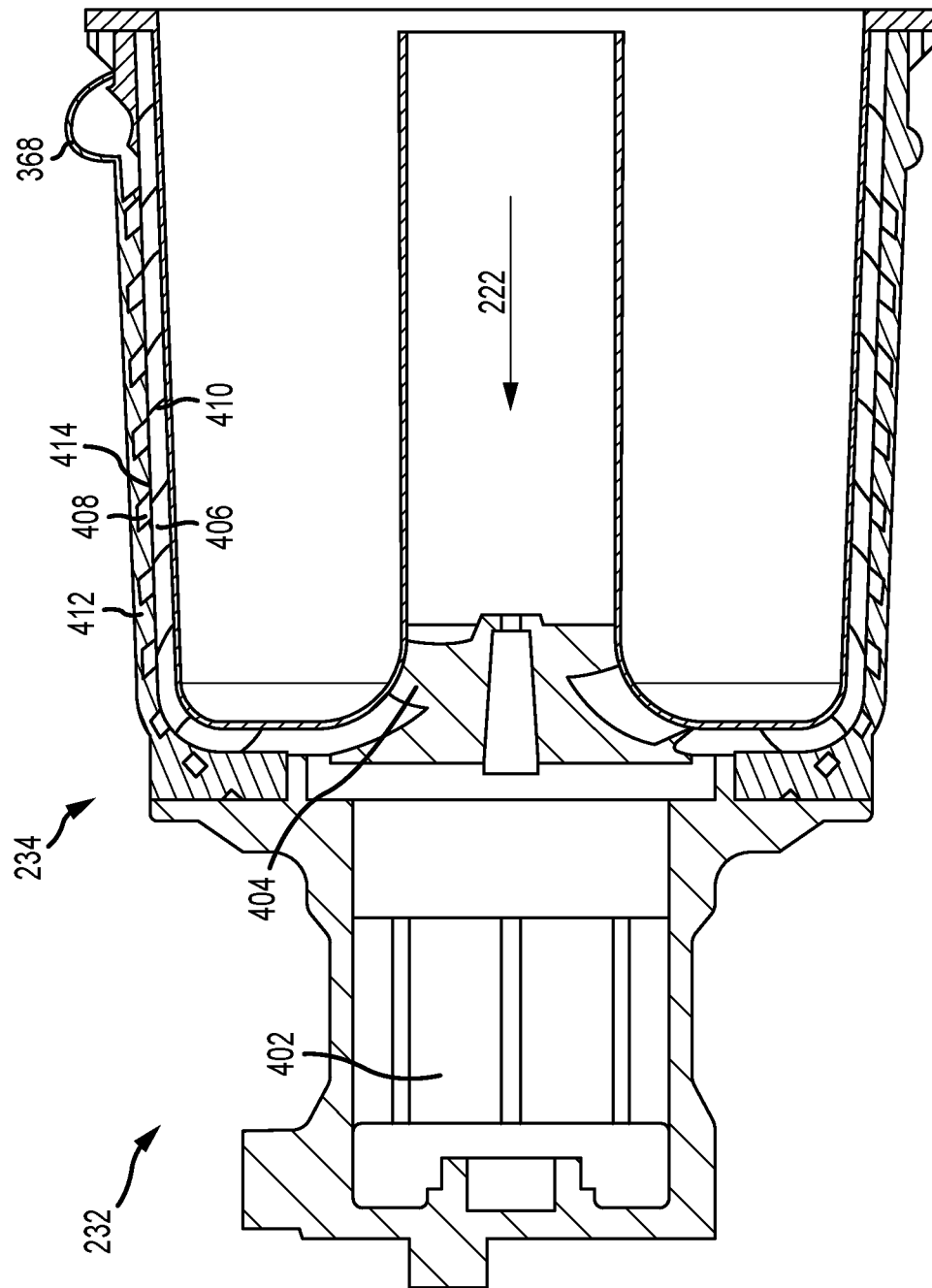
FIG. 26 is a cross-sectional view of one exemplary embodiment of a heat exchanger for transferring heat from the coolant in the coolant loop to the vented gas.

FIG. 26 shows one exemplary embodiment of a compressor 232 and a heat exchanger 234 for the hydrogen side of the IVF module. The heat exchanger 234 transfers heat from the coolant in the coolant loop 368 to the vented gas 222. In some embodiments, the heat exchanger 234 may be a counterflow, coaxial-annular design where each fluid flows in an annular space with one fluid positioned outside of the other fluid. The compressor 232 has a motor 402 that powers an impeller 404 to draw in the vented gas 222 and increase the pressure of the vented gas 222. The heat exchanger 234 can function as the casing for the compressor 232. More specifically, the compressor 232 discharges the gas 222 from the impeller through an inner space 406 of the heat exchanger 234. The inner space 406 is in the form of a coiled tube or passageway. Coolant flows through an outer space 408 of the heat exchanger. The outer space 408 is also in the form of a coiled tube or passageway and is positioned adjacent to and in contact with the inner space 406. The rotating impeller 404 imparts a rotation motion on the discharged gas 222 which is maintained as the gas travels through the coil shaped inner space 406. This stratifies the gas 222 in the inner space 406 based on the density of the gas 222. This also stratifies the gas 222 based on temperature as colder gas is denser than hotter gas. As a result, the coldest gas is positioned at the interface 414 between the inner space 406 and the outer space 408 of the heat exchanger 234. Similarly, the outer space 408 of the heat exchanger 234 induces a rotation motion in the coolant flowing through the outer space 408. This rotation stratifies the coolant based on density, and thus, temperature. Since the coolant flows through the outer space 408, the hottest coolant is positioned at the interface 414 between the inner space 406 and the outer space 408. As a result, the steepest possible temperature gradient between the gas and the coolant is established, which maximizes the heat transfer from the coolant to the gas and improves the performance of the heat exchanger 234.

In addition, though not illustrated, a bypass line can branch off after the impeller 404 without traveling through the inner space 406. Therefore, the vented gas in the bypass line has increased in pressure but does not receive heat from the coolant in the coolant line. The various embodiments of the hydrogen heat exchanger 234 described herein can also apply to the oxygen heat exchanger 242.

As described above, the ICE combusts hydrogen gas and oxygen gas, or reactants, to turn a crankshaft, which powers a generator that produces electric power. In some embodiments, the crankshaft is made of lightweight ferrium C61/C64 and the ICE is an inline six-cylinder engine made from a laser-sintered, aluminum additive manufacturing method. As a result of the manufacturing method, the ICE is a single block that includes the cylinder head, the intake manifold, and the exhaust manifold. The single block ICE eliminates multiple critical seals of combustible gas and hot combustion products, which improves the reliability and performance of the ICE.

The ICE includes features that allow the ICE to perform in extreme environments. For example, a near zero overlap between the exhaust valve and the intake valve and independent hydrogen and oxygen intake runners can prevent backfiring and other issues that arise when hydrogen and oxygen are used as fuel for the ICE. A hydrogen/oxygen mixture can ignite with very low ignition energy, and at the end of an exhaust stroke, there are hot combustion gases in the combustion chamber. These hot combustion gases can flow into the intake manifold because the exhaust valve is normally still open as the intake valve begins to open for the next stroke. Therefore, a near zero or complete zero overlap between the exhaust valve and the intake valve prevents the hot combustion gases from flowing into the intake manifold, causing backfires.

In addition, the intake runners for the hydrogen and the oxygen remain separate until a few millimeters before the intake valve. This feature along with the fact that hydrogen and oxygen have different densities result in a volume of oxygen that is adjacent to the intake valve and a volume of hydrogen that is immediate upstream of the volume of oxygen. As a result, the area of local mixing between the oxygen and hydrogen is displaced from the intake valve and the hot combustion gases to prevent backfires. When the intake valve opens, the two separate volumes of oxygen and hydrogen are drawn into the combustion chambers where the reactants are mixed and subsequently combusted.

In addition, the use of lubrication for an ICE in extreme environment can cause further issues. For instance, lubrication on the stem of the intake valve can interact with oxygen to form a press-sensitive gel capable of an explosive reaction. Therefore, an intake valve that comprises Nitronic 50 alloy can forgo the use of lubrication and avoid the gel-formation issue.

Embodiments of the ICE can include features that support the coolant loop to improve the ability of the IVF system to transfer heat between various components. The ICE has at least one cylinder through which a piston linearly travels. The at least one cylinder defines at least a portion of the combustion chamber, and therefore, receives heat from the combustion process. The main coolant line of the cool loop can pass through the ICE and through a loop around the at least one cylinder. The loop around the cylinder can take the shape of a helix that turns upon itself. A separate coolant path may be associated with each cylinder or with a subset of less than all cylinders. Alternatively, a single coolant path may traverse each cylinder.

Figure 27A:
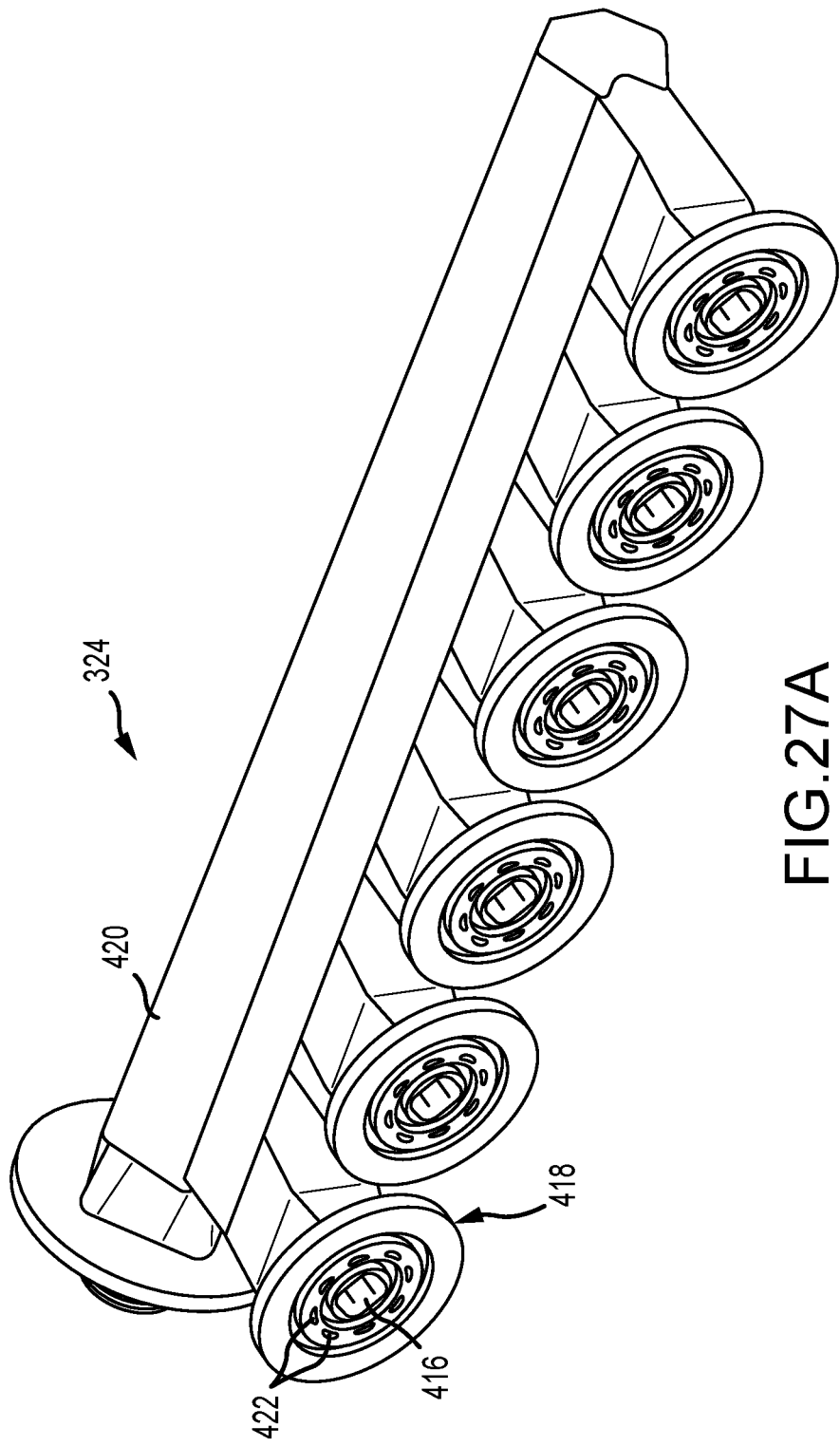
FIG. 27A is a perspective view of one exemplary embodiment of an exhaust manifold for an internal combustion engine.
Figure 27B:
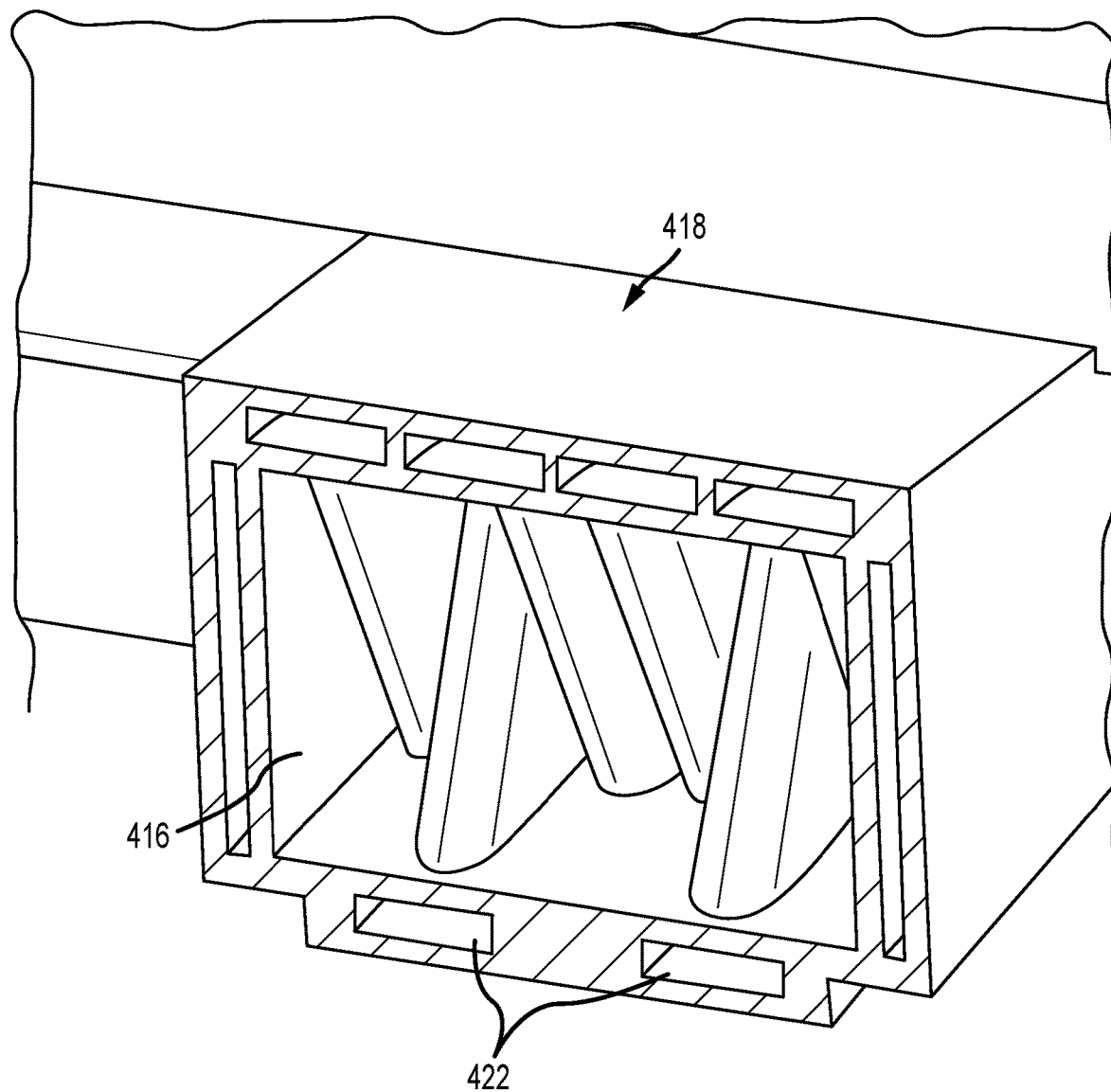
FIG. 27B is a cross-sectional view of one exemplary embodiment of a heat exchanger associated with the exhaust manifold of FIG. 27A.

FIGS. 27A and 27B depict an embodiment of the exhaust manifold 324 that collects exhaust gas from the ICE in the exhaust line and circulates coolant from the coolant loop to scavenge heat from the hot exhaust gas. The exhaust manifold 324 can provide approximately half of the heat transferred to the coolant loop. In addition, the main coolant line can pass through, adjacent to, or otherwise receive heat from the exhaust valve in some embodiments of the disclosure. FIG. 27A is a perspective view of the exhaust manifold 324 that has six exhaust channels 416, one for each cylinder of the ICE. Exhaust gas is expelled from the combustion chamber for each cylinder and into the exhaust channels 416. The exhaust gas then passes through exhaust manifold heat exchangers 418, one for each channel 416, where the hot exhaust gas transfers heat to the coolant of the coolant loop. After the exhaust manifold heat exchangers 418, the exhaust gas is collected in an exhaust runner 418, which expels the exhaust gas to the exhaust valve and/or exhaust line.

In the depicted embodiment, coolant in a coolant channel 422 flows through the exhaust manifold 324 in a direction that is opposite of the exhaust gas. The coolant enters the coolant channel 422 at the exhaust runner 420 and, preferably then splits into six different coolant channels 422, one for each cylinder of the ICE. Then, the coolant flows through the exhaust manifold heat exchangers 418 and into the ICE where each coolant line further draws heat from an individual cylinder. FIG. 27B is a cross sectional view of one of the exhaust manifold heat exchangers 418. As shown, the coolant channels 422 are arrayed around the exhaust channel 416 so that the exhaust gas transfers heat to the coolant. Parts of the coolant channels 422 may extend through the exhaust channel 416. Alternatively, the exhaust channel 416 may surround the coolant channels 422. It will be appreciated that the exhaust runner 420 is also configured concentrically with the coolant channel or channels 422 positioned around the exhaust channel 416. While the concentric heat exchangers are utilized in this exhaust manifold 324, it will be appreciated by those of skill in the art upon consideration of the present disclosure that any type of heat exchanger can be utilized including, but not limited to, shell and tube heat exchangers, plate heat exchangers, plate and shell heat exchangers, adiabatic wheel heat exchangers, plate fin heat exchangers, pillow plate heat exchangers, fluid heat exchangers, waste heat recovery units, dynamic scraped surface heat exchangers, phase-change heat exchangers, direct contact heat exchangers, microchannel heat exchangers, etc. and any combination thereof.

Figure 28A:
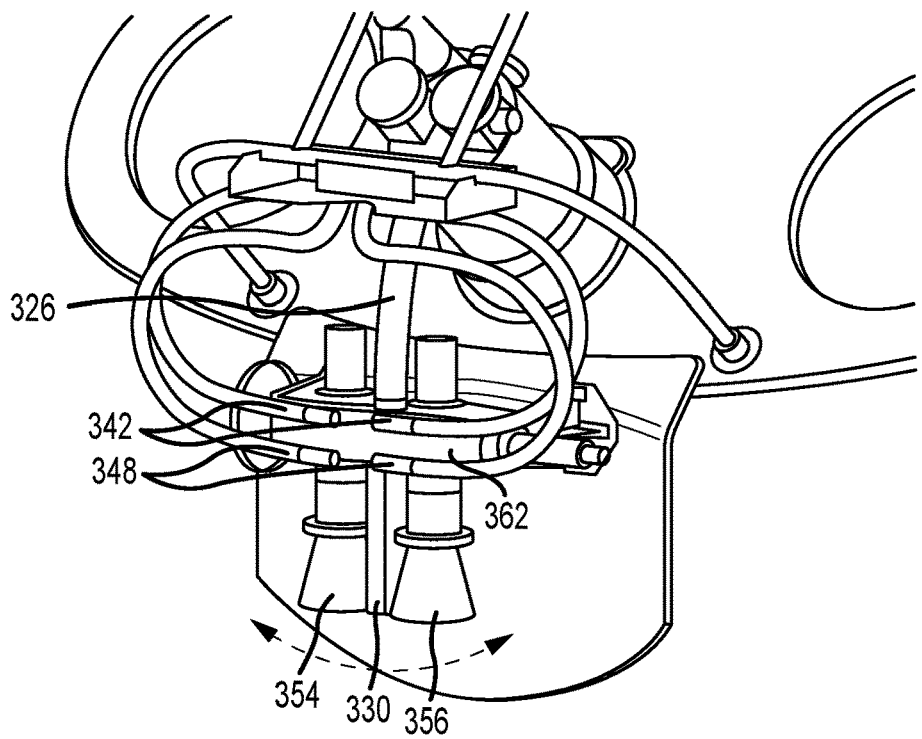
FIG. 28A is a perspective view of a thruster assembly illustrating various components for attitude adjustment.
Figure 28B:
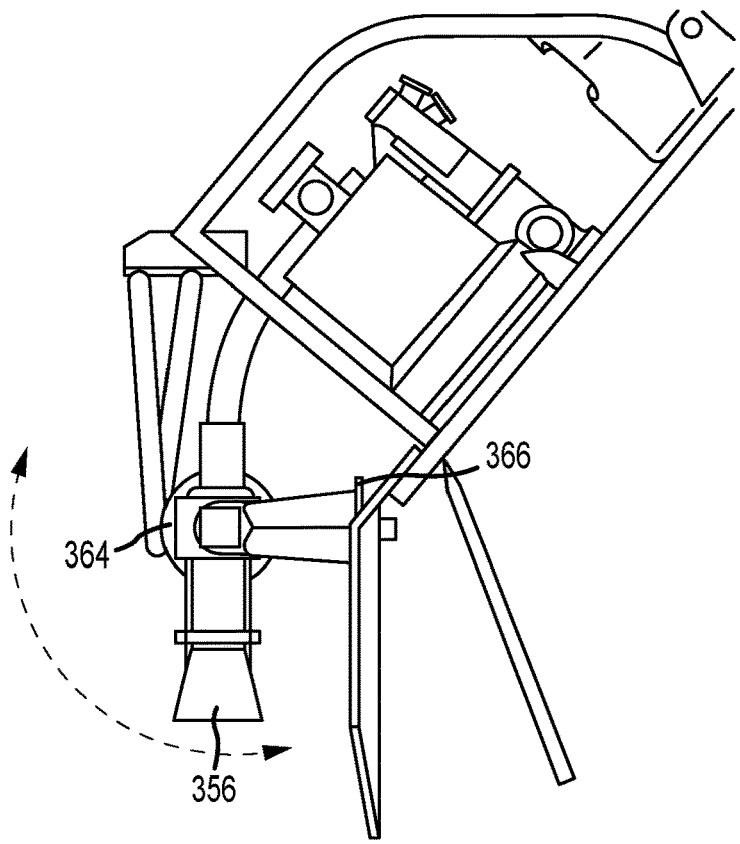
FIG. 28B is a side elevation view of the thruster assembly of FIG. 25A illustrating various components for attitude adjustment.

As illustrated in FIGS. 28A and 28B, first and second thrusters 354, 356 are mounted to a gimballed platform 362 that permits angular repositioning of the thrusters 354, 356 in at least two directions for attitude adjustment. An azimuth actuator 366 and an elevation actuator 364 control the position of the platform 362. The lines 342, 348, 326 that supply the hydrogen, oxygen and exhaust include a slip joint that allows relative repositioning of the platform 362, thrusters 354, 356 and exhaust nozzle 330. This permits control of the force vector from both thrusters 354, 356 and the exhaust nozzle 330. The platform 362 can rotate to produce combined settling and pitch/yaw/roll torques or can be pointed radially outboard of the spacecraft to produce a balanced thrust of both thrusters 354, 356 and exhaust nozzle 330. Further, the platform 362 may be repositioned to produce reverse thrust to achieve spacecraft separation without significant impingement of expelled gases on the spacecraft. As a result, spacecraft separation mechanisms such as springs or other devices may be eliminated. Further, a failure in one thruster may be compensated for by adjusting thrust on the remaining thruster with no loss or degradation of vehicle control.

In one embodiment, the thrusters 354, 356 are all of a single design that operate at low feed pressure, for example, less than 60 psia, and achieve vehicle control and settling. In order to produce stable thrust or increase or decrease thrust, dependent upon then current circumstances, active control of the system is required. A sonic metering variable position pintle valve is associated with the oxygen and hydrogen thruster lines 342, 348 to each thruster 354, 356 in combination with redundant pressure and temperature measurement instruments upstream of the pintle valve provides the control. The variable mixture ratio provided allows the system to adjust its propellant consumption to match tank boil off while keeping mixture ratio higher for ignition events. Thrust may be increased or decreased in this manner, with a downturn ratio of nearly 10. This variable thrust design allows the combustion device element associated with each thruster 354, 356 to be relatively small compared to thrusters previously used. In turn, the smaller size permits the gimbal platform 362 a greater range of movement. This design also permits the reduction in the number of thrusters from previously utilized systems.

Hot and cold thruster valves and are associated with the thrusters to supply the thrusters with variable temperature gases. During main pressurization events when the thrusters are firing for settling, the demand from the thrusters is effectively a leak in the energy system that reduces energy flow to the gas. During these periods, the thrusters use cold gas which contains less and hence reduces energy drain on the system. During periods when it is desirable to remove energy from the system, such as when the ICE is operating to recharge batteries, gas from the hot side of the motor compressor unit is utilized. Any desired combination of cold and hot gases can be produced, thus permitting precision thermal control of the IVF system across a range of output power.

After splitting, the thruster lines separate the thruster valves from the thrusters. Despite transporting fluid at cryogenic temperatures, the thruster lines are flexible which, in turn, permits large gimbal angles and reduces thermal soak back from the thrusters into the thruster valves and gas upstream of the thruster valves. This reduces rapid transient in propellant inlet conditions and enables higher liability ignition events with controlled mixture ratio and avoids transient over temperature events from excessively high mixture ratios.

According to aspects of the present disclosure, the thrusters may be produced using a laser sintering additive manufacturing process that forms both the thrusters on a single module having a common housing along with propellant thruster lines. This reduces and eliminates plumbing and leakage points on the thruster system downstream of the thruster valves.

The propellant feedline rotational slip joints interface the thrusters with flexible thruster lines. This provides a redundantly sealed swivel that permits large rotational motion of the thrusters and exhaust nozzle without excessive twist of the various lines.

According to aspects of the present disclosure, a controller unit 246 is provided with multiple controller slices 392. Each slice comprises two redundant field programmable gate arrays (FPGA), for example, FPGA A and FPGA B. The FPGAs perform logic functions. Each slice 392 performs or controls one or more dedicated functions. The functions are most, if not all, spacecraft operations and could include, for example, all of the components described herein, such as but not limited to power management, generator output, compressor operations, internal combustion engine operations, thruster operation, gimbal control, exhaust operation, coolant pumps, gas pumps, propellant pumps, valve operations, pressurization systems, etc. One FPGA is primary (FPGA A) and the other is secondary (FPGA B). Both receive all data inputs and both perform all logic functions, but the output of the secondary FPGA is suppressed. Each FPGA further comprises three redundant modules. Voting occurs among the three modules for each logic decision. In operation, if the output of any one module within the primary FPGA disagrees with the output of another module within the same FPGA, the primary FPGA is shut down and control is shifted to the secondary module and the communications of the secondary FPGA are unsuppressed. The primary FPGA is rebooted. Once rebooted, control is returned to the primary module and the secondary FPGA is rebooted. In addition, one or more of the slices may comprise a central processing unit (CPU) that operates in tandem with the other slices in the performance of the respective functions associated with those slices.

According to aspects of the present disclosure, an example of a controller unit is depicted in FIGS. 29A and 29B. In the illustrated embodiment, a controller unit 246 may be physically combined with an array of rechargeable lithium ion batteries 388, an example of which is provided in FIG. 30. The batteries 388 are recharged by the generator 244, which is powered by the output of the internal combustion engine 236. In one embodiment, the batteries 388 are directly connected to the generator 244, and the voltage of the batteries 388 matches the maximum rated output voltage of the generator 244. For instance, the batteries 388 can have a voltage of 300V, which is also the maximum rated output voltage of the generator 244. Therefore, the generator 244 and the related internal combustion engine 236 operate at a maximum rated output voltage and RPM, respectively, to charge the batteries 388.

In a second embodiment, the voltage of the batteries 388 is less than the maximum rated output voltage produced by the generator 244. Therefore, the generator 244 can charge the batteries 388 even when the generator 244 is producing less than maximum rated output voltage. Rather than a direct connection between the batteries 388 and the generator 244, a converter is positioned between the batteries 388 and the generator 244 to step the voltage from the generator 244 down to the batteries. In some embodiments, the maximum rated output voltage of the generator 244 is 300V, the output voltage of the generator 244 when the internal combustion engine 236 is idling is 100V, and the voltage of the batteries 388 is 30V. It will be appreciated that during emergencies, the output voltage of the generator 244, and the RPM of the internal combustion engine 236, can increase beyond rated maximum to, for instance, 380V.

The controller slices 392 are joined together so that their mass is additive to that of the batteries, with the coolant flowing in channels through and around the batteries 388 and slices 392. The quantity or volume of coolant within the channels also functions as a reservoir or supply of coolant for the cooling system. In addition to comprising a thermal control system, the coolant also functions as an isolator or dampener to attenuate vibration imparted on the batteries and controller unit by exterior sources.

According to further aspects of the present disclosure, a controller area network is utilized for communication and data flow among the slices 392 and the components and hardware. A schematic of power distribution and control is provided in FIG. 31. Preferably, a controller area network data bus with flexible data rates (CAN FD) is utilized. A CAN FD bus minimizes conductors and is resistant to noise interference. More preferably, two CAN buses (for example, CAN A and CAN B) are used to provide redundancy and back up communication capability. Data received by any given slice over a first bus over the controller area network is shared with the slice over a second network bus. The communication is received by both FPGA A and FPGA B associated with each slice 392. A loss of one bus thus can be tolerated without affecting function. In effect, the controller slices 392 can be viewed as individual redundant computers with tightly bound functions with minimal direct interaction with the adjacent slices. In this way, for example, multiple computers (20 or more) bound by a common or redundant bus work asynchronously to achieve IVF function with minimal central control. With this architecture, delays in communication are reduced.

Figure 31:
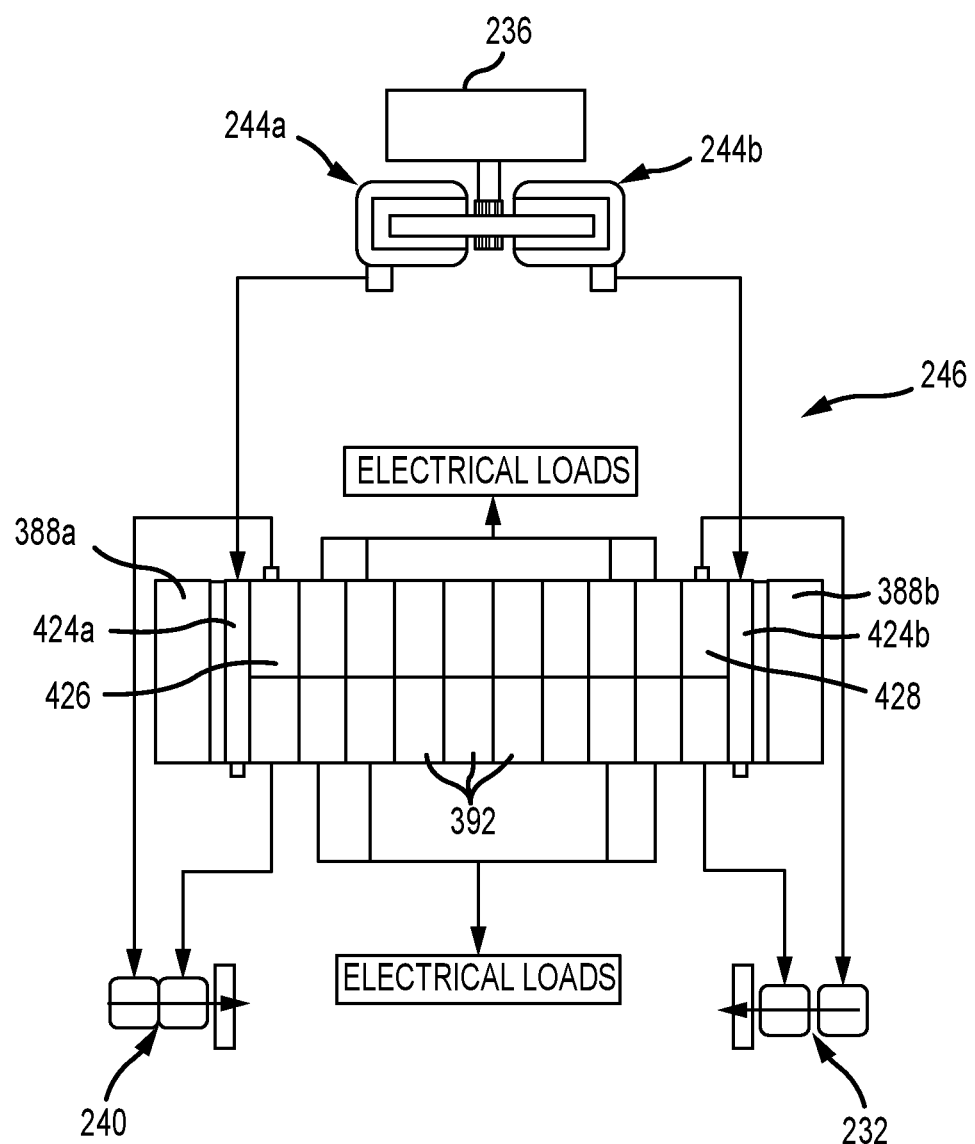
FIG. 31 is a schematic of the power distribution system of the second exemplary embodiment of the IVF system.

The power distribution in FIG. 31 also allows for redundancies in operation in the event that a component fails. For example, the generator 244 is a dual stator design and a first stator 244a supplies electric power to a first generator slice 424a and a first battery 388a of the controller unit 246, and a second stator 244a supplies electric power to a second generator slice 424a and a second battery 388a. Each battery 388a,b supplies a portion of the power for the remaining slices 392, a portion of the power for the hydrogen compressor slice 428, and a portion of the power for the oxygen compressor slice 426. Therefore, in the event that a stator or battery fails, the other stator and battery combination can maintain a level of functionality in the remaining slices 392, the hydrogen compressor slice 428, and the oxygen compressor slice 426. It will be appreciated that the remaining slices 392 can include a CPU slice, a generator slice, an ICE slice, an attitude control slice, an analog IO slice, and a power management slice.

Embodiments of the present invention may also have redundancy capabilities between IVF modules. For instance, if the batteries in one IVF module are defective or the starter on the ICE cannot receive a sufficient amount of electric power to start the ICE, then the battery on the other IVF module can supply the requisite amount of electric power, via a bus, to power the starter and start the ICE.

In one embodiment, gallium nitride high electron mobility transistors are utilized in high power radiation resistant applications. Gallium nitride switches drive high power motors with electrical demands in excess of 40 kilowatts. These switches exhibit good tolerance to radiation-induced damage and minimal tendency toward radiation-induced burnout. This permits the construction of efficient, compact and cost-effective power switch invertor arrays and boost electronics.

Corona discharge can be a problem during ascent. Embodiments of the present disclosure facilitate suppression of corona discharge. Corona is an electrical discharge phenomenon associated with low pressures in a relatively high local electrical potential. Corona can occur during the ascent of a rocket through the upper atmosphere as external pressure falls. Generally, voltages above 100 volts are susceptible to corona depending upon the gas present in the surroundings. Helium, often used to purge vehicle systems to keep condensable gases from freezing on cold hardware, has a relatively low breakdown voltage.

In one embodiment, the IVF system operates at two voltages: 30 volts for typical electrical loads, and above 300 volts for high power motors. Operation of hardware at 300 volts during ascent could cause corona discharge and possibly damage electronic components or disturb the function of the system. The power management slices within the controller unit 246 adjust high voltage power output to approximately 100 volts after liftoff and keep this voltage below the breakdown level. Power output of the system is limited during ascent, but basic functions of coolant and lubricant pumps as well as low compressor flows can be supported. After vacuum is achieved, voltage may be raised without concern of corona discharge. Optionally, a purge of the controller unit 246 prior to liftoff may occur with gaseous oxygen. Oxygen has a high breakdown voltage, in excess of 400 volts. With an oxygen purge, operation can be conducted at full operating voltages.

The radiation tolerance of the power switches within the controller is strongly dependent on the voltage applied across their gate. Under nominal conditions the IVF system operates for extended durations at a very low power level. During these periods the ICE speed is held below a level wherein the generator produces 100V instead of 300V. Thus during the vast majority of orbital time the primary power switches are relatively immune to radiation-induced effects. During the peak power demands associated with tank pressurization or main engine powered flight the voltage is raised to the 300V level to produce peak electrical power when needed. During this time the probability of radiation induced malfunction is higher but the duration at this voltage level is typically less than 1000 seconds. The probability of a fault during a mission is thus minimized while still enabling multi-week flight durations.

The spark ignition system on the ICE must function during ascent, and the output of the ignition coil associated with the ICE is in excess of 10,000 volts, well above corona breakdown voltage. To avoid or reduce the possibility of corona caused by spark ignition, the ignition coil and high voltage leads are placed within the interior of the ICE, which space is positively pressurized at all times. More specifically, the ignition coils and high voltage leads leading to the sparkplugs are placed within the cam shaft cavity which receives a positive hydrogen pressure from the crankcase ventilation system. This pressure is sufficient to prevent breakdown of these high voltage elements. The gas is recirculated by the lubrication support transport system. Gas and lubricating oil is impinged on the ignition coils to maintain them within operating temperature.

The components of the IVF system can vary their operations at different stages of a launch and flight sequence for a spacecraft. For instance, while the spacecraft is on the launch pad, the IVF system can control the loading and storing of propellants into the propellant tanks using the fill lines, the fill valves, the vent lines, and the vent valves. Due to the flow of extremely cold cryogenic fluid, typical pneumo-mechanical vent valves exhibit crack-reseat cycling behaviors that result in pressure oscillations within the propellant tanks. The use of motor-driven pintle valves (as are used everywhere within IVF) allows the precise control of the vent flow area and hence minimizes these pressure variations. A similar style valve can be used to precisely control the flow of liquid propellants into and out of the tanks. With these valves and lines included within the IVF system, once the spacecraft is in orbit, the spacecraft can use the IVF system to dock with another craft for refueling.

On the launchpad, the fill valves fill the propellant tanks with, for example, liquid oxygen and liquid hydrogen. Once these gases displace any inert gas within the propellant tanks, the ICE of the IVF system starts to bring the fluids of the IVF system, such as the coolant, up to operating temperatures and to begin charging the batteries. This initial start of the ICE can be on the order of hours before the launch of the spacecraft. The IVF system may also conduct a pressurization cycle to test the operation of components of the IVF system while the spacecraft is on the launchpad. The IVF system can increase the pressure in the propellant tanks by 10 psi and then allow the pressure to drop back down to complete the test. In addition, the IVF system can test the power output of the ICE, or ICEs, including a low power test of approximately 20 horsepower per ICE and a high power test of approximately 72.3 horsepower per ICE.

After liftoff, there are several phases that characterize IVF system functions, aspects of the spacecraft flight, and the external environment. The boost phase runs approximately from 0 seconds after launch to 266 seconds after launch. During the boost phase, the IVF system minimizes high voltages as described above to mitigate coronal discharge. In addition, the pressurization function of the IVF system may be reduced or stopped after the spacecraft passes a maximum dynamic pressure at a predetermined altitude since the spacecraft will accelerate and introduce forces on the propellant tanks and the contents within the propellant tanks. Boost engine cut off occurs approximately 266 seconds after launch, and the IVF system may need to pressurize the propellant tanks to account for condensation within the tank. At a predetermined altitude, the external environment may cool the propellant tanks enough to cause condensation, which results in a reduction of pressure in the propellant tanks.

Before the engines of the upper stage start, the IVF system can begin pressurizing the propellants within the tanks for use in the engines. While the engines of the upper stage propel the spacecraft, the thruster assembly of the IVF system can assist with roll control. After the engines of the upper stage fire, or main engine cutoff, the IVF system can keep the ICE or ICEs running, shut off the ICEs, leave one ICE running, etc. In some embodiments, the IVF system can run on batteries alone for approximately 30 minutes, and the batteries can restart the ICE or ICEs with approximately 15% power remaining. In sum, the various components of the IVF system are controlled to meet the pressurization, electric power generation, and attitude control functions while being responsive to external factors.

According to aspects of the present disclosure, the disclosed systems are designed with redundancies to provide backup capability in the event of component failure. For example, power from one IVF module may be transferred to another IVF module or to other spacecraft systems. if the internal combustion engine starter is defective, batteries may be used to start the engine.

While the present invention has been explained and illustrated with respect to various functional features or aspects in one or more preferred embodiments, it shall be understood that the invention can be modified, commensurate with the scope of the claims appended hereto. Combinations and variations will occur to persons of skill in the art, all of which are deemed within the scope of the disclosure. Further, it should be understood that each of the different concepts or aspects of the invention can be considered as having separate utility. Accordingly, the invention comprises a number of separate sub-combinations and combinations that have utility with respect to supporting the functions of an upper stage space vehicle.

What is claimed is:

1. A thermodynamic system associated with an upper stage of a launch vehicle, comprising:
    a tank storing a gas fluid, and a gas line extending from the tank to receive the gas fluid;
    an internal combustion engine (ICE) associated with the gas line;
    a coolant conduit having a coolant fluid, the coolant conduit in thermal communication with the ICE such that the coolant fluid is configured to receive heat generated by operation of the ICE, and the coolant conduit in thermal communication with the gas line such that the gas fluid is configured to receive heat from the coolant fluid to increase the enthalpy of the gas fluid; and
    wherein at least some of the gas fluid with increased enthalpy is configured to be transferred to the ICE for operation of the ICE, at least some of the gas fluid with increased enthalpy is configured to be transferred to the tank to pressurize the tank, and at least some of the gas fluid with increased enthalpy is configured to be transferred to a thruster to move the upper stage.

2. The system of claim 1, wherein the coolant conduit extends through an exhaust manifold of the ICE, wherein exhaust from the ICE is configured to flow through the exhaust manifold in one direction, and the coolant fluid is configured to flow through the exhaust manifold in an opposite direction.

3. The system of claim 2, wherein the exhaust manifold comprises a plurality of exhaust channels and a common runner that is fluidly connected to each exhaust channel of the plurality of exhaust channels, and wherein a first exhaust channel of the plurality of exhaust channels is fluidly connected to a cylinder of the ICE.

4. The system of claim 3, wherein the coolant conduit comprises at least one coolant channel associated with the cylinder of the ICE, and wherein the at least one coolant channel is in thermal communication with the first exhaust channel fluidly connected to the cylinder such that the coolant fluid in the at least one coolant channel is configured to receive heat from exhaust in the first exhaust channel.

5. The system of claim 1, wherein the ICE comprises an intake manifold that has a first intake runner that is configured to receive gas fluid with increased enthalpy as a first reactant and has a second intake runner that is configured to receive a second reactant, wherein an area of mixing between the first and second reactants is offset from an intake valve of the ICE to prevent premature ignition of the first and second reactants.

6. The system of claim 5, further comprising:
    a first pintle valve configured to control a flow rate of the first reactant through the first intake runner; and
    a second pintle valve configured to control a flow rate of the second reactant through the second intake runner.

7. The system of claim 1, further comprising:
    a heat exchanger having a first space, a second space, and an interface between the first space and the second space, wherein the coolant fluid is configured to flow through the second space, and the gas fluid is configured to flow through the first space to transfer heat across the interface from the coolant fluid to the gas fluid.

8. A thermodynamic system associated with an upper stage of a launch vehicle, comprising:
    a tank storing a gas fluid, and a gas line extending from the tank to receive the gas fluid;
    an internal combustion engine (ICE) associated with the gas line, wherein at least some of the gas fluid is configured to be transferred to the ICE for operation of the ICE, and at least some of the gas fluid is configured to be transferred to a thruster to move the upper stage;

a ventilation line associated with the gas line, the ventilation line extending between the gas line and a crankcase associated with the ICE, wherein at least some of the gas fluid is configured to be transferred through the ventilation line to flow through the crankcase of the ICE;

a first coolant conduit having a first coolant fluid, wherein the first coolant fluid is configured to receive heat generated by operation of the ICE, and at least some of the gas fluid transferred to the ICE is configured to receive heat from the first coolant fluid; and a second coolant conduit having a second coolant fluid, wherein the second coolant fluid is configured to receive heat generated by operation of a heat source different from the ICE, and at least some of the gas fluid transferred to the ICE is configured to receive heat from the second coolant fluid.

9. The system of claim 8, further comprising:
a lubrication pump configured to circulate a lubricant through the crankcase of the ICE.

10. The system of claim 8, wherein the heat source is at least one of a battery or a controller unit.

11. The system of claim 8, further comprising:
an exhaust line that is configured to direct exhaust away from the ICE, wherein at least some of the gas fluid is configured to be transferred through the crankcase from the ventilation line to cause water vapor to be expelled from the crankcase and through the exhaust line.

12. The system of claim 11, further comprising:
an exhaust valve associated with the exhaust line, wherein the exhaust valve is configured to selectively close the exhaust line to keep the ICE pressurized when the ICE is not in operation.

13. The system of claim 11, wherein the exhaust line is in fluid communication with and is configured to direct exhaust from the ICE through the thruster.

14. A system for controlling the enthalpy of a gas fluid associated with an upper stage of a launch vehicle, comprising:

a tank storing the gas fluid, and a gas line extending from the tank to receive the gas fluid;

a thruster, wherein at least some of the gas fluid is configured to be transferred to the thruster to move the upper stage;

an internal combustion engine (ICE) associated with the gas line, wherein at least some of the gas fluid is configured to be transferred to the ICE for operation of the ICE, and wherein an output shaft of the ICE is configured to charge a battery; and a coolant conduit having a coolant fluid, wherein the coolant fluid is configured to receive heat generated by the discharge of current from the battery, and the gas fluid transferred to the ICE is configured to receive heat from the coolant fluid.

15. The system of claim 14, further comprising:
a generator associated with the output shaft of the ICE, wherein at least some of the electric power produced by the generator is configured to charge the battery.

16. The system of claim 14, wherein the battery comprises a plurality of cells, and the coolant fluid is configured to flow between cells of the plurality of cells.

17. The system of claim 14, further comprising:
a controller unit in thermal communication with the coolant conduit, wherein the coolant fluid is configured to receive heat generated by operation of the controller unit.

18. The system of claim 14, further comprising:
a reservoir configured to store excess coolant fluid; and
a pump that is configured to circulate coolant fluid from the reservoir, between cells of the battery, and through the coolant conduit.

19. The system of claim 14, further comprising:
a heat exchanger having a first space, a second space, and an interface between the first space and the second space, wherein the coolant fluid is configured to flow through the second space, and the gas fluid transferred to the ICE is configured to flow through the first space to transfer heat across the interface from the coolant fluid to the gas fluid, wherein the coolant fluid is configured to exit the heat exchanger at a temperature between approximately 50-70° F.

* * * * *